(12) United States Patent
Umekage et al.

(10) Patent No.: US 7,610,411 B2
(45) Date of Patent: Oct. 27, 2009

(54) INFORMATION PROCESSING DEVICE, LINE CONCENTRATOR, NETWORK INFORMATION PROCESSING SYSTEM HAVING THE LINE CONCENTRATOR, INFORMATION PROCESSING PROGRAM AND STORAGE MEDIUM

(75) Inventors: Atsushi Umekage, Kashiwa (JP); Suehiro Ueda, Nara (JP); Hiroshi Takatani, Yamatotakada (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 100 days.

(21) Appl. No.: 10/562,060

(22) PCT Filed: Jun. 22, 2004

(86) PCT No.: PCT/JP2004/008757

§ 371 (c)(1),
(2), (4) Date: Dec. 22, 2005

(87) PCT Pub. No.: WO2004/114118

PCT Pub. Date: Dec. 29, 2004

(65) Prior Publication Data

US 2007/0011362 A1    Jan. 11, 2007

(30) Foreign Application Priority Data

Jun. 23, 2003 (JP) ............................. 2003-178696
Jul. 15, 2003 (JP) ............................. 2003-197369

(51) Int. Cl.
*G06F 3/00* (2006.01)

(52) U.S. Cl. ................ 710/17; 358/3.23; 713/323
(58) Field of Classification Search ............... 710/15, 710/19, 14, 17
See application file for complete search history.

(56) References Cited

U.S. PATENT DOCUMENTS

| 7,180,626 | B1* | 2/2007 | Gassho et al. ............. 358/1.6 |
| 7,227,838 | B1* | 6/2007 | O'Riordan ............. 370/219 |
| 2002/0186410 | A1 | 12/2002 | Tanaka | |

FOREIGN PATENT DOCUMENTS

| JP | 8-153078 A | 6/1996 |
| JP | 8-221344 A | 8/1996 |
| JP | 09-319533 A | 12/1997 |
| JP | 11-327817 | 11/1999 |
| JP | 11-331453 A | 11/1999 |

(Continued)

*Primary Examiner*—Henry W. H. Tsai
*Assistant Examiner*—Elias Mamo
(74) *Attorney, Agent, or Firm*—Birch, Stewart, Kolasch & Birch, LLP

(57) ABSTRACT

There is provided a mediation section (34) for switching between an active status in which data transmitted to a specific address is registered and processed and a non-active status other than the active status. When the mediation section (34) judges that unprocessed data stored in a data storage section (31) cannot be processed in a predetermined time, the mediation section (34) instructs one or more other MFPs to change into the active status and causes the MFP including the mediation section (34) to change into the non-active status, so as to cause a data processing section (32) to process the unprocessed data. As a result, it is possible to perform mediation concerning a job (data) without using a server.

12 Claims, 27 Drawing Sheets

FOREIGN PATENT DOCUMENTS

| | | |
|---|---|---|
| JP | 2000-003259 A | 1/2000 |
| JP | 2000-330736 A | 11/2000 |
| JP | 2001-066950 A | 3/2001 |
| JP | 2001-144828 A | 5/2001 |
| JP | 2002-063127 A | 2/2002 |
| JP | 2002-366334 A | 12/2002 |
| JP | 2003-067157 A | 3/2003 |
| JP | 2003-163785 | 6/2003 |
| JP | 2003-271348 A | 9/2003 |
| JP | 2004-78359 A | 3/2004 |

* cited by examiner

FIG. 17

ADDRESS TABLE

| MAC ADDRESS | PORT |
|---|---|
| MAC ADDRESS 1 | P1 |
| MAC ADDRESS 2 | P2 |
| MAC ADDRESS 3 | P3 |
| MAC ADDRESS A | P4 |
| MAC ADDRESS B | P5 |

FIG. 18

STATUS TABLE

| MAC ADDRESS | DEVICE INFORMATION | PRIORITY VALUE |
|---|---|---|
| MAC ADDRESS 1 | MFP, ABILITY | 100 |
| MAC ADDRESS 2 | MFP, ABILITY | 80 |
| MAC ADDRESS 3 | MFP, ABILITY | 60 |

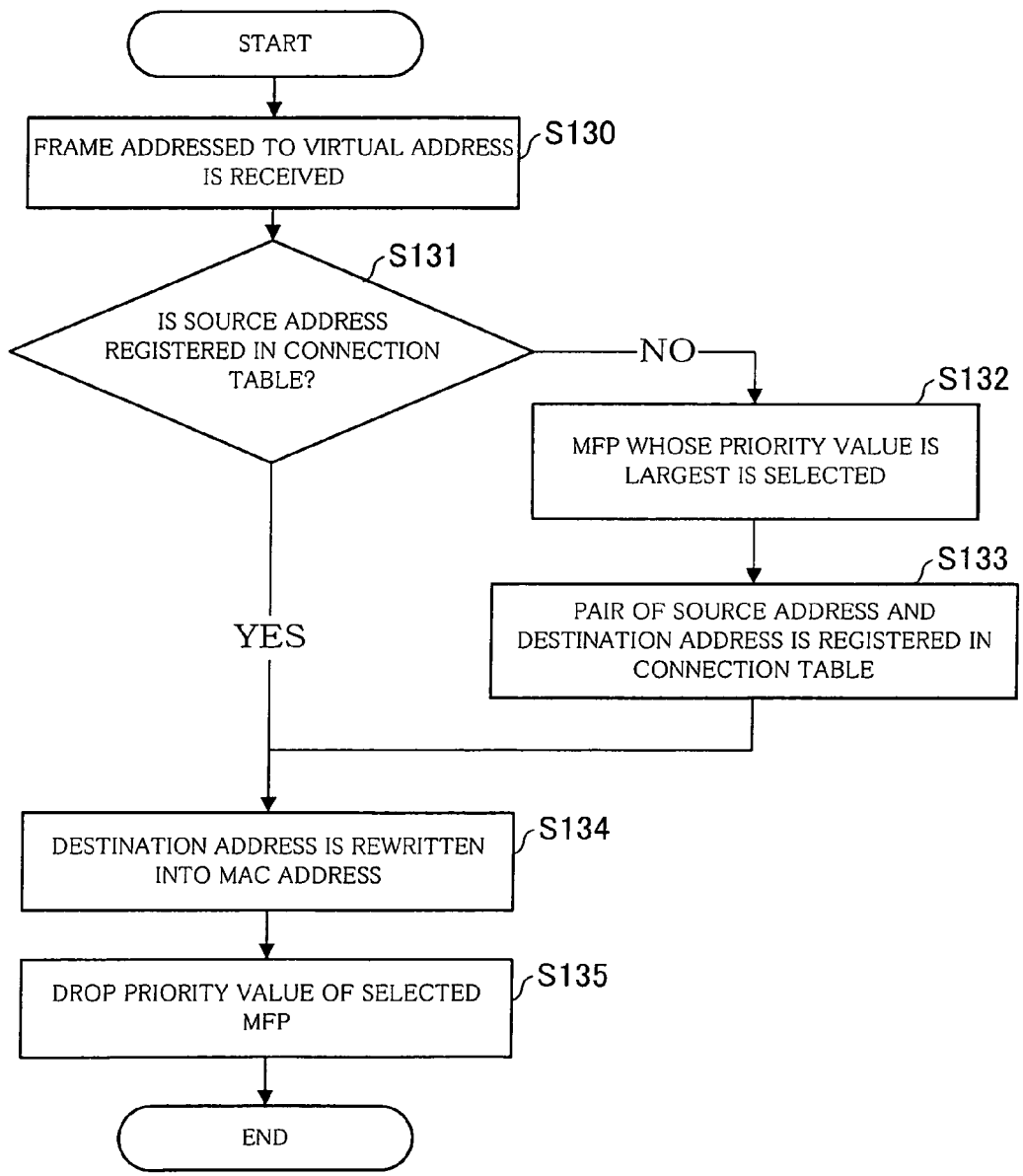

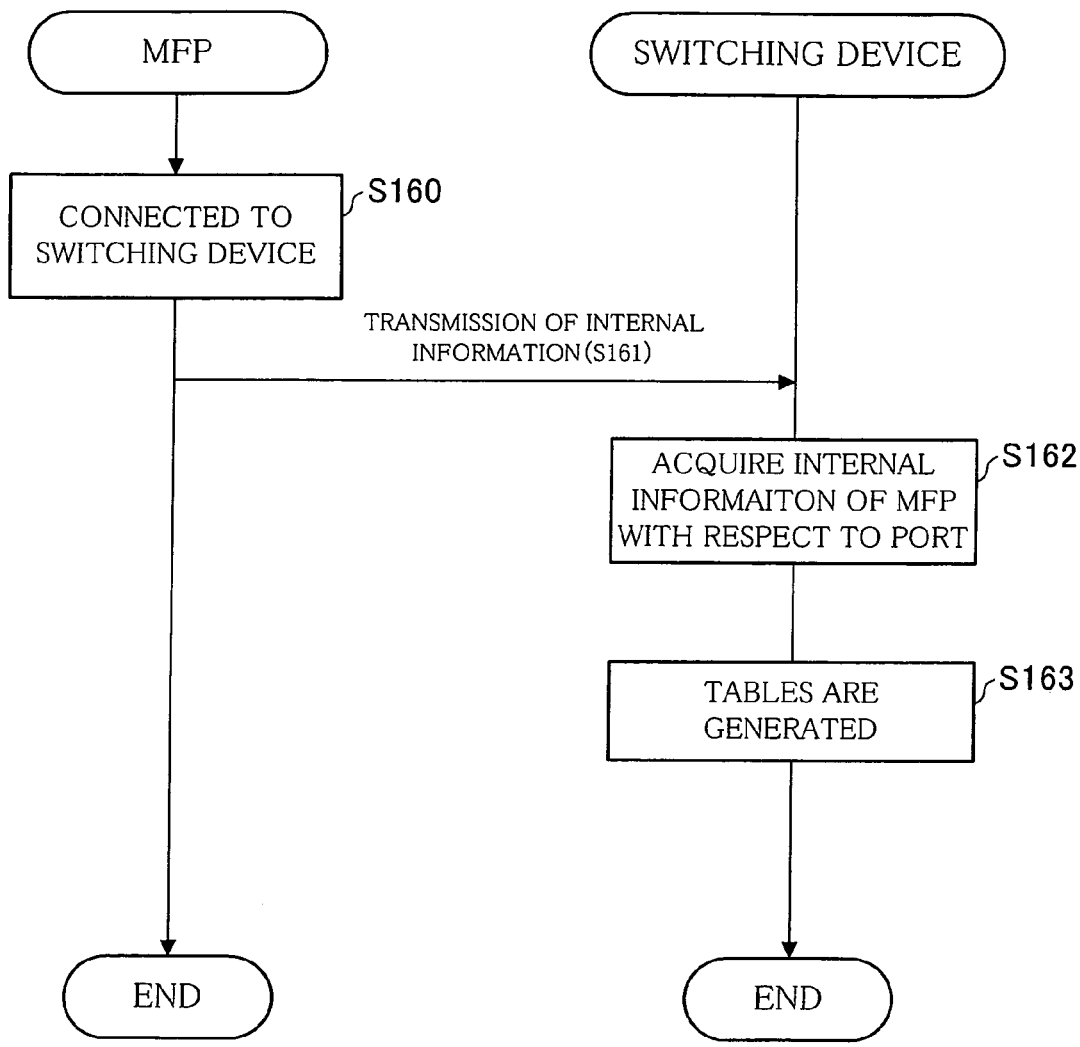

FIG. 28

CONNECTION TABLE

| HOST MAC ADDRESS | HOST IP ADDRESS | HOST PORT NUMBER | PRINTER MAC ADDRESS | PRINTER IP ADDRESS | PORT NUMBER | TIMER |
|---|---|---|---|---|---|---|
| MAC ADDRESS A | IP ADDRESS A | :x | MAC ADDRESS 1 | IP ADDRESS 1 | PORT NUMBER FOR PRINTER | T1 SECOND |
| MAC ADDRESS B | IP ADDRESS B | :y | MAC ADDRESS 2 | IP ADDRESS 2 | PORT NUMBER FOR PRINTER | T2 SECOND |
| MAC ADDRESS A | IP ADDRESS A | :x' | MAC ADDRESS 3 | IP ADDRESS 3 | PORT NUMBER FOR PRINTER | T3 SECOND |

FIG. 30

ADDRESS TABLE

| MAC ADDRESS | PORT | DEVICE INFORMATION | STATUS |
|---|---|---|---|
| MAC ADDRESS 1 | P1 | MFP,ABILITY | active |
| MAC ADDRESS 2 | P2 | MFP,ABILITY | standby |
| MAC ADDRESS 3 | P3 | MFP,ABILITY | off |
| MAC ADDRESS A | P4 | HOST | – |
| MAC ADDRESS B | P5 | HOST | – |
| VIRTUAL MAC ADDRESS | – | virtual | – |
| MAC ADDRESS OF SWITCHING DEVICE 100 | – | own | – |

INFORMATION PROCESSING DEVICE, LINE CONCENTRATOR, NETWORK INFORMATION PROCESSING SYSTEM HAVING THE LINE CONCENTRATOR, INFORMATION PROCESSING PROGRAM AND STORAGE MEDIUM

BACKGROUND OF THE INVENTION

1. Field of the Invention

The present invention relates to an information processing device, a line concentrator, a network information processing system having the line concentrator, an information processing program, and a storage medium.

2. Description of the Related Art

Recently, with increase in abilities of computers and decrease in prices of computers, network systems which share peripheral devices in common and process information transmitted from computers are established on networks, particularly on LAN (Local Area Network)s.

The peripheral devices shared in common are, for example, image forming apparatuses such as copying machines, scanners, MFP (Multi Function Printer)s. By connecting a plurality of image forming apparatuses with a LAN and establishing a network system, it is possible for the image forming apparatuses to execute a printing job transmitted from a computer.

In such a network system, it is general that: a device for output is determined at a time when an output instruction is given, and each printing job which should be outputted is transmitted to the thus determined device.

However, in such a network system, there may be a case where requests for outputting jobs are concentrated onto a particular image forming apparatus, and accordingly some devices can output jobs but other devices are standing by for outputting of jobs. Therefore, image forming apparatuses may be ineffectively utilized.

In order to solve such problem, for example, Patent Document 1 discloses an arrangement in which: a server detects printing statuses of a plurality of printers, and selects the most suitable printer with respect to each request for printing.

[Patent Document 1]

Japanese Unexamined Patent Publication No. 67157/2003 (Tokukai 2003-67157) (Published on Mar. 7, 2003)

Further, a printing system in which a plurality of image forming apparatuses are shared in common by a plurality of users has the following problem: in a case of processing printing data transmitted from outside, when printing data is transmitted to an image forming apparatus for executing a printing job and the job is processed in another printer according to the printing status of the image forming apparatus (see Patent Document 2) or when amount of data of a printing job is large and the job is processed by a plurality of image forming apparatuses, it is necessary to re-transmit the printing data.

[Patent Document 2]

Japanese Unexamined Patent Publication No. 066950/2001 (Tokukai 2001-066950) (Published on Mar. 16, 2001)

In order to solve the problem, an image output system is proposed, in which mediation (negotiation) of jobs is performed among a plurality of image forming apparatuses on a network, and accordingly utilization efficiency of the image forming apparatuses is enhanced and mediation among the image forming apparatuses is made possible without increasing a burden on the network (see Patent Documents 3 through 5).

[Patent Document 3]

Japanese Unexamined Patent Publication No. 003259/2000 (Tokukai 2000-003259) (Published on Jan. 7, 2000)

[Patent Document 4]

Japanese Unexamined Patent Publication No. 319533/1997 (Tokukaihei 9-319533) (Published on Dec. 12, 1997)

[Patent Document 5]

Japanese Unexamined Patent Publication No. 331453/1999 (Tokukaihei 11-331453) (Published on Nov. 30, 1999)

For example, Patent Document 3 discloses an image forming system which categorizes printers having a common feature into a single group so as to automatically assign output data to printers having the function desired by a user. The image forming system categorizes printers having the same function into a single group and manages the printers. Therefore, when processing is performed, a group is selected according to a function required in the processing instead of selecting respective printers, and output data is assigned to a plurality of printers in the thus selected group.

Further, Patent Document 5 discloses an image output system in which jobs from each host on a LAN is assigned, by way of a server on the LAN, to a plurality of printers connected with the server via USB (Universal Serial Bus).

However, the conventional image output systems have the below-indicated problems.

As for the Patent Document 1, it is necessary to provide a server, which increases a cost. Further, traffic occurs because statuses of the plurality of printers are detected.

As for the printer system disclosed in Patent Document 3, printers having the same function are grouped in advance, and printing jobs are transmitted to all the printers in the group. Therefore, it is impossible to dynamically assign the printing jobs in flexible response to changes of processing states, so that processing efficiency may drop.

Further, in the method disclosed in the Patent Document 3, a single server determines a group to which the jobs are to be transmitted. Thus, when the server has a breakdown for example, the jobs cannot be transmitted.

Further, in Patent Document 3, when a printing job being processed in an image forming apparatus is transmitted to another image forming apparatus, the job is transmitted from the image forming apparatus, which is processing the job, to another image forming apparatus. Therefore, in the image forming apparatus which is processing the job, a job to be processed is temporarily received and then forwarded (transmitted) to another device. Therefore, unnecessary transmission/reception of a job has to be performed, so that processing ability of the image forming apparatus drops. Further, in the structure disclosed in the Patent Document 3, the server determines whether or not to transmit a job to another device, so that a printer job cannot be transmitted when the server has a breakdown.

Further, with the arrangement disclosed in the Patent Document 5, it is necessary to separately provide a server for assigning printer jobs to a plurality of printers, which increases a cost. Further, with the arrangement disclosed in the Patent Document 4, the server determines a group to which a printing job is to be transmitted. Thus, when the server has a breakdown for example, the printing job cannot be transmitted.

The first object of the present invention is to provide: an information processing device and an information processing program which are capable of mediating devices concerning a job (data) without using a server; a computer-readable storage medium for storing the information processing program; and an image forming apparatus.

The second object of the present invention is to provide a line concentrator which allows processing of jobs to be shared while suppressing unnecessary traffic and accelerates the processing without using an expensive device such as a server.

SUMMARY OF INVENTION

In order to achieve the object, an information processing device according to the present invention is an information processing device, including: a storage section; a reception section capable of receiving data transmitted to a specific address that has been predetermined; a registration processing section for adding and registering the data received by the reception section into the storage section; a data processing section for processing the data stored in the storage section; and a status change processing section for controlling the registration processing section and the data processing section and for switching between (i) an active status which allows additional registration of the data transmitted to the specific address and processing of the data and (ii) a non-active status other than the active status, wherein the status change processing section instructs one or more other information processing devices to change into the active status when an amount of unprocessed data registered in the storage section exceeds a predetermined threshold value, and the status change processing section changes the information processing device into the non-active status and causes the data processing section to process the unprocessed data.

With the arrangement, when the amount of unprocessed data registered in the storage section exceeds a predetermined threshold value, the status change processing section instructs other one or more information processing devices to change into the active status, and causes the information processing device including the status change processing section to change into the non-active status and to process the unprocessed data that has been accumulated. Therefore, it is possible always to keep at least one information processing device capable of receiving data. As a result, for example, without using a server, it is possible to prevent data to be processed from being assigned to a single information processing device. Therefore, data can be efficiently processed as a whole. Further, unlike the conventional arrangement in which data is assigned using a server, it is possible to prevent concentration of all data to be processed. As such, it is possible to assign and process data without using a server.

Further, in the conventional arrangement in which a server assigns data to be processed to each information processing device, when the server has a breakdown, each information processing device cannot process the data. However, the information processing device according to the above arrangement can assign data based on setting of each information device without using a server.

The information processing device may be realized by hardware or by causing a computer to execute a program. To be specific, the program according to the present invention is a program for causing a computer to function as the information processing device. Further, the storage medium according to the present invention stores the program.

When these programs are executed by a computer, the computer functions as the information processing device. On this account, it is possible to assign data based on setting of each information processing device without using a server.

In order to achieve the object, the image forming apparatus according to the present invention may include the image processing device and an image forming section for forming an image based on data processed by the information processing device.

With the arrangement, at least one image processing device always can receive data transmitted to the specific address. Therefore, for example, a server is not necessary unlike the conventional art, and it is possible to prevent data to be processed from being assigned to a single information processing device.

In order to achieve the object, a line concentrator according to the present invention is a line concentrator, including: a plurality of ports; an address storage section for storing a specific address that has been predetermined; an output processing section for outputting data, received by a port, from another port capable of transmitting the data to a destination; a data judgment processing section for judging whether or not the received data is addressed to the specific address; and a device determination processing section for determining a destination address used to transmit data, having been transmitted to the specific address, to at least one of information processing devices capable of processing the data, wherein the output processing section determines a port which is to transmit the data to the destination address determined by the device determination processing section, and the output processing section outputs the data to the port having been determined.

What are meant by "information processing devices capable of processing the data" "transmitted to the specific address" are information processing devices connected with ports of the line concentrator. Further, what are meant by the information processing devices connected with the ports are information processing devices capable of transmission/reception of data with the ports. To be specific, examples of the information devices may be information processing devices directly connected with the ports, or information processing devices indirectly connected with the ports via other line concentrator, a router, or the like.

The device determination processing section determines an information processing device capable of processing data transmitted to the specific address stored in the address storage section. Subsequently, the output processing section outputs the data to the information processing device based on determination of the device determination processing section. Therefore, without a server, a data-transmitting device can transmit data transmitted to the specific address to the information processing device determined to process the data out of the plurality of information processing devices. Therefore, the line concentrator can process the data transmitted to the virtual address.

Further, the line concentrator intervening between the data-transmitting device and the information processing device so as to transmit data assigns data addressed to the specific address. Therefore, unlike a case where a server assigns data, it is possible to reduce an amount of data communication in the whole network without increasing an amount of data communication (traffic) between a server and the line concentrator.

Further, it is unnecessary for the operator to consider to which information processing device data is to be transmitted in a network printer system without a server. On this account, data can be processed only by transmitting the data to the predetermined specific address.

In order to achieve the object, in a network information processing system according to the present invention, a host device capable of transmitting data to the virtual address is connected to a plurality of information processing devices, capable of processing the data, via at least the line concentrator.

With the arrangement, the line concentrator assigns, to the plurality of information processing devices, the data transmitted from the host device, so that it is possible to provide a network information processing system capable of efficiently processing the data.

Each section of the line concentrator may be realized by hardware or by causing a computer to execute a program. To be specific, the program according to the present invention is used to cause a computer to function as the line concentrator. Further, the storage medium according to the present invention stores the program.

When these programs are executed by a computer, the computer functions as the line concentrator. On this account, it is possible to assign data based on setting of each line concentrator without using a server.

Additional objects, features, and strengths of the present invention will be made clear by the description below. Further, the advantages of the present invention will be evident from the following explanation in reference to the drawings.

BRIEF DESCRIPTION OF DRAWINGS

FIG. 5(a) illustrates that an MFP 1 is in an active status. FIG. 5(b) illustrates that the MFP 1 changes into a busy status and an MFP 2 changes into the active status. FIG. 5(c) illustrates that a job is transmitted to the MFP 2 in the active status. FIG. 5(d) illustrates that a job is further transmitted to the MFP 2 in the active status. FIG. 5(e) illustrates that the MFP 1 changes into an off status.

FIG. 6(a) illustrates that the MFP 1 is in the active status. FIG. 6(b) illustrates that the MFP 1 runs short of paper and changes into the busy status. FIG. 6(c) illustrates that a job is transmitted to the MFP 2 in the active status. FIG. 6(d) illustrates that a job is further transmitted to the MFP 2 in the active status. FIG. 6(e) illustrates that the MFP 1 changes into the off status.

FIG. 12(a) illustrates that a job is transmitted to the MFP 1 in the active status and the MFP 2 in the standby status. FIG. 12(b) illustrates that a job processed in the MFP 1 is abandoned in the MFP 2. FIG. 12(c) illustrates that an error occurs in the MFP 1 and the MFP 1 changes into the busy status. FIG. 12(d) illustrates that a job is transmitted to the MFP 2 in the active status and the MFP 3 in the standby status. FIG. 12(e) illustrates that the MFP 1 changes into the off status.

FIG. 17 illustrates information stored in the address table illustrated in FIG. 13.

FIG. 18 illustrates information stored in the status table illustrated in FIG. 13.

FIG. 20 illustrates information stored in the connection table illustrated in FIG. 13.

FIG. 21 is a flowchart illustrating a series of processing in the printer selection processing (MFP selection processing) illustrated in FIG. 19.

FIG. 24 is a flowchart illustrating processing of initial setting at a time when the MFP gets connected with the switching device.

FIG. 25 illustrates information stored in the status table according to further embodiment of the present invention.

FIG. 28 illustrates information stored in a connection table according to further embodiment of the present invention.

FIG. 30 illustrates a table obtained by combining the address table with the status table.

DETAILED DESCRIPTION OF THE INVENTION

Embodiment 1

One embodiment of the present invention is explained below with reference to FIGS. 1 through 12.

The information processing device according to the present embodiment can mediate information processing devices without any server by transmitting a job (data) to a specific address shared by the information processing devices.

The following explains the information processing device by using, as an example, an MFP which is a kind of image forming apparatuses.

Further, what is meant by the word "specific address" (referred to as a virtual address hereinafter) is an address shared by all or a part of image forming apparatuses connected with one another via communication means. On the other hand, what is meant by the word "particular address" is a unique address owned by each of the image forming apparatuses. To be specific, the "particular address" is an address given to each of the image forming apparatuses, and one "particular address" is different from another "particular address" so as to respectively correspond to the image forming apparatuses. Namely, data transmitted to a particular address can be processed only by an image forming apparatus having the particular address. On the other hand, data transmitted to a virtual address can be processed by all image forming apparatuses having the virtual address.

Figure 2:
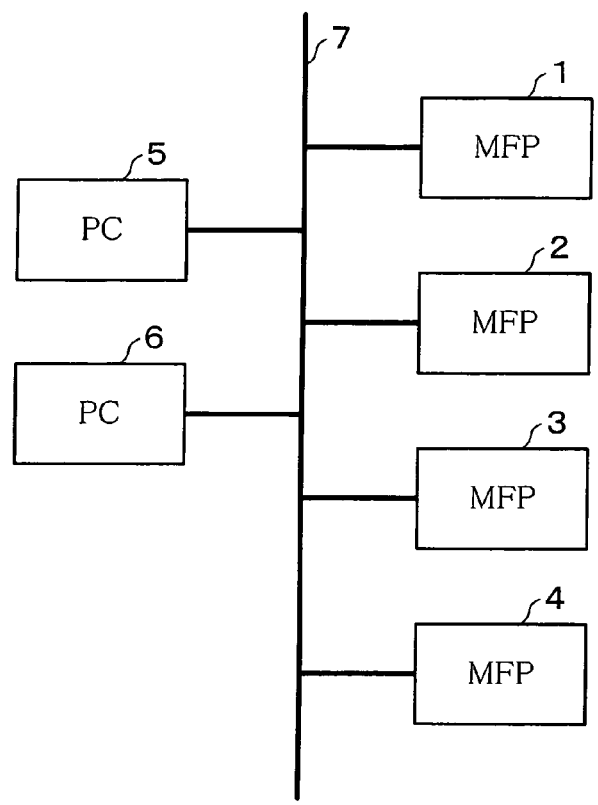
FIG. 2 is a block diagram schematically illustrating a structure of a network printer according to the present embodiment.

FIG. 2 is a block diagram schematically illustrating a structure of a network printer according to the present embodiment. As illustrated in FIG. 2, in the network printer, PCs (Personal Computer) 5 and 6 are connected with MFPs (image forming apparatus; information processing device) 1 through 4 via a wired LAN (Local Area Network) (communication means) 7.

For the convenience of explanation, the PC 5 is explained as an example of a PC and the MFP 1 is explained as an example of an MFP except for a case of giving any limitation.

The PC 5 transmits a printing job to the MFP 1. Note that, the detailed structure of the PC 5 is publicly known, so that its detailed explanation is omitted.

The wired LAN 7 is a bus-type or a star-type. The bus-type LAN is, for example, 10BASE2/10BASE5 (IEEE802.3 CSMA/CD). The star-type LAN is, for example, an arrangement in which each PC and MFP are connected via 10BASE-T/100BASE-TX with a hub (not a switching hub) used as a repeater.

Figure 1:
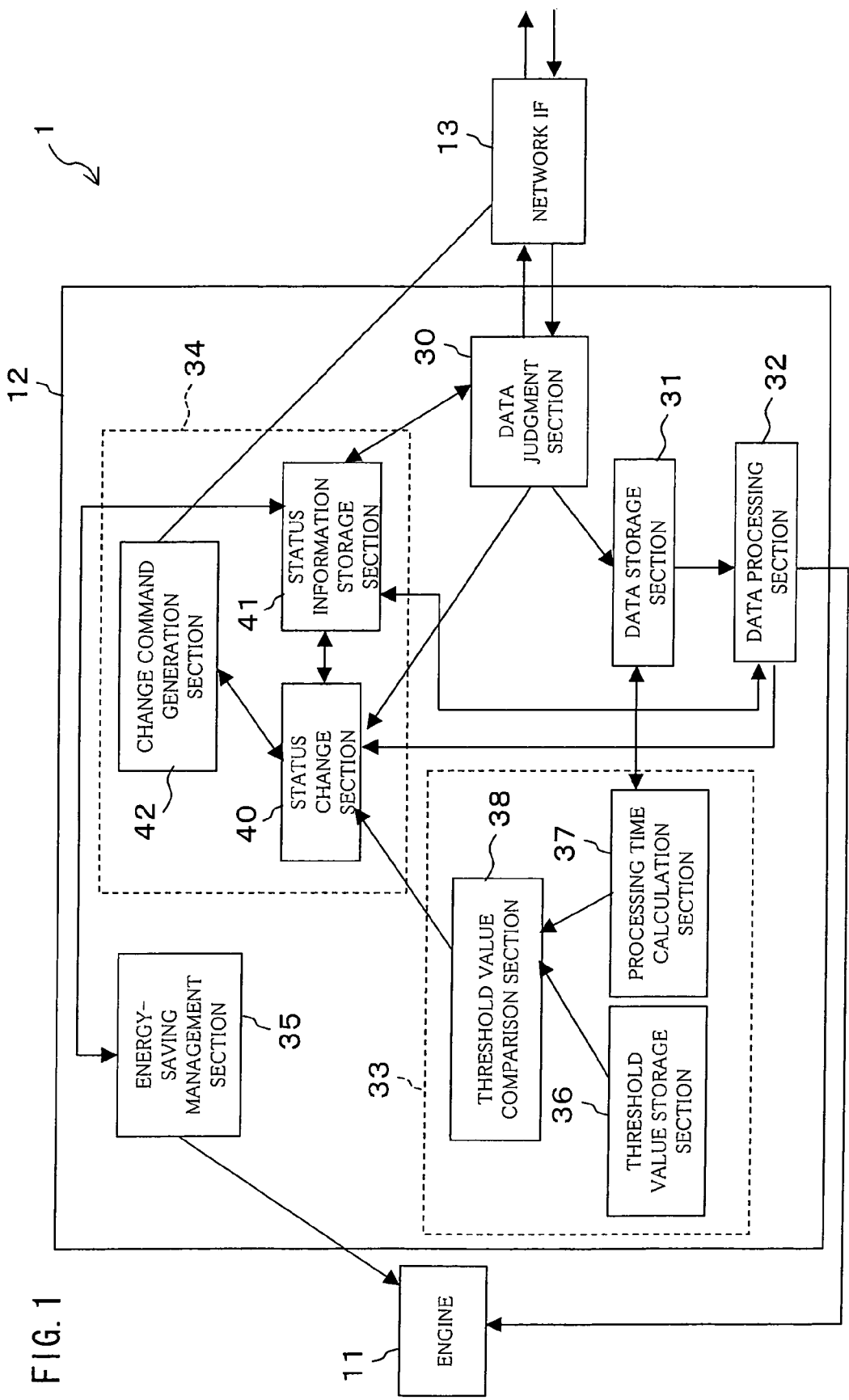
FIG. 1 is a block diagram schematically illustrating a structure of an MFP according to the present embodiment.

FIG. 1 is a block diagram schematically illustrating a structure of the MFP 1 according to the present embodiment. The MFP 1 includes an engine (image forming section) 11, a control section 12, and a network IF (interface) (transmission/reception section, reception means) 13. The detailed structure of the control section 12 is explained later.

What is meant by the word "engine" is an image forming section in the MFP 1, and the engine forms images based on data. The detailed structure of the image forming apparatus is publicly known, so that its explanation is omitted here.

The network IF 13 transmits/receives data to/from an external device such as the PC 5 via the wired LAN 7. To be specific, the network IF 13 receives data transmitted to the particular address and virtual address of the network IF 13. Further, the network IF 13 can transmit data or a later-mentioned status change command to a particular address of other MFP or PC. The detailed structure of the network IF 13 is explained below.

Figure 3:
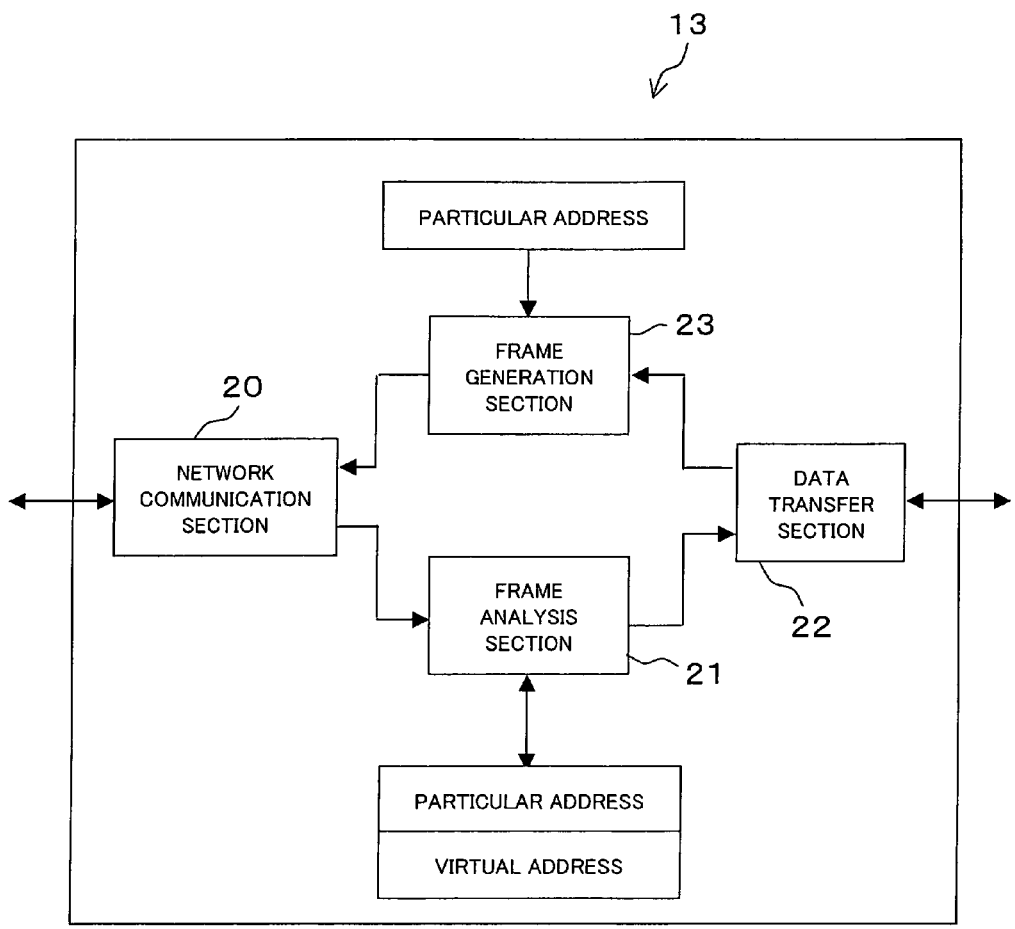
FIG. 3 is a block diagram schematically illustrating a structure of the network 1F illustrated in FIG. 1.

FIG. 3 is a block diagram illustrating a general structure of the network IF 13. The network IF 13 includes a network communication section 20, a frame analysis section 21, a data transfer section 22, and a frame generation section 23.

The network communication section 20 is connected with the wired LAN 7, and receives data (frame) from the network and transmits data (frame) to the network. To be specific, the network communication section 20 transmits/receives data to and from PCs (PCs 5 and 6) and other MFPs (MFPs 2 through 4) via the wired LAN 7.

The frame analysis section 21 receives data (frame) received by the network communication section 20, and analyses the data. To be specific, the frame analysis section 21 analyses whether received data is data transmitted to the MFP 1 or not, namely, whether the data is transmitted to the particular address of the MFP 1 or not, and whether the data is transmitted to the virtual address of the MFP 1 or not. At the time of the analysis, the frame analysis section 21 makes reference to a status flag stored in a status information storage section 41 (see FIG. 1) of the later-mentioned control section 12. When analysis of the data is finished, the frame analysis section 21 transmits the data transmitted to the particular address and the data transmitted to the virtual address to the data transfer section 22.

The data transfer section 22 transfers the data to the control section 12 of the MFP 1. Further, when the MFP 1 transmits the data to the wired LAN 7 (network), the data is transferred from the control section 12 to the data transfer section 22. The data transfer section transfers the data to the frame generation section 23. Namely, the data transfer section 22 allows transmission/reception of the data between (i) the control section 12 and (ii) the frame analysis section 21 and the frame generation section 23.

The frame generation section 23 generates transmission data (frame) using the particular address as a source address and generates transmission data obtained by incorporating the source address into data transmitted from the control section 12, and transmits the transmission data to the network communication section 20. The network communication section 20 transmits the transmission data to the network.

Here, the structure of the control section 12 is explained with reference to FIG. 1. The control section 12 controls the engine 11 and the network IF 13.

The control section 12 includes a data judgment section (registration processing section, registration means) 30, a data storage section (storage section, storage means) 31, a data processing section (data processing means) 32, a threshold value judgment section 33, a mediation section (status change processing section, status change means) 34, and an energy-saving management section 35. Note that the sections are function blocks realized in such a manner that a CPU (central processing unit) (not shown) executes a program stored in a storage device (not shown) and controls a peripheral circuit (not shown) such as an input/output circuit.

The data judgment section 30 analyzes data transmitted from the network IF 13 and determines a destination, to which the data is to be transmitted, based on the result of the analysis. To be specific, when the data judgment section 30 judges that data transmitted to the data judgment section 30 is a status change command, the data judgment section 30 transmits the status change command to the mediation section 34 (to be more specific, a status change section 40). Further, when the data judgment section 30 judges that data transmitted to the data judgment section 30 is data to be processed (referred to as a printing job hereinafter), the data judgment section 30 stores the printing job in the data storage section 31.

Further, when the data judgment section 30 judges that the transmitted data is a printing job, the data judgment section 30 determines whether or not to transmit the printing job to the data storage section 31, according to the status of the MFP. The data judgment section 30 judges whether or not to transmit the printing job to the data storage section 31 according to the status of the MFP set by the mediation section 34. Note that the status is explained later.

To be specific, the data judgment section 30 transmits all printing jobs transmitted to the particular address of the MFP to the data storage section 31. Further, the data judgment section 30 transmits a printing job transmitted to the virtual address to the data storage section 31, only when the status of the MFP (state set by the mediation section 34) is a later-mentioned active status or a standby status. Namely, a printing job transmitted to the virtual address is stored according to the status of the MFP.

Further, when transmitted data is status information transmitted from other MFP and showing the status of the other MFP, the data judgment section 30 transmits the status information to a status information storage section 41.

Further, when the data judgment section 30 receives a printing job transmitted to the virtual address, the data judgment section 30 transmits the particular address of the MFP to the PC from which the job has been transmitted. This is because the printing job transmitted to the virtual address is unclear as to which MFP processes the job. For that reason, when the printing job transmitted to the virtual address is received, the data judgment section 30 transmits the particular address of the MFP to the PC from which the job has been transmitted, thereby informing the PC of the MFP which has received the printing job.

The data storage section 31 stores a printing job transmitted from the data judgment section 30.

The data processing section 32 processes, according to a status set by the mediation section 34, a printing job stored in the data storage section 31 so as to correspond to setting of the engine 11 or a similar condition. To be specific, the data processing section 32 serially processes printing jobs transmitted to the particular address. The data processing section 32 is set so as to serially process the printing jobs transmitted to the virtual address when the status of the MFP is active or busy, and so as not to process the printing jobs when the status of the MFP is stand-by or off.

The threshold value judgment section 33 judges whether or not the amount of data or the number of data of printing jobs stored in the data storage section 31 is over a predetermined threshold value. What is meant by the word "the amount of data of printing jobs" is the amount of data to be printed which is indicated by a single printing job, and what is meant by the word "the number of data of printing jobs" is the number of printing jobs. Further, the threshold value can be set arbitrarily, and for example, set based on the threshold value of the processing ability of the data processing section 32. The detailed structure of the threshold value judgment section 33 is explained below.

The threshold value judgment section 33 includes a threshold value storage section 36, a processing time calculation section (calculation processing section, calculation means) 37, and a threshold value comparison section (comparison processing section, comparison means) 38.

The threshold value storage section 36 stores the threshold value. The threshold value may be set arbitrarily, or may be set according to, for example, the limit value of the processing ability of the data processing section 32. Note that when the threshold value is set according to the limit value of the processing ability of the data processing section 32, the threshold value judgment section 33 inquires about the limit value of the processing ability of the data processing section 32. To be specific, the threshold value judgment section 33 judges processing time from the processing ability of the MFP (data processing section 32), and sets, as the threshold, the longest standby time which is allowable. Note that the limit value of the processing ability is a value which does not allow further printing jobs to be processed within a predetermined time. Further, the threshold value may be a value unique to the device, or may be set arbitrarily by the operator (administrator).

Based on the amount of data or the number of data of a printing job stored in the data storage section 31, the processing time calculation section 37 calculates expected processing time which will be taken to complete processing of a stored printing job.

The threshold value comparison section 38 compares the expected processing time calculated by the processing time calculation section 37 with the threshold value stored in the threshold value storage section 36, and judges whether or not the expected processing time is larger than the threshold value.

In this way, the threshold value judgment section 33 judges whether or not an amount of data stored in the data storage section 31 is over the processing ability of the data processing section 32.

On the other hand, based on (a) the status change command transmitted from the data judgment section 30, (b) the result of comparison transmitted from the threshold value judgment section 33 (to be more specific, the threshold value comparison section 38), or (c) a notice of data processing completion which is transmitted from the data processing section 32, the mediation section 34 changes the status of the MFP 1 and transmits a status change command to other MFP which is connected with the MFP 1 via the wired LAN 7 and which can receive the data transmitted to the virtual address.

The mediation section 34 includes the status change section 40, the status information storage section (status information storage means) 41, and a change command generation section 42.

The status change section 40 judges whether or not the status of the MFP 1 is to be changed, based on (i) the result of comparison transmitted from the threshold value judgment section 33, the status change command transmitted from the data judgment section 30, or the notice of data processing completion which is transmitted from the data processing section 32, and (ii) status information stored in the status information storage section 41. Further, when the status of the MFP 1 is changed, the status change section 40 instructs the change command generation section 42 to generate a status change command. This is specifically explained below.

The status change section 40 changes the status of the MFP 1, based on the status change command, the result of comparison, or the notice of data processing completion. To be specific, when the MFP 1 is in an active status, the status of the MFP 1 is changed based on the result of comparison of the threshold value comparison section 38. Further, when the MFP 1 is in a standby status or off status, the status of the MFP 1 is changed based on the status change command. Further, when the MFP 1 is in a busy status, the status of the MFP 1 is changed based on the notice of data processing completion. Namely, the trigger for changing the status of the MFP 1 varies according to the status of the MFP 1.

The status information storage section 41 stores the status of the MFP 1, the particular address and status information of other MFP, the particular address of the PC, and the like. Namely, the status information storage section 41 stores the particular address of the PC connected with the MFP 1 via the wired LAN 7, and the particular address and status information of the other MFP that can receive data aimed at the virtual address, the data being transmitted to the MFP 1.

Status information of all MFPs (including the MFP 1) stored in the status information storage section 41 is rewritten based on the status change command to the MFP 1 which is transmitted from the status change section 40, or the status information concerning other MFP which is transmitted from the data judgment section 30.

The change command generation section 42 generates a status change command for changing the status of other MFP. The change command generation section 42 generates the status change command, based on the instruction from the status change section 40.

The energy-saving management section 35 controls the engine 11, based on the status information of the MFP 1 which is stored in the status information storage section 41. To be specific, when the MFP 1 is in the off status, the energy-saving management section 35 turns off the power of the engine 11. When the status of the MFP 1 is changed from the off status to the standby status, the energy-saving management section 35 turns on the power of the engine 11, and causes the engine to be on standby.

Here, each status of the image forming apparatus is detailed.

All the MFPs that are connected with the wired LAN 7 and that can receive data transmitted to the virtual address are set in an active status or non-active status. To be more specific, the non-active status is classified into three statuses: the standby status, busy status, and off status. Namely, all the MFPs according to the present embodiment that can receive data transmitted to the virtual address are set in any one of the four statuses: the active status, the standby status, the busy status and the off status. Note that setting methods of the statuses are explained later.

The active status is a status in which additional registration of a printing job transmitted to the virtual address and serial processing of a printing job that has been additionally registered are possible. Namely, an image forming apparatus in the active status can not only receive the printing job transmitted to the virtual address but also process the received printing job.

What is meant by the word "non-active status" is a status other than the active status. To be specific, the "non-active status" is a status in which it is impossible to perform at least one of (i) additional registration of a printing job transmitted to the virtual address and (ii) serial processing of a printing job that has been additionally registered. To be more specific, the non-active status is classified into three statuses: (1) the standby status prior to the active status, (2) the busy status in which it is impossible to perform additional registration of a printing job transmitted to the virtual address but it is possible to perform serial processing of a printing job that has been additionally registered, and (3) the off status in which neither of additional registration of a printing job transmitted to the virtual address nor serial processing of a printing job that has been additionally registered can be performed.

Note that the standby status is set so as to be prior to the active status, and its setting varies according to the kind of the information processing device. To be specific, when the information processing device is an MFP or a network facsimile, the standby status may be arranged so that it is possible to perform additional registration of a printing job transmitted to the virtual address but it is impossible to perform serial processing of a printing job that has been additionally registered, or so that neither additional registration of a printing job transmitted to the virtual address nor serial processing of a printing job that has been additionally registered can be performed but the engine is in an operating condition. Particularly, when the information processing device is an MFP, a network facsimile, or the like having image forming function, it takes more time to operate the engine for realizing the image forming function than to process data. Therefore, when the information processing device is an MFP, a network facsimile, and the like, it is more preferable that the standby status prior to the active status is set so that the engine can immediately start operating. Further, when it takes much time for the information processing device to perform data processing, it is preferable that the standby status is set so that it is possible to perform additional registration of a printing job transmitted to the virtual address but it is impossible to perform serial processing of a printing job that has been additionally registered.

Further, in either status, the MFP can process a printing job transmitted to the particular address. In other words, in either status, the MFP receives the printing job transmitted to the particular address. Namely, for example, in the off status, the power is not completely turned off, and it is possible to receive the transmitted printing job.

Figure 4:
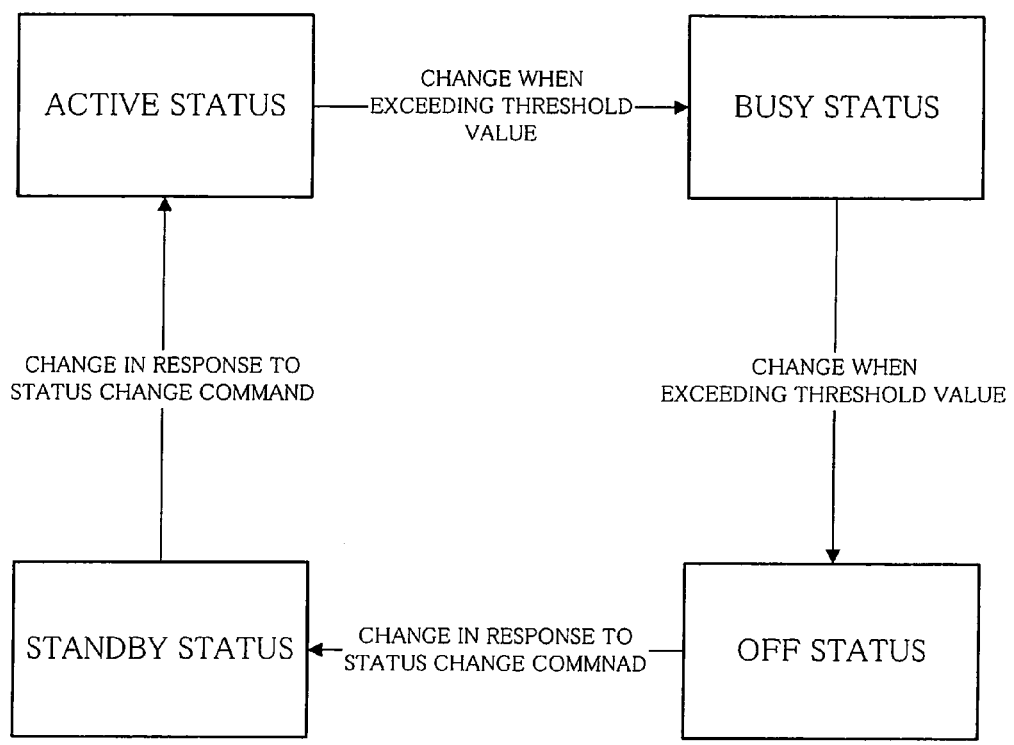
FIG. 4 illustrates transition of each status in the MFP according to the present embodiment.

FIG. 4 is a view illustrating transition of the statuses. When statuses of information processing are classified into the above four statuses, each status changes according to specific conditions, as illustrated in FIG. 4.

To be specific, the active status changes into the busy status, the busy status changes into the off status, the off status changes into the standby status, and the standby status changes into the active status.

The change from the active status to the busy status is triggered by the result of comparison of the threshold value comparison section 38. Namely, the active status is changed when the threshold value comparison section 38 judges that data stored in the data storage section 31 cannot be processed. To be specific, when the status change section 40 receives, from the threshold value comparison section 38, the result of comparison saying that it takes more time to process data stored in the data storage section 31 than a time indicated by the threshold value stored in the threshold value storage section 36, the status change section 40 changes the status of the MFP 1 stored in the status information storage section 41.

The change from the busy status to the off status is triggered by the notice of data processing completion from the data processing section 32. Namely, the busy status is changed when the data processing section 32 completes processing of data stored in the data storage section 31. To be specific, when the status change section 40 receives the notice of data processing completion from the data processing section 32, the status change section 40 changes the status of the MFP 1 which is stored in the status information storage section 41.

The change from the standby status to the active status is triggered by the change of an MFP from the active status to the busy status. Namely, the change into the active status accompanies the change of the status of the MFP that was in the active status just before, and the MFP transmits a status change command to other MFP in the standby status. When the other MFP in the standby status receives the status change command, the other MFP changes the status of the other MFP from the standby status into the active status.

The change from the off status into the standby status is triggered by the change of an MFP in the active status into the busy status. Namely, the change into the standby status accompanies the change of the status of the MFP that was in the active status just before, and the MFP transmits a status change command to other MFP in the off status. When the other MFP in the standby status receives the status change command, the other MFP changes the status of the other MFP from the off status into the standby status.

Note that the change from the off status into the standby status may be arranged so as to be triggered by transmission of a status change command from an MFP that has newly been in the active status to other MFP in the off status.

Figure 5:
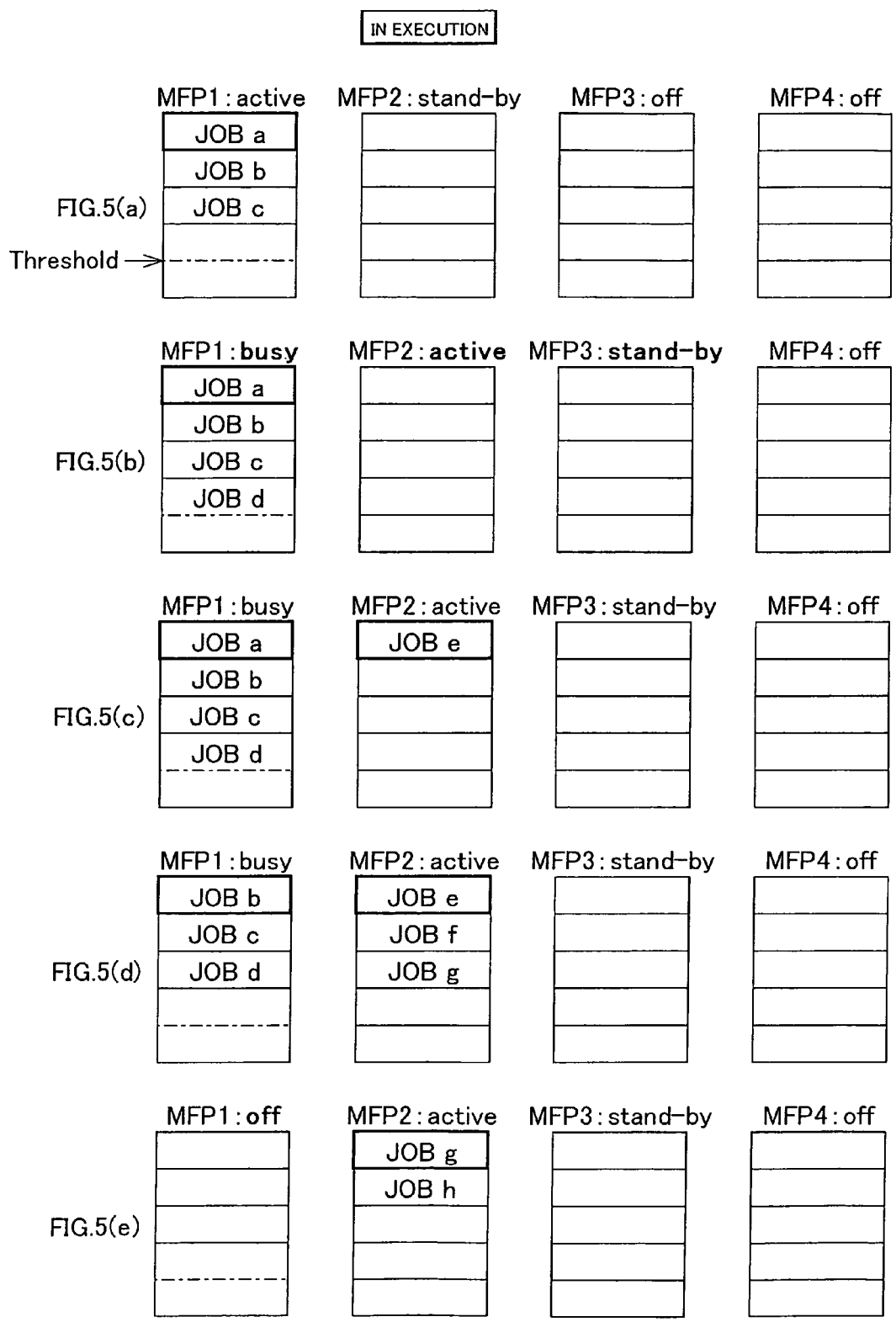
FIGS. 5(a) through 5(e) illustrate methods for changing a status of each MFP based on a threshold value according to the present embodiment.

In the present embodiment, at least one MFP out of MFPs that can receive printing jobs transmitted to the virtual address is set into the active status. The statuses of other MFPs are changed by status change commands from the MFP in the active status. With reference to FIG. 5, the following explains the case where the MFP 1, an MFP 2, an MFP 3, and an MFP 4 are in the active status, the standby status, the off status, and the off status respectively. Note that FIG. 5 is a view illustrating a method for changing the statuses of each MFP, based on the threshold value in the present embodiment. Note that a shaded printing job in FIG. 5 indicates that the job is in execution, namely, the job is processed in the data processing section 32. Further, the MFP 1 in FIG. 5(a) stores a job a, a job b, and a job c that are printing jobs sequentially disposed from the top. Further, for the convenience of explanation, the threshold value of the MFP 1 is a time point when the number of waiting printing jobs is four.

Each MFP processes the printing jobs sequentially from the top. Further, the printing jobs are processed in the order of storage in (transfer to) the data storage section 31. Therefore, in FIG. 5, a printing job listed in a lower part was stored later than a printing job listed in an upper part.

As illustrated in FIG. 5(a), the printing jobs (the jobs a, b, and c) transmitted to the virtual address are received by the MFP 1, and the received data is stored in the data storage section 31. In this way, a printing job transmitted to the virtual address is received by the MFP 1 in the active status. In the data storage section 31 of the MFP (here, the MFP 1) in the active status, the printing jobs are accumulated. The mediation section 34 receives a new printing job (job d), so that the mediation section 34 receives, from the threshold value judgment section 33, the result of comparison saying that the amount of the printing jobs stored in the data storage section 31 is so large that the processing ability of the data processing section 32 cannot process, or the amount of the printing jobs stored in the data storage section 31 is over a predetermined threshold value. When the mediation section 34 receives the result, the mediation section 34 changes the status of the MFP 1 into the busy status, and instructs the data processing section 32 to continue to process the accumulated printing jobs. The mediation section 34 transmits a status change command to the MFP 2 in the standby status. Further, at that time, the mediation section of the MFP 1 that is in the active status (or was in the active status just before) transmits a status change command to the MFP 3 in the off status. In response to the status change command, the MFP 3 changes the status of the MFP 3 from the off status into the standby status (see FIG. 5(b)).

A printing job (job e) subsequently transmitted to the virtual address is received by the MFP 2 in the active status. At that time, the MFP 1 cannot receive the printing job transmitted to the virtual address, but serially processes the already accumulated printing jobs (jobs a, b, and c) (see FIG. 5(c)). Printing jobs (jobs e, f, and g) further newly transmitted to the virtual address are received by the MFP 2 in the active status (see FIG. 5(d)).

When the printing jobs accumulated in the MFP 1 in the busy status are completely processed, the data processing section 32 transmits a notice of data processing completion to the mediation section 34. When the mediation section 34 receives the notice of data processing completion, the mediation section 34 changes the status of the MFP 1 into the off status (see FIG. 5(e)).

In this way, a printing job transmitted to the virtual address (including that of the MFP 1) is transmitted to and processed in an MFP in the active status (at least one MFP never fails to be in the active status). Further, when the MFP in the active status judges that the amount of the printing jobs is so large that its processing ability cannot process, the MFP in the active status instructs other MFP to be in the active status. As a result, for example, it is possible to avoid such a situation that: a single MFP has to excessively process jobs, which causes delay of the processing.

At that time, two MFPs in the off status exist, and the MFP 3 out of the two is changed into the standby status in the explanation. When one MFP out of a plurality of MFPs in the off status is changed into the standby status, each MFP should be given priority in advance. As a result, an MFP whose status is subsequently changed can be determined. Specific examples of a method for changing an MFP from the off status into the standby status include: (1) a method such as a round-robin method in which the order MFPs changed into the standby status is determined in advance in a group and the change from the off status into the standby status is performed based on the determined order; or (2) a method in which, at the time point when an MFP in the active status changes into the busy status, the MFP transmits, to all MFPs in the off status, a status change command for causing the change into the standby status, and the MFPs in the off status exchange data concerning the statuses and abilities of the MFPs, and the MFP having the highest ability is made into the standby status.

In the above explanation, only printing jobs transmitted to the virtual address are described. Here, printing jobs transmitted to particular addresses are explained. Printing jobs transmitted to a particular address in an MFP in the active status are accumulated in the data storage section 31 of the MFP in the active status in the order of transmission. Namely, in the MFP in the active status, a printing job transmitted to the virtual address and a printing job transmitted to the particular address are stored in the data storage section 31 in the order of transmission. Next, a printing job transmitted to the particular address in an MFP in the busy status is accumulated at the end of the accumulated printing jobs.

Further, a printing job transmitted to the particular address in an MFP in the standby status or off status is immediately processed. When the MFP in the off status processes a printing job transmitted to the particular address, the MFP in the off status causes the data processing section 32 and the engine 11 to function, still maintaining the off status. Namely, the MFP in the off status causes the engine to function so as to process the printing job transmitted to the particular address, still maintaining a status corresponding to the virtual address in the off status. When processing of the printing job transmitted to the particular address is completed, the power of the engine is turned off.

In this way, processing of a printing job transmitted to the virtual address is different according to the status of an MFP. On this account, it is not necessary always to turn on the power of all MFPs. Namely, by causing at least one MFP to be always in the active status, the MFP in the active status can process the printing job transmitted to the virtual address. As a result, other MFP can be set in a status whose consumption of power is lower than that of the active status. Therefore, it is possible to realize energy-saving unlike conventional network printer systems.

Further, the MFP in the active status can grasp the status of the MFP itself, and at the same time instruct other MFP to change into the active status, and therefore a server exclusive to MFPs is unnecessary, unlike conventional art. Therefore, for example, unlike the arrangement in which an exclusive server assigns printing jobs to a plurality of MFPs, a server does not manage printing jobs together, and accordingly it is possible to avoid a situation in which processing of the printing jobs cannot be performed when the server has a breakdown as with conventional art.

Figure 6:
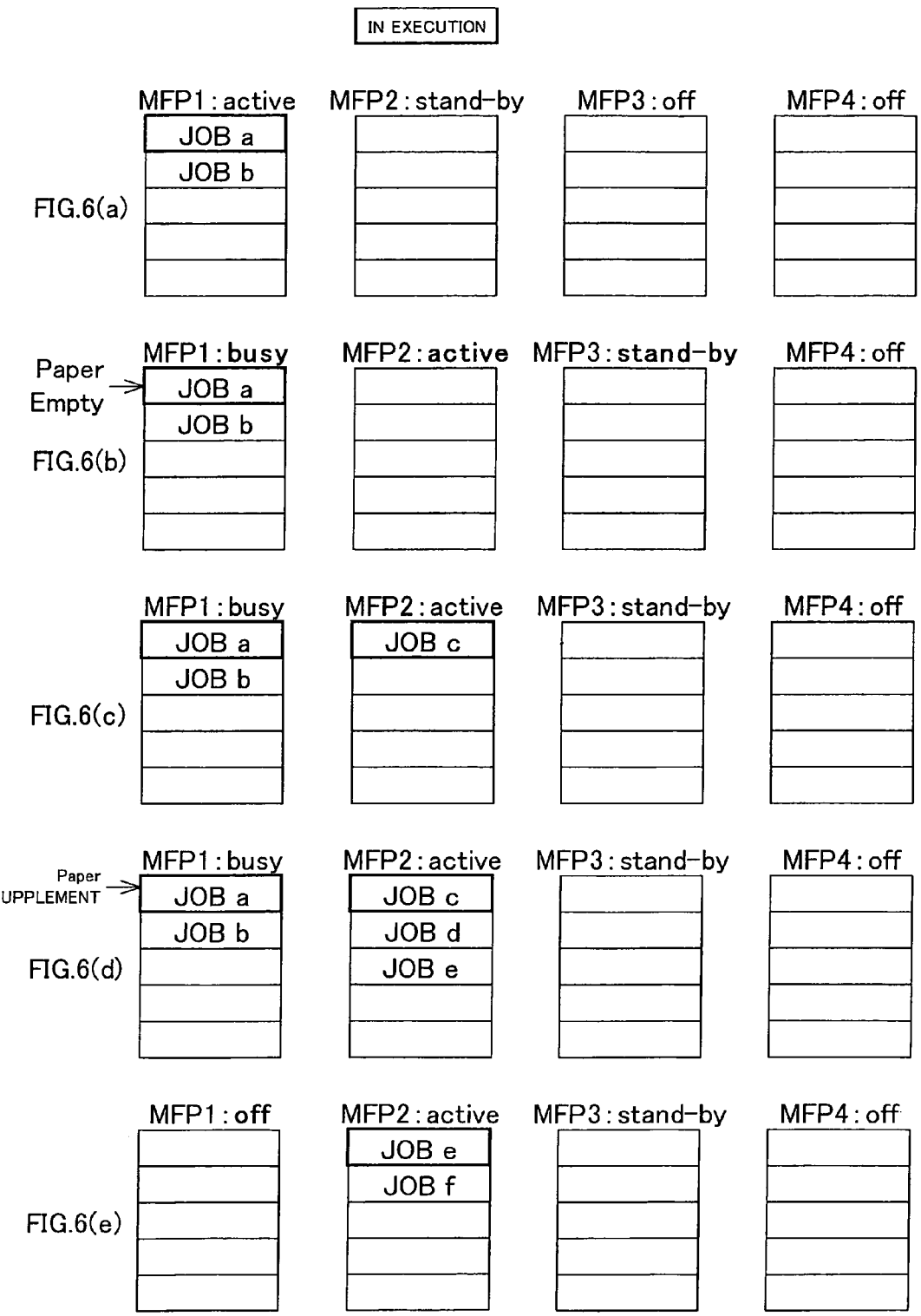
FIGS. 6(a) through 6(e) illustrate changes of a status of each MFP in a case where a paper to print a printing job runs short in the MFP in the active status.

FIG. 6 is a view illustrating changes of the statuses of each MFP in a case where papers for printing data of the printing job run short in the MFP in the active status. With reference to FIG. 6, the following explains the changes of the statuses of each MFP in a case where the MFP in the active status is temporarily incapable of being used. Note that for convenience of explanation, it is assumed that all printing jobs (jobs) are transmitted to the virtual address. Further, for example, the MFP 1 illustrated in FIG. 6(a) stores jobs a and b that are printing jobs subsequently disposed from the top. Further, as for an initial status of each MFP, the MFP 1 is in the active status, the MFP 2 is in the standby status, and the MFPs 3 and 4 are in the off status.

First, as illustrated in FIG. 6(a), printing jobs (jobs a and b) transmitted to the virtual address is stored in the MFP 1 in the active status. As illustrated in FIG. 6(b), when the MFP 1 in the active status processes a printing job (job a) and when papers for printing (processing) data to be printed in the printing job run short, the MFP 1 judges that it is impossible to process the printing job, and changes the status of the MFP 1 from the active status into the busy status. To be specific, receiving breakdown information transmitted from image forming means (image forming section) such as the engine 11, the status change section 40 of the MFP 1 changes status information of the MFP 1 stored in the status information storage section 41 from the active status into the busy status. Then, the status change section 40 transmits, to other MFPs (MFPs 2 and 3), a status change command for changing the statuses of the other MFPs. To be specific, the status change section 40 causes the change command generation section 42 to function, so as to transmit the status change command to other MFPs. Receiving the status change command, the MFP 2 changes its state from the standby status into the active status. Further, receiving the status change command, the MFP 3 changes its state from the off status into the standby status.

The MFP 2 changed from the standby status into the active status receives a printing job (job c) transmitted to the virtual address (see FIG. 6 (c)). When papers are supplied to the MFP 1 having no papers for printing, the MFP 1 starts processing of the remaining printing jobs (a and b), still maintaining the busy status. Further, the MFP 2 receives a printing job transmitted to the virtual address, and serially processes accumulated printing jobs (see FIG. 6 (d)).

Completing the processing of the accumulated printing jobs, the MFP 1 in the busy status changes its state from the busy status into the off status (see FIG. 6 (e)).

In this way, in the MFP according to the present embodiment, receiving the breakdown information from the image forming means, the status change section 40 changes its state from the active status into the busy status, and transmits, to other MFPs, the status change command for changing the statuses of the other MFPs. As a result, it is possible to prevent the MFP that has had a breakdown from being in the active status. Namely, when an MFP has a breakdown, a printing job is transmitted not to the broken down MFP but to other MFPs, with a result that it is possible to suppress delay of processing of a printing job caused by the breakdown.

Note that only data transmitted to the virtual address is explained above. However, all MFPs can process a printing job transmitted to the particular address no matter which status of the four statuses the MFPs are in.

For example, when an MFP in the standby status processes a printing job transmitted to the particular address, and when the MFP has a breakdown, the MFP transmits a status change command to an MFP in the off status.

Next, the following explains function of the MFP at a time when the power is turned on.

Figure 7:
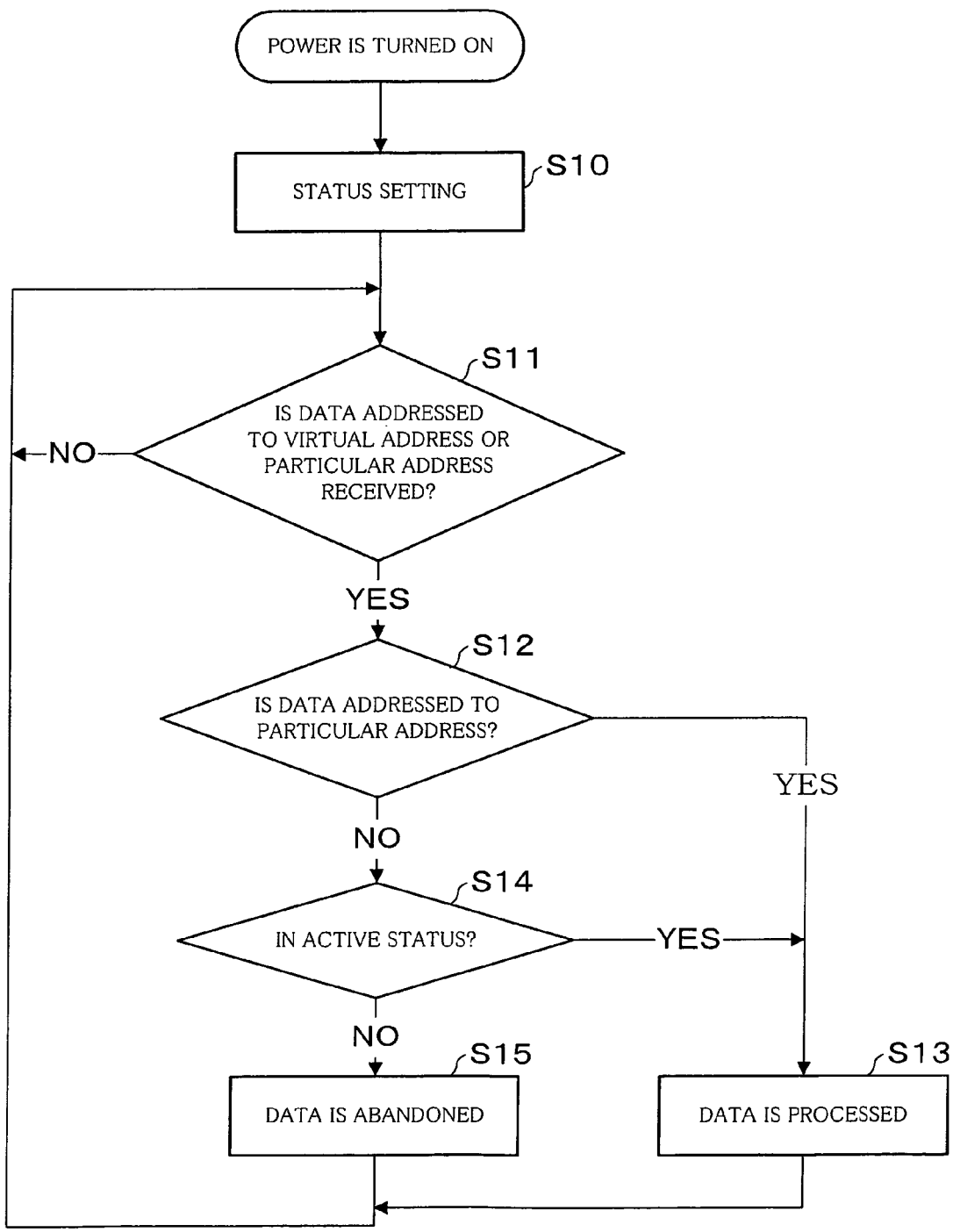
FIG. 7 is a flowchart illustrating a flow of a series of operations of the MFP from a time when the power is turned on to a time when the MFP receives data.

FIG. 7 is a flow chart illustrating a flow of a series of functions of an MFP from a time when the power is turned on to a time when the MFP receives data. The function of a particular MFP is explained with reference to FIG. 7. Note that in the below explanation based on the flow chart, a case where the status of the MFP is set into the active status or the off status (non-active status) is explained.

First, when a user turns on the power of the MFP, the status change section 40 of the MFP causes the change command generation section 42 to function, so as to set the status of the MFP (step 10: Referred to as "S10" hereinafter). To be specific, for example, the status change section 40 causes the change command generation section 42 and the network IF 13 to function, so as to send a request for a response to the virtual address. Namely, the status change section 40 transmits suitable data to the virtual address. When there is no response for a predetermined time, namely, when the MFP judges that other MFPs do not receive the transmitted data, the status change section 40 causes the status information storage section 41 to function, so as to set the status of the MFP into the active status. On the other hand, when a response to data transmitted to the virtual address comes from other MFPs, the status change section 40 sets the status of the MFP into the off status. At that time, a status change command is transmitted to the particular address of the other MFPs. In this way, the active status and off status are determined. The MFP in the off status maintains the off status until receiving the status change command transmitted from the MFP in the active status. Further, the status change section 40 of the MFP in the active status considers the remaining MFPs to be in the off status, and stores the statuses of the MFPs into the status information storage section 41.

Next, the data judgment section 30 judges whether or not data is transmitted via the network IF 13 (S11). In the LAN 7, packets having a variety of destinations flow. However, only data whose destination is the particular address of the MFP set in the network IF 13 and data whose destination is the virtual address of the MFPs including the MFP are transmitted to the data judgment section 30, and data whose destination is other address is abandoned in the network IF 13.

When the data judgment section 30 judges in S11 that data has been transmitted (YES in S11), the data judgment section 30 analyzes the data, and judges whether or not the destination address of the data is the particular address (S12). Namely, the data judgment section 30 judges whether or not the received data is transmitted to the particular address.

When the data judgment section 30 judges in S12 that the destination address of the transmitted data is the particular address (YES in S12), the data judgment section 30 analyzes the contents of the data, and processes the data (S13). To be specific, when the data is a status change command, the data is transmitted to the information change section 40. Further, when the data is a printing job, the data is transmitted to the data storage section 31. When processing of data is completed, the processing by the data judgment section 30 returns to S11.

On the other hand, when the data judgment section 30 judges in S12 that the destination address of the received data is not the particular address (NO in S12), the data judgment section 30 judges that the received data is addressed to the virtual address, and, referring to the status information storage section 41, judges whether or not the status of the MFP is the active status (S14).

When the data judgment section 30 judges in S14 that the status of the MFP is the active status (YES in S14), the data judgment section 30 processes the received data (S13). When processing of data is completed, the processing by the data judgment section 30 returns to S11.

On the other hand, when the data judgment section 30 judges in S14 that the status of the MFP is not the active status (NO in S14), the data judgment section 30 abandons the received data (S15). Then, the processing by the data judgment section 30 returns to S11.

In this way, out of data transmitted to the particular address and the virtual address, data transmitted to the particular address can be used just like in conventional art, by processing the data regardless of the status of the MFP. Further, when it is desired to process effectively without specifying an MFP to process, transmission of data to the virtual address allows for more effective processing.

Note that in the explanation, in S 14, when the data judgment section 30 judges that the transmitted data is not addressed to the particular address, the data judgment section 30 judges that the data is addressed to the virtual address. This is because the network IF 13 transmits, to the data judgment section 30, only the data addressed to the virtual address and the data addressed to the particular address.

Therefore, for example, in a case where the network IF 13 transmits all data to the data judgment section 30, the data judgment section 30 performs not only the above-explained judgment but also judgment in S14 on whether the transmitted data is addressed to the virtual address. The data judgment section 30 processes data in S 13, only when the status of the MFP is the active status and the transmitted address is data addressed to the virtual address.

Figure 8:
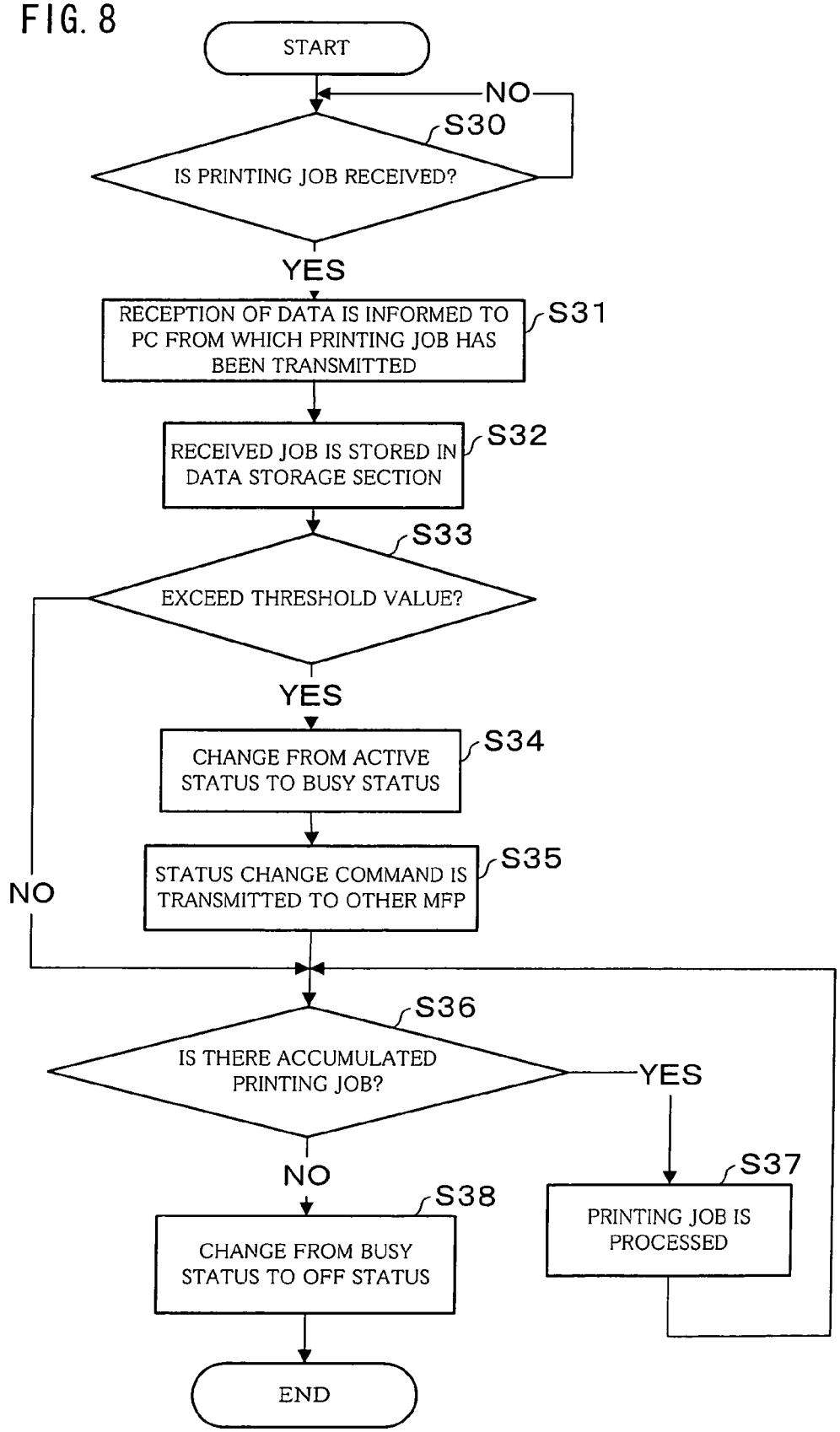
FIG. 8 is a flowchart illustrating processing of a printing job and a change of each status in the MFP in the active status.

FIG. 8 is a flow chart illustrating processing of a printing job and a change of statuses in an MFP in the active status. The processing of a printing job and the change of statuses in the MFP in the active status is explained below with reference to FIG. 8. Note that for convenience of explanation, processing of a printing job transmitted to the virtual address is explained below.

First, the data judgment section 30 analyzes data transmitted to the virtual address, and judges whether the data is a printing job or not. Namely, the data judgment section 30 judges whether the printing job is received or not (S30). Note that when the status of the MFP is the off status or the busy status, a printing job transmitted to the virtual address is not received. Further, as mentioned later, in a case where the MFP in the standby status is set so as to store a printing job, only the step S30 and a later-mentioned step S32 are performed.

Next, when a printing job is received in S30, the data judgment section 30 analyzes the printing job and specifies a PC from which the printing job has been transmitted. Then, the data judgment section 30 causes the network IF 13 to function so as to inform the PC of the particular address of the MFP (particular address of the MFP having received the printing job) and reception of the printing job. This is because an MFP which processes a printing job transmitted to the virtual address is uncertain. Further, this is because it is impossible to chase the printing job by using the virtual address when an MFP in malfunction (including exceeding the threshold value) is not in the active status.

The data judgment section 30 stores the received printing job in the data storage section 31 (S32).

Next, when the printing job is stored in the data storage section 31 in S32, the threshold value judgment section 33 judges whether the printing job stored in the data storage section 31 exceeds a certain threshold value (S33). To be specific, the processing time calculation section 37 calculates an expected processing time, based on the total amount (data amount or data number) of printing jobs stored in the data storage section 31. Then, the threshold value comparison section 38 compares the expected processing time calculated by the processing time calculation section 37 with the threshold value stored in the threshold value storage section 36. When the expected processing time is larger than the threshold value, it is judged that the expected processing time exceeds the threshold value. The result of the judgment is transmitted to the mediation section 34.

When the threshold value judgment section 33 judges in S33 that the printing job stored in the data storage section 31 exceeds a certain threshold value (YES in S33), the mediation section 34 changes the status of the MFP from the active status to the busy status (S34). To be specific, the status change section 40 transmits a status change command to the status information storage section 41. The status information storage section 41 that has received the status change command rewrites information concerning the status of the MFP from the active status to the busy status, based on the status change command.

Subsequently, the mediation section 34 transmits, to other MFPs, a status change command saying that the statuses of the other MFPs are changed (S35). To be specific, the status change section 40 determines an MFP whose status is to be changed, based on the statuses of the other MFPs stored in the status information section 41. Then, the status change section 40 causes the change command generation section 42 to generate the status change command, and transmits the status change command to the MFP whose state is to be changed.

Note that in the present embodiment, the MFP to which the mediation section 34 transmits the status change command is an MFP in the standby status and one of MFPs in the off status. Namely, the mediation section 34 determines the MFP, to which the status change command is to be transmitted, out of a plurality of MFPs in the off status. A method for determining one MFP out of the plurality of MFPs in the off status is, for example, a method in which the order is determined in advance, or a method in which the MFP having the highest processing ability out of the MFPs in the off status is selected.

Next, when the data processing section 32 detects that the status of the MFP changes from the active status to the busy status, the data processing section 32 judges whether or not printing jobs to be processed are accumulated in the data storage section 31. To be specific, the data processing section 32 can recognize that the status of the MFP is changed, based on the status of MFP stored in the status information storage section 41. Note that the data processing section 32 processes the printing jobs stored in the data storage section 31 in the order of storage, regardless of the judgment.

When the data processing section 32 judges in S36 that accumulated printing jobs exist (YES in S36), the data processing section 32 serially processes the accumulated printing jobs.

On the other hand, when the data processing section 32 judges in S36 that accumulated printing jobs do not exist (NO in S36), the data processing section 32 transmits to the mediation section 34 a notice of data processing completion. The mediation section 34 changes the status of the MFP from the busy status to the off status (S38). To be specific, when the status change section 40 receives the notice of the data processing completion from the data processing section 32, the status change section 40 rewrites information concerning the status of the MFP stored in the status information storage section 41. A series of processings are completed.

Further, the MFP whose state is changed transmits to other MFPs status information indicating that the status of the MEP is changed, when the status of the MEP is changed. The explanation is omitted in the flow chart.

In this way, the MFP in the active status changes its status, based on the printing job stored in the data storage section 31.

Next, status change processing of an MFP that is performed based on the status change command transmitted in S35 is explained below.

Figure 9:
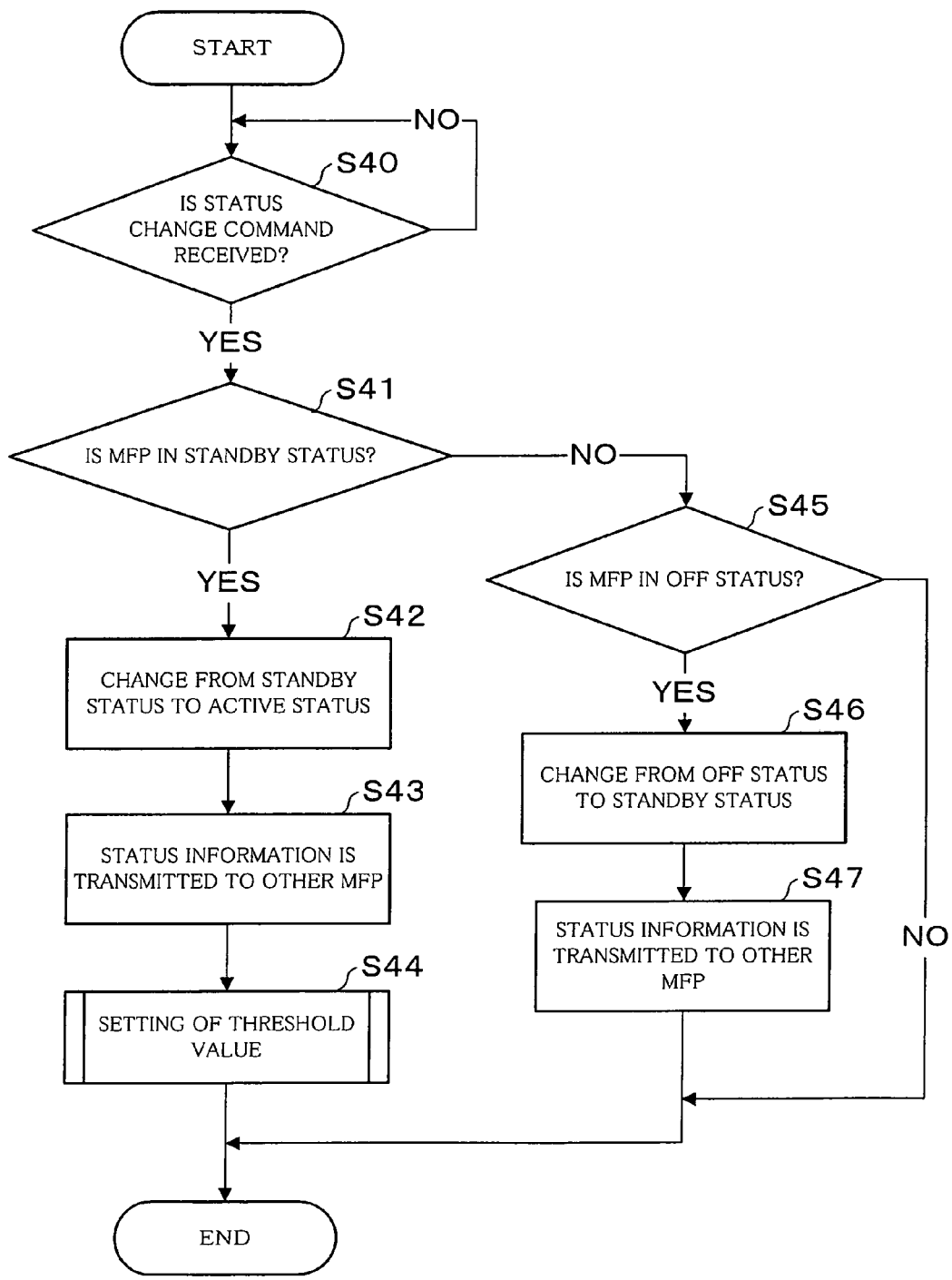
FIG. 9 is a flow chart illustrating a series of a flow of status change processing in which the status of the MFP is changed based on a status change command from other MFP.

FIG. 9 is a flow chart illustrating a series of a flow of status change processing in which the status of the MFP is changed based on the status change command from other MFP.

First, the data judgment section 30 judges whether the status change command from other MFP is transmitted or not (S40). Note that the status change command is transmitted to an MFP in the standby status and a plurality of MFPs in the off status. This has been explained above.

When the status change command is transmitted, the data judgment section 30 transmits the status change command to the mediation section 34 (to be specific, the status change section 40). The mediation section 34 judges whether the status of the MFP is the standby status or not (S41). To be specific, the status change section 40 gives judgment from the status of the MFP stored in the status information storage section 41.

When the mediation section 34 judges that the status of the MFP is the standby status (YES in S41), the mediation section 34 changes the status of the MFP from the standby status into the active status (S42). To be specific, the status change section 40 changes the information of the status of the MFP stored in the status information storage section 41 from the standby status into the active status.

Next, the mediation section 34 transmits, to other MFPs, status information indicating that the status of the MFP has been changed (S43). Based on the status information, the other MFPs rewrite (update) status information storage sections that store the status of the MFP from which the status information has been transmitted.

Then, the mediation section 34 causes the threshold value judgment section 33 to function so as to perform setting of a threshold value (S44). A series of processings are completed. The setting of a threshold value is explained later.

On the other hand, when the data judgment section 30 judges in S41 that the MFP is not in the standby status (NO in S41), the data judgment section 30 judges whether the status of the MPF is the off status or not (S45).

When the data judgment section 30 judges that the status of the MFP is the off status (YES in S45), the mediation section 34 changes the status of the MFP from the off status into the standby status (S46). The mediation section 34 transmits to the other MFPs status information indicating that the status of the MFP has been changed (S47). A series of processings are completed.

Further, when the data judgment section 30 judges in S45 that the status of the MFP is not the off status (NO in S45), the processing is completed.

Figure 10:
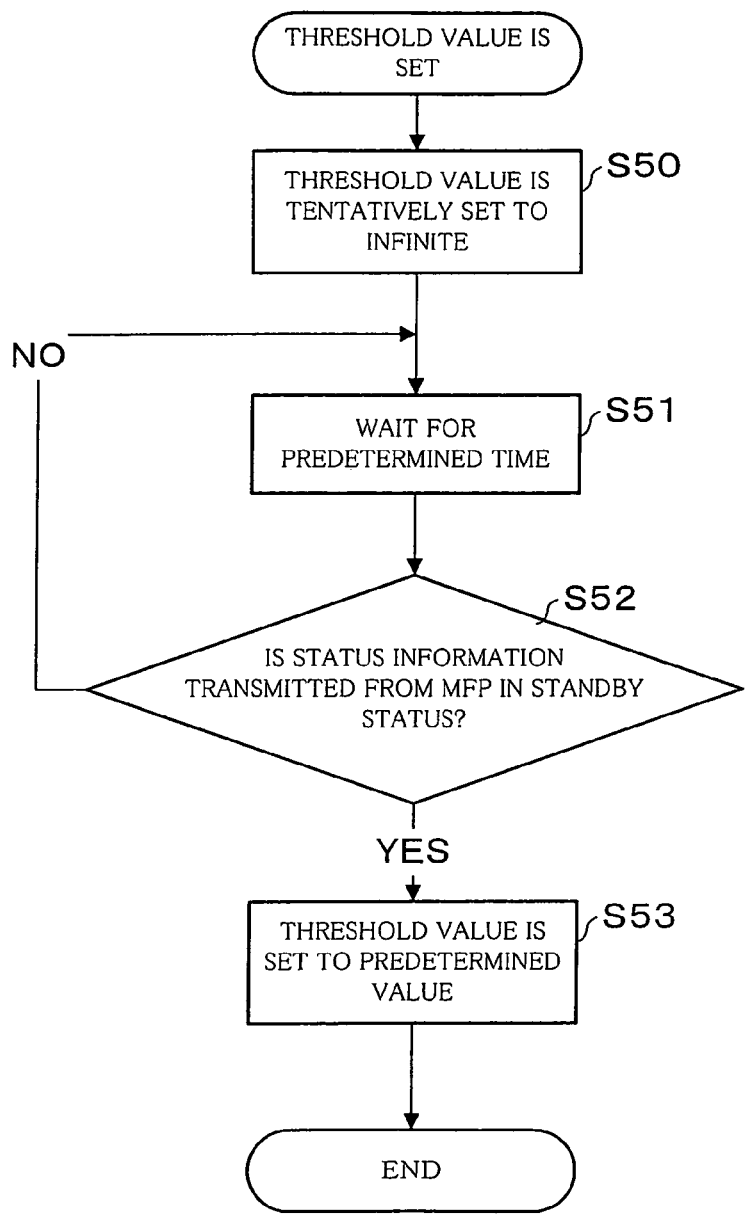
FIG. 10 is a flowchart illustrating a series of a flow of setting a threshold value.

Here, the setting of a threshold value is explained with reference to FIG. 10. FIG. 10 is a flow chart illustrating a series of a flow of the setting of a threshold value.

First, the mediation section 34 tentatively sets the threshold value stored in the threshold value storage section 36 to infinite (S50). The mediation section 34 ascertains that a predetermined time has passed (S51), and judges whether or not status information is transmitted from the MFP whose state has been changed into the standby status in S46 (S52). When it is ascertained that the status information is transmitted (YES in S52), the mediation section 34 sets the threshold value stored in the threshold value storage section 36 to a predetermined value (S53). The processing is completed. Further, when it is judged that the status information is not transmitted (NO in S52), the processing returns to S51.

By setting a threshold value in this way, it is possible to remove limitation to a threshold value so as to prevent a change of the active status, during the time when the standby status cannot be selected since no MFP is in the off status.

Note that the above explanation describes a flow of processing in which the status of the MFP is set as two kinds of statuses: the active status and the off status (non-active status). However, the status of the MFP is not limited to the two statuses, and may include the busy status and the standby status.

Figure 11:
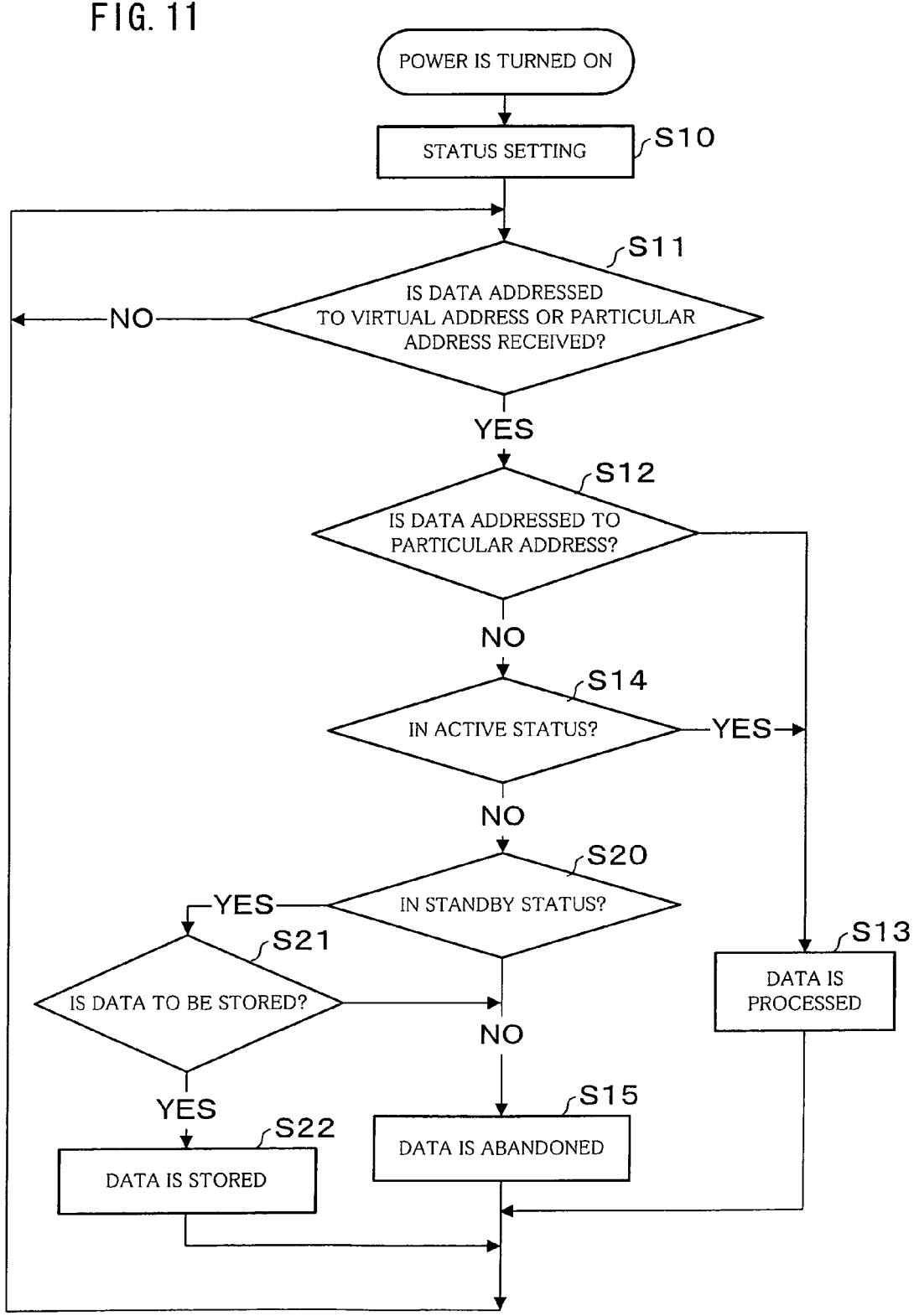
FIG. 11 is a flowchart illustrating processing of the active status, the standby status, busy status, and the off status at a time when data is transmitted, in a case where the status of the MFP is classified into the above four statuses.

FIG. 11 is a flow chart illustrating processing of the active status, the standby status, and the off status at a time when data is transmitted, in a case where the status of the MFP is set as any one of the statuses. Note that processing having the same step as the above description is given the same step number, and detailed explanation thereof is omitted here. The below explanation describes an arrangement in which the standby status is set so as to store data.

First, when a user turns on the power of the MFP, processing of S10 through S14 are performed. Then, when the data judgment section 30 judges in S14 that the status of the MFP is not the active status (NO in S14), the data judgment section 30 judges whether the status of the MFP is the standby status or not (S20).

When the data judgment section 30 judges in S20 that the status of the MFP is not in the standby status (NO in S20), the data judgment section 30 judges that the status of the MFP is the off status or the busy status, and abandons the received data (S15). Then, the processing by the data judgment section 30 returns to S11.

On the other hand, when the data judgment section 30 judges in S20 that the status of the MFP is the standby status (YES in S20), the data judgment section 30 analyzes the received data and judges whether or not to store the data in the data storage section 31 (S21). To be specific, the data judgment section 30 judges whether or not the received data is a printing job.

In S21, when the data judgment section 30 judges that the data is to be stored in the data storage section 31, namely, judges that the received data is a printing job (YES in S21), the data judgment section 30 transmits the received data (printing job) to the data storage section 31 so that the data is stored therein (S22). Note that data stored in the MFP in the standby status is not processed until the status of the MFP changes into the active status. Further, when the MFP in the active status processes the data stored in the standby status, the data stored in the MFP in the standby status is abandoned. In this case, a notice of data processing completion concerning particular data is transmitted from the MFP in the active status to the MFP in the standby status. Based on the notice of data processing completion, the MFP in the standby status abandons data that has been processed by the MFP in the active status. Then, the processing by the data judgment section 30 returns to S11.

Figure 12:
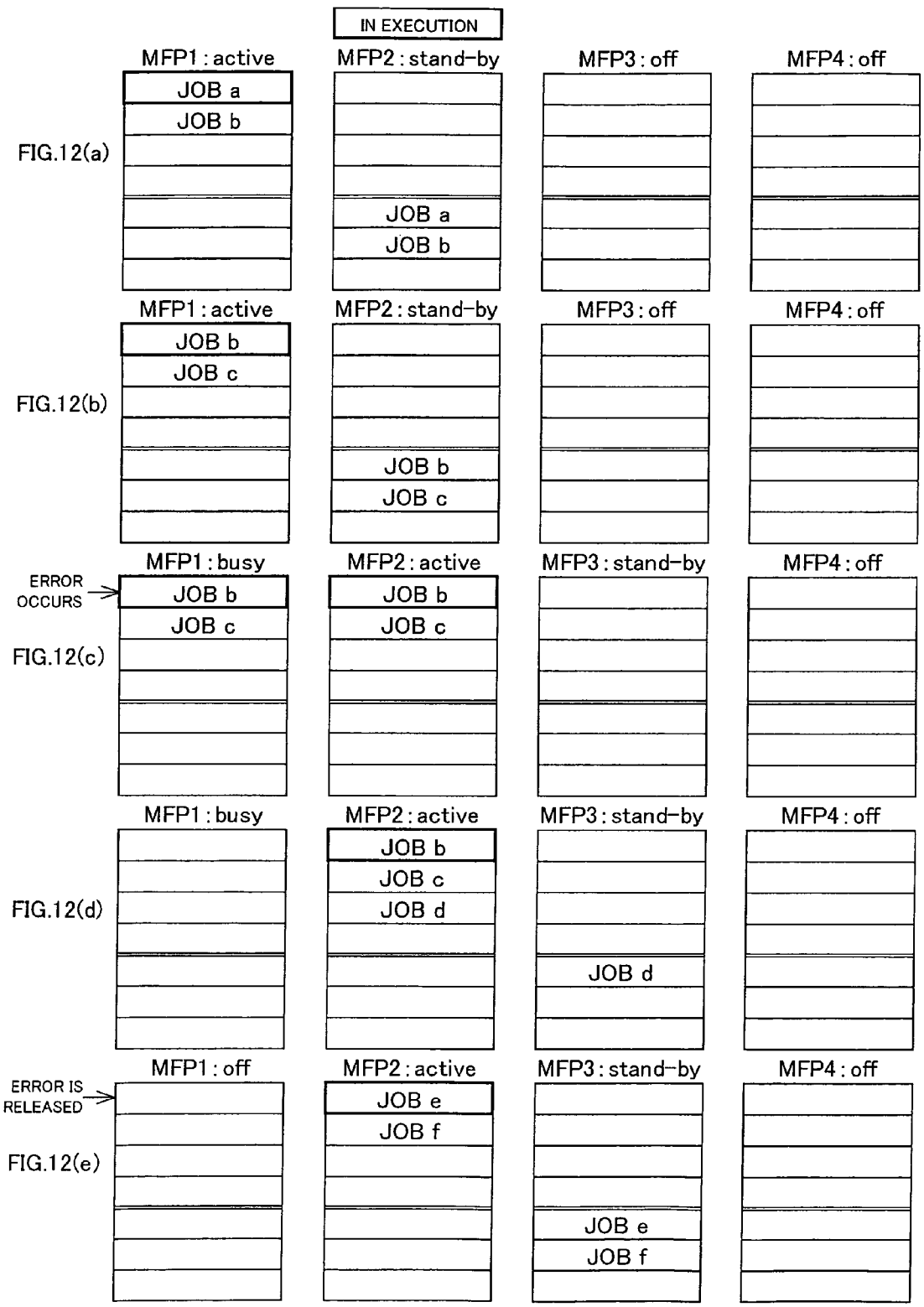
FIGS. 12(a) through 12(e) illustrate an order of changes of each status in a case where the MFP in the standby status receives a printing job in preparation for occurrence of an error.

In this way, a printing job is stored in the MFP in the standby status beforehand, so that, for example, when the MFP in the active status has a breakdown and cannot process stored data, it is possible to process the data without re-transmitting the data to be processed from a PC from which the data has been transmitted. Further, the data is stored beforehand. Thus, when the MFP in the standby status suddenly changes into the active status due to malfunction of the MFP in the active status, the newly changed MFP can instantaneously process data by using the stored data. With reference to FIG. 12, the following explains an example in which: each of MFPs in two statuses (the active status and the standby status) receives a printing job, thereby enhancing availability of the MFPs.

FIG. 12 illustrates the transition of each status in a case where the MFP in the standby status (here, the MFP 2) receives a printing job in preparation for the occurrence of an error. Note that for convenience of explanation, it is assumed that all printing jobs (jobs) are transmitted to the virtual address. Further, for example, in the MFP 1 in FIG. 12(*a*), jobs a and b are stored subsequently from the top. In the MFP 2, jobs a and b are stored subsequently from the top. Further, as for an initial status of each MFP, the MFP 1 is in the active status, the MFP 2 is in the standby status, and the MFPs 3 and 4 are in the off status.

First, as illustrated in FIG. 12(*a*), printing jobs (jobs a and b) transmitted to the virtual address are stored in the MFP 1 in the active status. At that time, the MFP 2 in the standby status stores the printing jobs stored in the MFP 1 in the active status. Note that the MFP 2 in the standby status does not process the stored printing job. After the printing job has been processed in the MFP 1 in the active status, the printing job is abandoned. At that time, in the MFP 2 in the standby status, the printing job that has been completely processed in the MFP 1 is abandoned. To be specific, as illustrated in FIG. 12(*b*), the printing job (job a) that has been completely processed in the MFP 1 is abandoned also in the MFP 2.

For example, when an error such as paper jam occurs in the MFP 1 in the active status and accordingly the MFP 1 cannot process the printing jobs (jobs b and c) stored therein, the MFP 1 changes its status into the busy status, and transmits a status change command to the MFP 2 in the standby status (see FIG. 12(*c*)). The MFP 1 also transmits breakdown information indicating breakdown of the MFP 1 to the MFP 2. At that time, the MFP 1 also transmits the status change command to the MFP 3 in the off status.

As a result, the MFP 2 in the standby status changes into the active status, and the MFP 3 in the off status changes into the standby status. The MFP 2 in the active status analyzes the breakdown information transmitted from the MFP 1, and starts processing of the printing jobs (jobs b and c) that have not been processed.

A printing job (job d) transmitted to the virtual address after the change of statuses has been completed is stored in the MFP 2 in the active status. Further, the printing job (job d) is also stored in the MFP 3 in the standby status (see FIG. 12(*d*)). Note that the MFP 1 having a breakdown abandons the stored printing jobs (jobs b and c) and maintains the busy status. Further, this processing is performed only when an error occurs and accordingly the status of the MFP 1 changes from the active status into the busy status. Namely, when a change into the busy status is performed because the expected value exceeds the threshold value, the printing job stored in the data storage section 31 is not deleted.

Further, printing jobs (jobs e and f) transmitted to the virtual address are stored in the MFP 2 in the active status and the MFP 3 in the standby status. Then, the printing jobs stored in the MFP 2 in the active status are serially processed. Further, when the MFP 1 in the busy status ascertains that the error is cleared, the MFP 1 changes its state into the off status (FIG. 12(*e*)).

In this way, a printing job stored in the MFP in the active status is also stored in the MFP in the standby status. On this account, for example, even when the MFP in the active status has a breakdown and cannot process a printing job stored therein, the MFP in the standby status can process the printing job.

Note that in the above explanation, the MFP 1 in the active status transmits a status change command to the MFP 2, when the MFP 1 in the active status changes into the busy status. However, for example, when paper jam occurs, the MFP 1 can transmit the status change command to the MFP 2. In contrast, when the status change section 40 has a breakdown for example, the MFP 1 may be unable to transmit the status change command. Therefore, the status of the MFP 2 may be changed as described below.

For example, the MFP 2 in the standby status transmits a status confirmation signal to the MFP 1 in the active status at a predetermined time interval. The MFP 1 is set so as to transmit the status of the MFP 1 to the MFP 2 in response to the transmitted state confirmation signal. At that time, when the MFP 2 judges that there is no response from the MFP 1 after transmission of the status confirmation signal, the MFP 2 causes the status change section 40 to function so as to change the status of the MFP 2 into the active status. As a result, even when the MFP 1 has a breakdown and cannot transmit the status change command for example, it is possible to automatically change the status of other MFP.

As described above, by causing two MFPs in the active status and the standby status respectively to store a printing job in parallel, it is possible to process the printing job without discontinuation even when an error occurs for example.

As described above, in a case where the non-active status is classified into the busy status, the off status, or the standby status, MFPs in the non-active status is set as either the off status or the standby status, when power is turned on. To be specific, when the power is turned on, an MFP in the active status instructs other MFP(s) to change into the standby status. To be specific, the status change section 40 in the MFP in the active status causes the change command generation section 42 to function so as to instruct at least one MFP out of other MFP(s) to change into the standby status. In this way, at least one MFP out of MFPs in the non-active status is set into the standby status.

In this way, the MFP (information processing device) according to the present embodiment allows a burden to be shared and allows mediation of a printing job without using a server by autonomously switching MFPs to process the printing job among a plurality of MFPs.

Note that in the above embodiment, functions of members constituting the information processing device are realized in such a manner that: calculation means such as a CPU reads out a program code stored in a storage medium such as a ROM (Read Only Memory) and causes the program to be developed and executed on the RAM (Random Access Memory). However, the functions of members constituting the information processing device may be realized only by hardware which performs the same processing as the functions. Further, the functions can be realized by combining hardware performing a part of processing with the calculation means that executes a program code for controlling the hardware and remaining processing. Further, a member explained as hardware in the members also can be realized by combining hardware performing a part of processing with the calculation means which executes a program code for controlling the hardware and remaining processing. Note that the calculation means may be a simple body, or may be a plurality of calculation means which are connected with each other via a bus or various communication paths in the device and execute the program code.

A program code capable of being executed by the calculation means, or a program provided as data which allows generation of a program code through a process such as later-mentioned decompression, is stored in a storage medium for storing the program (program code or the data) and distributed by the storage medium, or is transmitted and distributed by communication means for transmitting the program via a wired or wireless communication path, and then executed by the calculation means.

When a program is transmitted via a communication path, transmission media constituting the communication path cooperatively transmit signal sequences each of which is indicative of the program, thereby transmitting the program via the communication path. Further, it may be so arranged that: when the signal sequence is transmitted, a transmission device modulates a carrier wave by use of the signal sequence indicative of a program, thereby superimposing the signal sequence onto the carrier wave. In this case, a reception device demodulates the carrier wave, thereby restoring the signal sequences. On the other hand, it may be so arranged that: when the signal sequence is transmitted, the transmission device performs packet transmission of the signal sequence as a digital data sequence. In this case, the reception device connects received packet groups and restores the signal sequence. Further, it may be so arranged that: when the transmission device transmits the signal sequence, the transmission device combines the signal sequence with other signal sequence by means of a method such as time division/frequency division/code division, and transmits the combined signal sequences. In this case, the reception device extracts and restores individual signal sequence from the combined signal sequences. In any case, transmission of a program via a communication path brings about the same effect.

Here, a storage medium for distributing a program is preferably detachable. However, a storage medium after distribution of the program may be either detachable or undetachable. Further, the storage medium may be either rewritable or not, may be either volatile or not, and may adopt any storage method and shape, as long as the storage medium can store a program. The storage medium is, for example, tapes such as a magnetic tape and a cassette tape, or discs such as magnetic discs (e.g. a floppy disc (registered trademark) and a hard disc), a CD-ROM, an optical magnetic disc (MO), a mini disc (MD), and a digital versatile disc (DVD). Further, the storage medium may be cards such as an IC card and an optical card, or semiconductor memories such as a mask ROM, an EPROM, an EEPROM, and a flash ROM. Alternatively, the storage medium may be a memory formed in calculation means such as a CPU.

Note that the program code may be a code which informs the calculation means of all procedures of the above processes. Alternatively, when a basic program (for example, an operating system or a library) which can execute a part of or all of the processes in response to calling carried out in a predetermined procedure already exists, a part of or all of the procedures may be replaced with a code or a pointer for instructing the calculation means to call up the basic program.

Further, a format in accordance with which a program is stored in the storage medium may be, for example, (i) a storage format capable of being accessed and executed by calculation means, such as a status in which the program is disposed on a real memory, (ii) a storage format before the program is disposed on the real memory and after the program has been installed in a local storage medium (e.g., a real memory or a hard disc) capable of being always accessed by the calculation means, or (iii) a storage format before the program is installed from a network or conveyable storage medium to the local storage medium. Further, the program is not limited to an object code after compilation, and may be stored as a source code, or an intermediate code generated during interpretation or compilation. In either case, as long as the program can be converted into format capable of being executed by the calculation means by a process such as decompression of compressed data, decoding of coded information, interpretation, compilation, a link, or disposition to a real memory, or combination of the processes, the same effect can be obtained regardless of a format in accordance with which the program is stored in the storage medium.

Further, the particular address or virtual address is, for example, an MAC address or an IP address. By performing data processing to the real (particular) MAC address of the information processing device, it is possible to receive, without any problem, a service provided on account of using the real (particular) MAC address such as ARP or RARP.

Further, the above explains a case where only one MFP is set into the active status. However, the number of MFPs set in the active status is not particularly limited. For example, the number may be two. In this case, it may be so arranged that a plurality of MFPs in the active status are given the priority, and a particular MFP mainly processes data, or it may be so arranged that the MFPs in the active status serially receive data.

Further, in the present embodiment, an example of a printer is an MFP that is a multi-function printer. However, the example of a printer may be a simple network printer. Further, in the present embodiment, a PC is connected with MFPs via the wired LAN 7. However, a PC may be connected with MFPs via a wireless LAN and the like. Further, the PC may be any one that can transmit a printing job to the MFPs. Further, the number of the PCs and the number of the MFPs are not particularly limited.

Further, the information processing device is explained above using an MFP as an example. However, the information processing device is not limited to the MFP. For example, the information processing device may be a network facsimile (internet FAX) and the like.

Further, in the foregoing explanation, the status of the MFP 1 is classified into four statuses (active, standby, busy, and off statuses). However, the classification and definition of the status are not limited to the above. For example, the status may be classified into three states (active, busy, and off statuses), or may be classified with other state(s) added. The method of classification should be suitably set according to the kind of the information processing device.

Further, the status information storage section 41 explained above stores the statuses and the particular addresses of all MFPs which are connected with one another via the wired LAN 7 and are capable of receiving data addressed to the virtual address. However, for example, when the transition of the active status and the standby status among a plurality of MFPs is set in advance, it is unnecessary for a status information storage section to store status information about all the MFPs. It may be so arranged that the status information storage section stores only particular address of the MFP that becomes in the standby status when the MFP including the status information storage section becomes in the active status. Namely, when the MFP is in the active status and when the status information storage section included in the MFP in the active status stores the particular address of an MFP which is to be subsequently changed into the active status, transmitting a status change command to the particular address allows at least one of MFPs to be in the active status.

Further, data (printing job) transmitted to the particular address is processed by each MFP, and only data transmitted to the virtual address is processed by a plurality of MFPs, and therefore an MFP to which data is output can be used properly according to the purpose of processing. Namely, when data is to be outputted to a particular MFP, the data is transmitted to the particular address, and when the data is to be promptly processed, the data is transmitted to the virtual address. In this way, an MFP to which data is output can be used properly.

Further, it may be so arranged that: the information processing device according to the present embodiment includes: storage means; reception means capable of receiving data transmitted to a specific address that has been predetermined; registration means for adding and registering the data received by the reception means in the storage means; and data processing means for serially processing data stored in the storage means, and the information processing device includes: status change means for controlling the registration means and the data processing means and switching between (i) the active status which allows additional registration of the data and processing of the data and (ii) the non-active status which does not allow the additional registration of the data and/or the processing of the data; and status storage means for storing a status and a particular address of other information processing device(s) capable of receiving data transmitted to the specific address, wherein the status change means instructs other information processing device(s) to change into the active status, when an amount of unprocessed data registered in the storage means exceeds a predetermined threshold value, and the status change processing means changes the information processing device into the non-active status and causes the data processing means to process the unprocessed data.

Further, a network printer system constituted of a plurality of image forming apparatuses (MFPs), according to the present embodiment, which receive a printing job from a host device via a network, may be arranged so that each image forming apparatus includes: a network interface capable of using not only the particular address but also the virtual address which is shared in the printer system and is used only for reception; and mediation means for mediating an order the printing job is processed by the image forming apparatuses, wherein at least one of the image forming apparatuses receives the printing job at the virtual address based on the result of mediation, and the image forming apparatus accepts and processes the printing job. With the arrangement, in a network printer system that does not use a server, it is unnecessary for a user to consider which printer a printing job is to be transmitted to. When the user transmits the printing job to the virtual address determined in advance, a printer which is supposed to process the printing job as its turn receives the printing job and carries out the printing process so that too many printing jobs are not assigned to a single printer.

Further, it may be so arranged that the image forming apparatus (MFP) according to the present embodiment includes a network interface capable of using not only the particular address but also the virtual address which is used only for reception, wherein: when the image forming apparatus receives a printing job at the virtual address and accepts the job, the image forming apparatus informs a device from which the printing job has been transmitted of reception of the printing job and the particular address. With the arrangement, it is possible for a host device to inquire or operate an image forming apparatus that has received the printing job from the host device.

In order to achieve the object, the information processing device according to the present invention includes: a storage section; a reception section capable of receiving data transmitted to a specific address that has been predetermined; a registration processing section for adding and registering the data received by the reception section into the storage section; a data processing section for processing the data stored in the storage section; and a status change processing section for controlling the registration processing section and the data processing section and for switching between (i) an active status which allows additional registration of the data and processing of the data having been transmitted to the specific address and (ii) a non-active status other than the active status, the status change processing section instructing other information processing device(s) in the non-active status to change into the active status when an amount of unprocessed data registered in the storage section exceeds a predetermined threshold value, and the status change processing section changing the information processing device into the non-active status and causing the data processing section to process the unprocessed data.

With the arrangement, when the amount of unprocessed data registered in the storage section exceeds a predetermined threshold value, the status change processing section instructs other information processing device(s) to change into the active status, and causes the information processing device including the status change processing section to change into the non-active status and to process the unprocessed data that has been accumulated. Therefore, it is possible always to keep at least one information processing device capable of receiving data. As a result, for example, without using a server, it is possible to prevent data to be processed from being excessively assigned to a single information processing device. Therefore, effective processing of data on the whole can be realized. Further, unlike the conventional arrangement in which data is assigned using a server, it is possible to prevent all data to be processed from being assigned to a single device. As such, it is possible to assign and process data, without using a server.

Further, in the conventional arrangement in which a server assigns data to be processed to each information processing device, when the server has a breakdown, each information processing device cannot process the data. However, the information processing device based on the above arrangement can assign data, based on setting of each information device, without using a server.

Further, it is possible for an operator to process data without grasping statuses of each information processing device, and to process the data effectively.

Further, when a network information processing system in which the information processing devices are connected with one another via a network, merely by transmitting/receiving a status change command between the information processing devices, one of the information processing devices can process data transmitted to the specific address. Therefore, compared with conventional art, it is possible to reduce the amount of data transmitted/received between the information processing devices. As a result, it is possible to reduce a burden of each of the information processing devices.

As for "control" as described above, the status change processing section may directly control the registration processing section and the data processing section. On the other hand, "control" may include changing of functions of the register processing section and the data processing section, according to the status changed by the status change processing section. Namely, "control" includes direct control in which one section directly controls another section, and indirect control in which one section indirectly controls another section via other thing.

The information processing device according to the present invention may be arranged so that: based on status information, concerning statuses of other information processing devices, which is stored in the status information storage section, the status change processing section determines other information processing device to be changed from the non-active status into the active status.

With the arrangement, based on the status information stored in the status information storage section, the status change processing section determines other information processing device to be changed into the active status. To be specific, the status change processing section determines other information processing device to be changed into the active status, out of the information processing devices, being in the non-active status, whose status information are stored in the status information storage section. Therefore, for example, it is possible to change the information having the highest ability out of other information processing devices into the active status.

The information processing device according to the present invention may be arranged so as to include: a calculation processing section for calculating, based on the unprocessed data stored in the storage section, a throughput of the unprocessed data; and a comparison processing section for comparing the throughput with a predetermined threshold value, wherein the status change processing section determines whether or not to change the information processing device into the non-active status, based on a result of comparison performed by the comparison processing section.

With the arrangement, the information processing device according to the present invention is provided with the comparison processing section for comparing the amount of the unprocessed data stored in the storage section with the predetermined threshold value. The status change processing section changes the status of the information processing device, based on the result of comparison. As a result, it is possible to change the status of the information processing device, according to data transmitted in real time.

The information processing device according to the present invention may be arranged so that the non-active status includes a standby status in which the information processing device changes into the active status based on an instruction to change into the active status, the instruction being transmitted from said other information device, and the status change processing section controls the registration processing section so that the registration processing section additionally register the data transmitted to the specific address when it is determined that the information processing device is in the standby status, and the status change processing section processes the data having been additionally registered when it is determined that said other information processing device in the active status is not capable of processing the data.

With the arrangement, the non-active status includes the standby status, and in the standby status, the status change processing section performs additional registration of data transmitted to the specific address. Therefore, for example, when the information processing device changes into the active status due to a breakdown of other information processing device in the active status, the information processing device can immediately start processing of data by using data that has been additionally registered (accumulated). Further, because data has been accumulated in advance, even when the information processing device changes from the standby status into the active status, it is unnecessary for the device from which the data has been transmitted to re-transmit the data to the information processing device.

Note that when it is judged that the other information processing device in the active status can process data, the status change processing section causes the data judgment section to delete the additionally registered data. Namely, for example, unless it is judged that the other information processing device cannot process data normally due to a breakdown and the like, the status change processing section does not process the additionally registered data.

Further, examples of a method in which the status change processing section judges that the other information processing device in the active status cannot process data include: a method in which the judgment is performed by receiving, from the other information processing device in the active status, a signal indicating that normal data processing cannot be performed; a method in which the status change processing section periodically transmits a signal to the information processing device and gives judgment based on whether a response to the signal is given or not; and a method in which the judgment is performed based on whether a signal periodically transmitted from the other information processing device in the active status is transmitted or not. However, the method is not particularly limited.

The information processing device according to the present invention may be arranged so that the non-active status includes (i) an off status which does not allow additional registration of data transmitted to the specific address and processing of the data and (ii) a busy status which allows the data processing section to process unprocessed data, and the status change processing section changes the status of the information processing device into the off status and controls the data processing section so that the data processing section does not operate when the status change processing section determines that processing of the unprocessed data is completed after changing into the busy status.

With the arrangement, the status change processing section changes the information processing device into the off status after the unprocessed data is processed in the busy status, and controls the data processing section so that the data processing section does not operate. Therefore, in the off status, the data processing section does not operate, which results in energy-saving. Further, at least one of information processing devices which are connected with one another via the communication section and are able to receive data addressed to the specific address is always set into the active status. Thus, even when other information devices are set into the off status, energy-saving can be realized without impairing the convenience of a user.

The information processing device may be arranged so that: when the registration processing section determines that received data has been transmitted to the specific address, the registration processing section informs an information processing device from which the data has been transmitted of (i) reception of the data and (ii) a particular address of the information processing device.

The particular address is an address given to each information processing device. Namely, unlike the specific address, the particular address is not an address shared by a plurality of information processing devices, but an address owned by a single information processing device.

Data transmitted to the specific address can be received by any information processing device as long as the information processing device can receive data transmitted to the specific address. Therefore, for example, when a device transmits data to the specific address, it is impossible to determine which information processing device receives the data. However, with the foregoing arrangement, the information processing device that has received the data transmitted to the specific address informs the device having transmitted the data of reception of the data and transmits the particular address to the device having transmitted the data. Therefore, the device having transmitted the data can determine which information processing device has received the data.

Incidentally, the information processing device may be realized by hardware, or may be realized by a program executed by a computer. To be specific, the program according to the present invention is a program for causing a computer to function as an information processing device. Further, the program is stored in the storage medium according to the present invention.

When the programs are executed by a computer, the compute functions as the information processing device. As a result, it is possible to assign data, based on the setting of each information device, without using a server.

In order to achieve the object, the image forming apparatus according to the present invention may include the image processing device and an image forming section for forming an image based on data processed by the information processing device.

With the arrangement, at least one image processing device always can receive data transmitted to the specific address. Therefore, for example, a server is not necessary unlike the conventional art, and it is possible to prevent data to be processed from being excessively assigned to a single information processing device.

The image forming apparatus according to the present invention may be arranged so that the non-active status includes a standby status prior to an active status, and when the image forming apparatus is in the standby status, the status change processing section controls the image forming section so that the image forming section is in operating condition.

With the arrangement, in the standby status, the image forming section is in operating condition. Further, in general, it takes time for the image forming apparatus (image forming engine) to be in operating condition. Therefore, for example, when an instruction to change into the active status comes from the other image processing devices, the image processing device in the standby status can change into the active status and can immediately start image forming.

Embodiment 2

Another embodiment according to the present invention is explained below with reference to FIGS. 13 through 24.

Note that in the following explanation, data is constituted of a plurality of frames. Namely, data is, for example, a unit such as a printing job and the like, and a frame is a fragment of data. Each frame has a destination address and a source address. Further, in the following explanation, an address is explained using a MAC address, but a kind of the address is not particularly limited.

Figure 14:
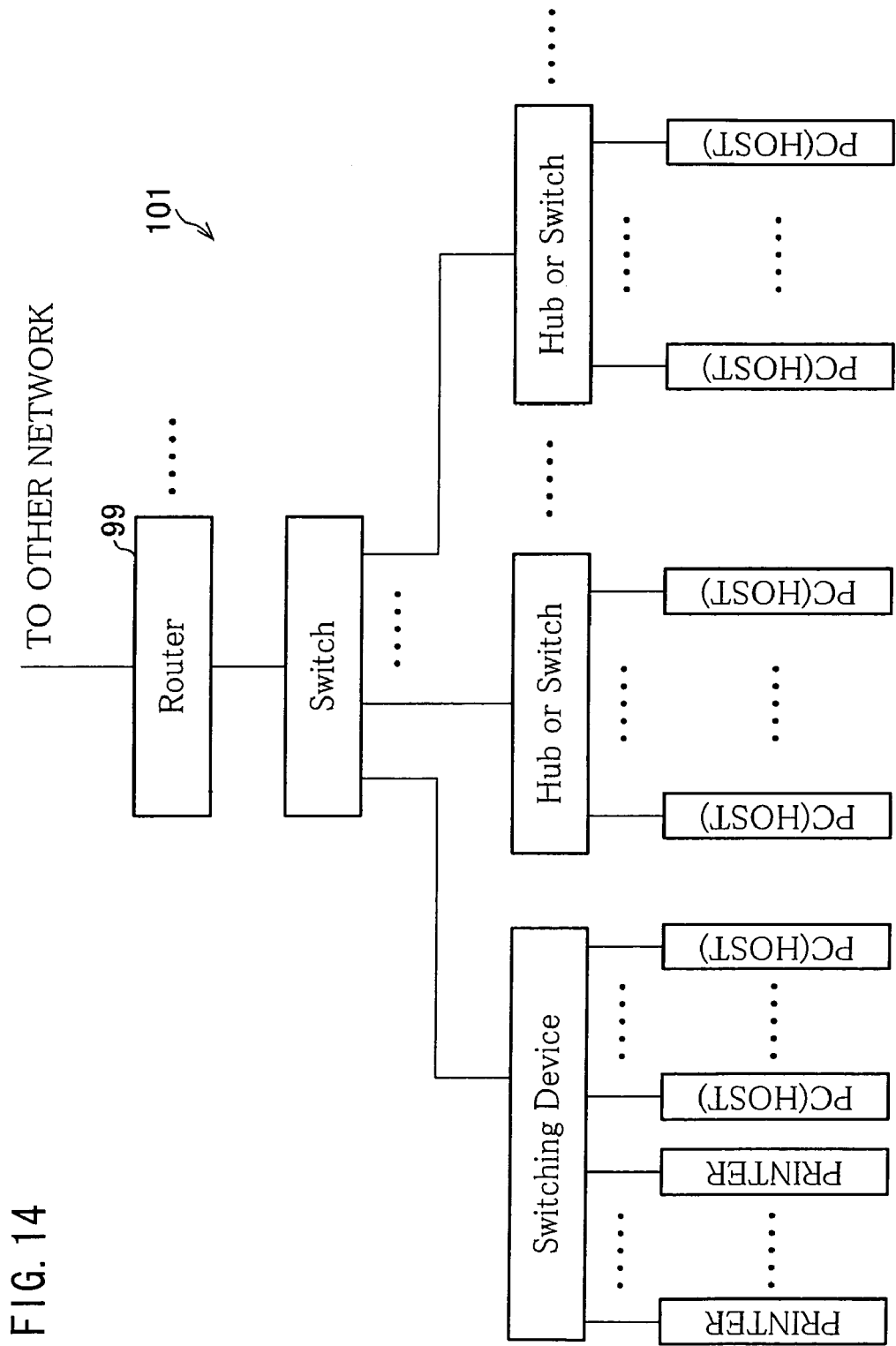
FIG. 14 is a block diagram schematically illustrating a structure of a network printer system according to another embodiment of the present invention.
Figure 15:
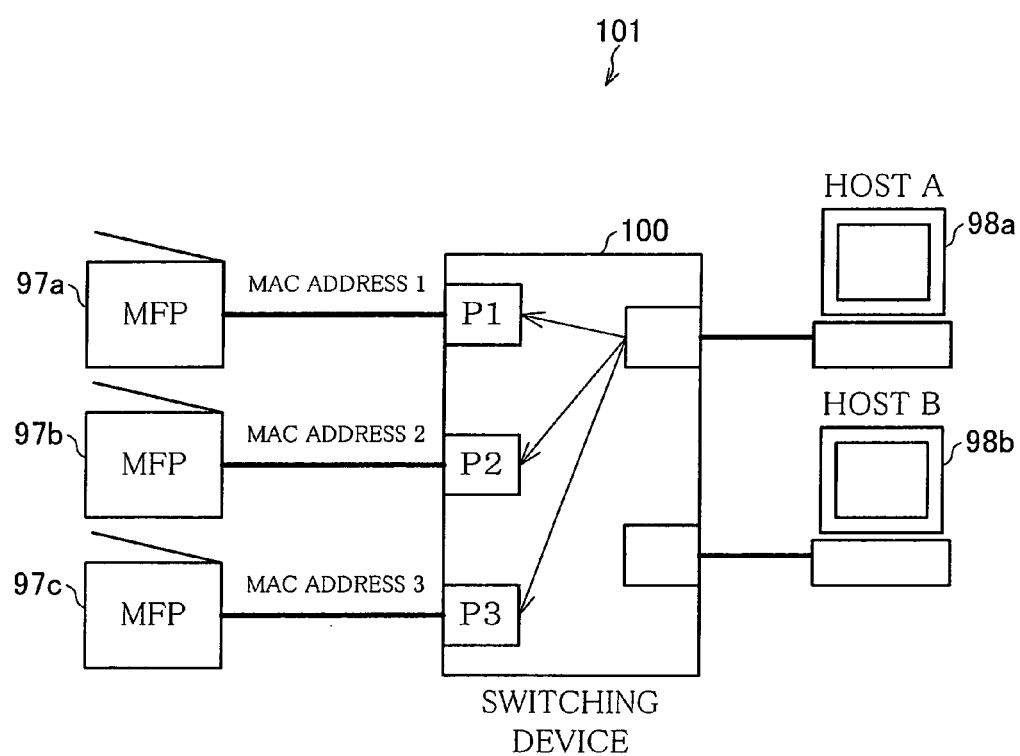
FIG. 15 is a block diagram illustrating essential portions of the network printer system illustrated in FIG. 14.

A network printer system (network information processing system) according to the present embodiment is explained with reference to FIGS. 14 and 15. FIG. 14 is a block diagram schematically illustrating a structure of the network printer system according to the present invention. Further, FIG. 15 is a block diagram illustrating essential portions of the network printer system. As illustrated in FIG. 14, a network printer system 101 according to the present embodiment is connected with other network(s) via a router 99, and is a printer system formed on a star-type LAN. The router 99 is connected with a plurality of printer systems. As illustrated in FIG. 15, in the network printer system 101, a plurality of host devices (98a and 98b) are connected with a plurality of MFPs (Multi Function Printer, information processing device) (97a, 97b, and 97c) via a switching device (line concentrator) 100. Note that in the following explanation, the host devices 98a and 98b are explained as a host device 98, and the MFPs 97a, 97b, and 97c are explained as an MFP 97. Further, an example of the host device 98 is a PC and the like. When the switching device 100 receives a leading frame of one printing job (data) transmitted from one host device 98, the switching device 100 registers the leading frame in a connection table 123 (see FIG. 13) managed by the switching device 100, and selects, based on the connection table 123, an MFP 97 to which subsequent frames are to be transmitted. Note that the following describes an arrangement in which the host device 98 and the MFP 97 illustrated in FIG. 15 are connected with each other via the switching device 100. Further, the connection table 123 is mentioned later.

The host device 98 transmits a printing job to the MFP 97. Note that the printing job may be formed by the host device 98, or may be transmitted from an external device to the host device 98.

Figure 16:
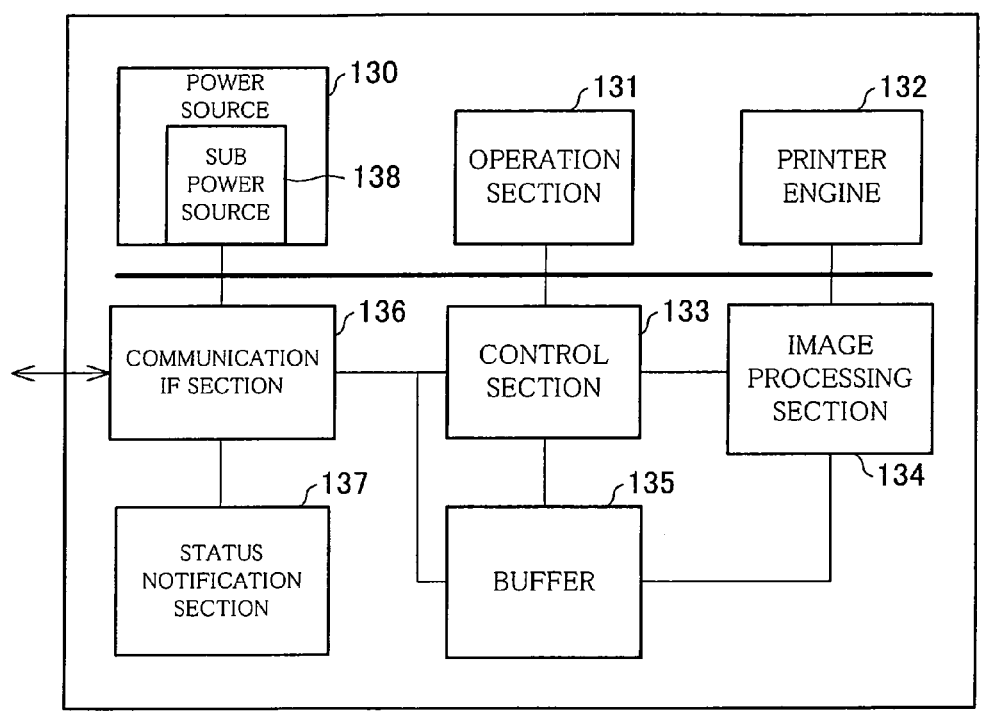
FIG. 16 is a block diagram schematically illustrating a structure of the MFP illustrated in FIG. 15.

Next, the MFP 97 is explained with reference to FIG. 16. FIG. 16 is a block diagram schematically illustrating a structure of the MFP 97.

The MFP 97 processes a printing job transmitted from the host device 98. As illustrated in FIG. 16, the MFP 97 includes a power source 130, an operation section 131, a printer engine 132, a control section 133, an image processing section 134, a buffer 135, a communication IF section 136, and a status notification section (information notification section) 137.

The power source 130 includes a sub power source 138, and supplies a power to the whole of the MFP 97. The operation section 131 is a section with which an operator inputs an image forming condition and the like, and performs various settings. The printer engine 132 is used to form an image. The communication IF section 136 is used to communicate information with an outside. To be specific, the communication IF section 136 is used to receive a printing job from the outside or transmit a printing job, later-mentioned status information, and the like to the outside. The buffer 135 is used to temporarily store a printing job and the like transmitted from an outside. The image processing section 134 is used to perform image processing of a printer job.

The MFP 97 is provided with the status notification section 137. The status notification section 137 notifies the switching device 100 of status information about the status of the MFP 97. The status information is, for example, information about the function of the MFP 97 or the current status of MFP 97.

Figure 13:
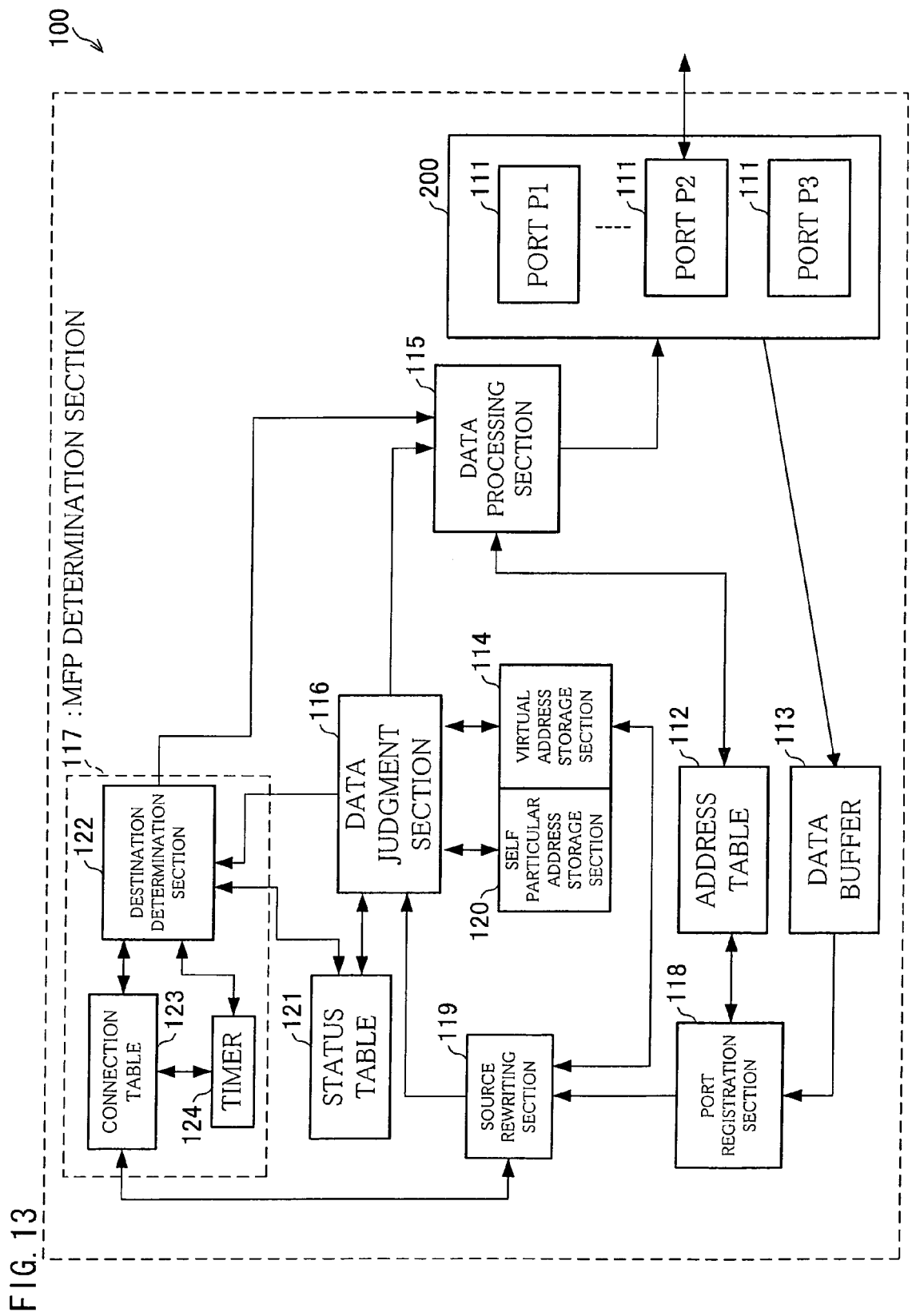
FIG. 13 is a block diagram schematically illustrating a structure of a switching device according to another embodiment of the present invention.

FIG. 13 is a block diagram schematically illustrating the structure of the switching device 100 according to the present embodiment.

The switching device 100 relays all frames (data) including a printing job, transmitted/received between the host device 98 and the MFP 97, between the host devices 98, and between the MFPs 97. Namely, the switching device 100 relays frames of data communication between devices connected with the switching device 100. To be specific, the switching device 100 makes reference to a destination MAC address attached to a frame transmitted from a source device, and determines a device to which the data is to be transmitted.

As illustrated in FIG. 13, the switching device 100 according to the present embodiment includes a port unit 200 constituted of a plurality of ports 111, an address table (port storage section, port storage means) 112, a data buffer 113, a virtual address storage section (address storage section, address storage means) 114, a data processing section (output processing section, output means) 115, a data judgment section (data judgment processing section, data judgment means) 116 and an MFP determination section (apparatus determination processing section, processing apparatus determination means) 117.

Further, according to necessity, the switching device 100 may include a port registration section 118, a source rewriting section (source rewriting processing section, source rewriting means) 119, a self particular address storage section (self particular address storage section, self particular address storage means) 120, and a status table (status storage section, status storage means) 121. Note that the following describes an arrangement in which the port registration 118, the source rewriting section 119, the self particular address storage section 120, and the status table 121 are provided.

Each port 111 can be freely connected with a printer (including MFP 4), a PC (host device 3), a hub, a switch, a router, and the like, via a twist pair cable such as 10BASE-T. Further, each port 111 is given a port number (P1, P2, P3, . . . ).

The data buffer 113 temporarily stores a frame (data) transmitted to and from the host device 98 or the MFP 97.

The port registration section 118 stores a corresponding relation between a port number of the port 111 and a MAC address of a device (host device 98 or MFP 97; when the host device 98 and the MFP 97 are not distinguished, it is merely referred to as a device hereinafter).

The address table 112 stores correspondence between the MAC address of a device connected with each port 111 and the port number of each port 111. Namely, the address table 112 stores which device is connected with which port 111.

FIG. 17 illustrates information stored in the address table 112. As illustrated in FIG. 17, the address table 112 causes the port number of each port 111 to correspond to the MAC address of a device connected with each port 111, and stores this corresponding relation as a pair. There exits as many corresponding relations as devices connected with the ports 111. To be specific, the address table 112 registers a pair of an MAC address and a port 111 connected with a device having the address (a port 111 which a device having the address can reach). Therefore, when the switching device 100 receives a frame, the switching device 100 makes reference to the destination MAC address of the frame and searches pairs in the address table 112 so as to find a port 111 to which the frame is to be transmitted.

When the port 111 receives a frame from a device whose source MAC address is unknown, the port registration section 118 registers, in the address table 112, a pair of the source address and the port which has received the frame. Namely, the port registration section 118 generates the address table 112.

The source rewriting section 119 rewrites a source address attached to a transmitted frame into a later-mentioned virtual address. The source rewriting section 119 is explained later.

The data judgment section 116 analyzes a transmitted frame so as to extract the MAC address (referred to as a destination address hereinafter) which is the destination (destination of transmission) of the frame. The data judgment section 116 assigns (transmits) the frame based on the extracted destination address. Namely, the data judgment section 116 makes reference to the virtual address stored in the later-mentioned virtual address storage section 114 and the self particular address stored in the self particular address storage section 120, and determines a processing end of the frame (an end to which the frame is to be transmitted).

To be specific, when it is judged that the destination address of the transmitted frame is the virtual address, the data judgment section 116 transmits the frame to the MFP determination section 117. Further, when the destination address of the transmitted frame is a known destination address or an unknown destination address (in other words, when the destination address is other than the virtual address and the self particular address), the data judgment section 116 transmits the frame to the data processing section 115.

Further, when it is judged that the destination address of the transmitted frame is the self particular address, the data judgment section 116 analyzes contents of the frame so as to renew settings of the switching device 100 or to perform various processings. To be specific, for example, the data judgment section 116 performs setting, change and the like of the virtual address.

The virtual address storage section 114 stores the virtual address (specific address) set by the data judgment section 116. The virtual address is not a MAC address unique to a device, but a MAC address common in the network printer system. Namely, in the present embodiment, by transmitting data (frame) to the virtual address, the switching device 100 automatically determines destination of the data, and performs data processing.

The self particular address storage section 120 stores the particular address thereof, that is, the particular address of the switching device 100. In the present embodiment, by transmitting data (frame) to the self particular address, the settings of the switching device 100 can be changed.

The MFP determination section 117 determines a destination of transmission (destination of transfer) of the frame transmitted to the virtual address. To be specific, the MFP determination section 117 determines the MFP 97 to which the frame transmitted from the host device 98 to the virtual address is to be transmitted. In the present embodiment, the MFP determination section 117 determines which MFP 97 is to receive the frame based on the later-mentioned table 121. The MFP determination section 117 and how to determine the destination of transmission of the frame are detailed later.

The status table 121 stores statuses and abilities of all MFPs 97 connected with the switching device 100 via the ports 111.

FIG. 18 illustrates information stored in the status table 121. As illustrated in FIG. 18, the status table 121 stores the particular address of each MFP 97 connected with the switching device 100, and status information indicating the ability (device information, priority value) of the MFP 97.

The data processing section 115 determines the port 111 to which the frame is to be transmitted, based on the destination address of the frame transmitted from the data judgment section 116 or the MFP determination section 117. To be specific, the data processing section 115 makes reference to the address table 112 so as to determine the port number of a port 111 corresponding to the destination address of the transmitted frame. Then, the data processing section 115 transmits the frame to the determined port number.

In this way, a printing job transmitted from the host device 98 to the MFP 97 is decomposed into a plurality of frames, and the frames are transmitted to the MFP 97 via the switching device 100. To be specific, a frame transmitted to the switching device 100 is transmitted to one port 111 from another port 111, based on a pair of an MAC address and a port number stored in the address table 112. Then, the frame is finally transmitted to a device having the destination address via the switching device 100.

Figure 19:
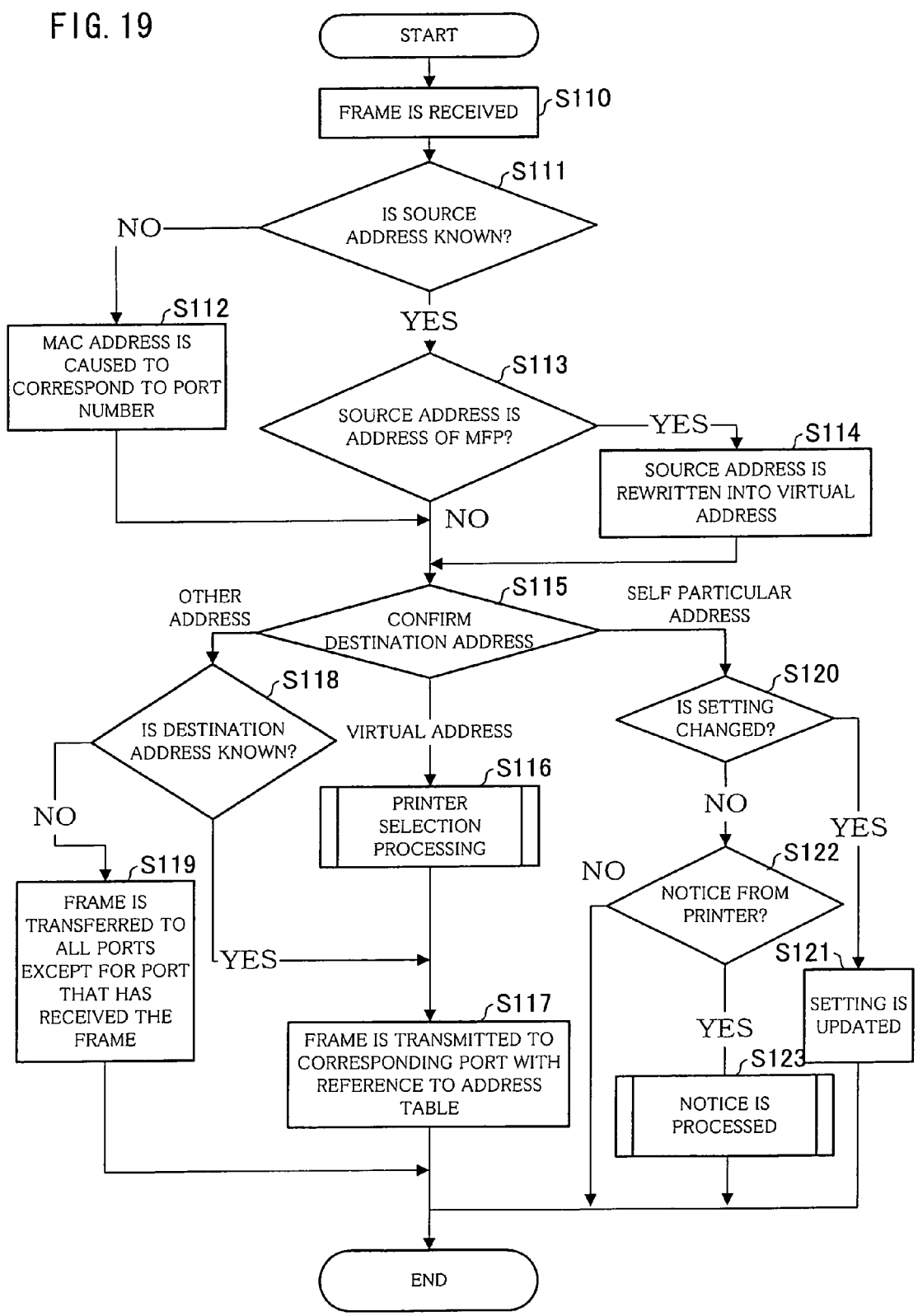
FIG. 19 is a flowchart illustrating a series of processing when the switching device illustrated in FIG. 13 receives a frame.

FIG. 19 is a flowchart illustrating a series of processing when the switching device 100 receives a frame. With reference to FIG. 19, processing in a case where a frame is transmitted to the switching device 100 is explained.

First, when the port 111 receives a frame (S 110), the frame is temporarily stored in the data buffer 113. The frame is transmitted to the port registration section 118. Next, the port registration section 118 analyzes the frame and extracts a source address, and determines whether the source address is stored (registered) in the address table 112 (S111). Namely, whether the source address is known or not is determined.

When it is judged in S111 that the source address is not stored (registered) in the address table 112 (NO in S111), the port registration section 118 causes the source address to correspond to the port 111 (port number) that has received the frame, and stores the correspondence in the address table 112 (S112). Next, the port registration section 118 transmits the frame to the data judgment section 116 via the source rewriting section 119. Then, processing goes to S115. On the other hand, when it is judged in S111 that the source address is stored (registered) in the address table 112 (YES in S111), the frame is transmitted to the source rewriting section 119. The source rewriting section 119 makes reference to the connection table 123 so as to judge whether or not the source address of the transmitted frame is an MAC address of the MFP 97 (S113). In other words, the source rewriting section 119 judges whether or not the frame is transmitted from the MFP 97.

When it is judged in S113 that the source address is an MAC address of the MFP 4 (YES in S113), the source rewriting section 119 makes reference to the virtual address storage section 114 so as to rewrite the source address of the frame into the virtual address (S114). The frame whose source address has been rewritten is transmitted to the data judgment section 116. Then, processing goes to S115. Note that in the following explanation, a frame whose source address has been rewritten and a frame whose source address has not been rewritten are explained as the same frame.

On the other hand, when it is judged in S113 that the source address is not the MAC address of the MFP 4 (NO in S113), the source rewriting section 119 transmits the frame to the data judgment section 116.

Next, the data judgment section 116 analyzes the frame and extracts a destination address (S115) and determines, based on the extracted destination address, a destination to which the frame is to be transmitted. To be specific, the data judgment section 116 judges whether the destination address of the frame is the virtual address stored in the virtual address storage section 114 or the self particular address stored in the self particular address storage section 120.

When it is judged that the destination address is the virtual address, the data judgment section 116 transmits the frame to the MFP determination section 117. The MFP determination section 117 makes reference to the status table 121 so as to perform MFP determination processing (printer selection processing) for determining the destination of transmission (destination) to which the frame is to be transmitted (S116). Note that the MFP determination processing is mentioned later. The frame whose destination has been determined is transmitted to the data processing section 115.

When the frame whose destination has been determined is transmitted to the data processing section 115, the data processing section 115 makes reference to the address table 112 so as to determine the port 111 to which the frame is to be transmitted. The data processing section 115 transmits the data to the determined port 111 (S117). Then, a series of processing is completed.

On the other hand, when it is judged that the destination address is neither the virtual address nor the self particular address, the data judgment section 116 transmits the data to the data processing section 115. The data processing section 115 determines whether the destination address of the frame is known or unknown (S118). To be specific, the data processing section 115 makes reference to the address table 112 so as to judge whether the destination address attached to the frame corresponds to the port 111. When the destination address of the frame is not stored in the address table 112, this is regarded as "unknown", and when the destination address of the frame is stored in the address table 112, this is regarded as "known".

When it is judged in S118 that the destination address of the transmitted frame is known (YES in S118), the processing of S117 is performed. On the other hand, when it is judged in S118 that the destination address of the transmitted frame is unknown (NO in S118), the data processing section 115 transmits (floods) the frame to all ports 111 except the port 111 from which the frame has been transmitted (S119). Then, a series of processing is completed.

Further, when it is judged in S115 that the destination address is the self particular address, the data judgment section 116 restores the frame addressed to the self particular address into data. Then, the data judgment section 116 analyzes the restored data so as to judge whether the data is a setting change command or not (S120).

When it is judged in S120 that the restored data is the setting change command (YES in S120), the data judgment section 116 changes (updates) the setting of the switching device 100, based on contents of the setting change command (S121). To be specific, the data judgment section 116 changes (updates) the virtual address stored in the virtual address storage section 114, or changes (updates) the self particular address stored in the address storage section 120. Then, a series of processing is completed.

On the other hand, when it is judged in S120 that the restored data is not the setting change command (NO in S120), the data judgment section 116 judges whether the restored data is a notice given from the MFP 97 (printer) or not (S122). When it is judged that the restored data is a notice given from the MFP 97 (YES in S122), the data judgment section 116 processes the notice (S123). To be specific, when the notice from the MFP 97 is, for example, a command for changing the status table 121, the data judgment section 116 rewrites the status table 121. The processing carried out in response to the notice is mentioned later. Note that the rewriting may be performed in such a manner that the data judgment section 116 directly rewrites the status table 121, or in such a manner that the data judgment section 116 causes the MFP determination section 117 to function so as to rewrite the status table 121. On the other hand, when it is judged that the restored data is not a notice given from the MFP 4 (NO in S122), the processing is completed.

As described above, the switching device 100 according to the present embodiment includes: the virtual address storage section 114 for storing the virtual address; the data judgment section 116 for judging whether the transmitted frame is addressed to the virtual address; the MFP determination section 117 for determining a destination address for transmitting the frame to at least one MFP 97 out of a plurality of MFPs 97 (devices; information processing devices) that can process data transmitted to the virtual address, when the data judgment section 116 judges that the transmitted frame is addressed to the virtual address; and the data processing section 115 for determining the port 111 that can output the frame to the destination address determined by the MFP determination section 117 and for outputting the frame to the port 111.

As a result, the MFP determination section 117 determines an MFP 97 that processes the frame, out of a plurality of MFPs 97 that can process a frame transmitted to the virtual address. Then, the data processing section 115 transmits the frame to the MFP 97 determined by the MFP determination section 117. Therefore, without a server, the switching device 100 can cause the MFP 97, determined to process the frame out of a plurality of MFPs 4, to process the frame transmitted to the virtual address of the switching device 100.

Further, the switching device 100 intervening between (i) the host device 98 that transmits a frame and (ii) the MFP 97 so as to transmit the frame assigns frames addressed to the virtual address. Therefore, unlike the case where a server assigns frames, the amount of data communication (traffic) between a server and the switching device 100 does not increase, so that the amount of data communication in the whole network can be reduced.

Note that in S119, the data processing section 115 transmits the frame to all ports 111 except for the port 111 from which the frame has been transmitted. However, for example, when it is judged in S113 that the source address is an MFP 97 address, the data processing section 115 transmits the frame to all ports 111 except for the port 111 from which the frame has been transmitted and the port 111 connected with the MFP 97.

Further, in S113, the source rewriting section 119 makes reference to the connection table 123, and when it is judged that the source address is an MFP 97 address, the source rewriting section 119 rewrites the source address into the virtual address. In this way, for example, a source address is rewritten into the virtual address at a time when data is transmitted from the host device 98 to the virtual address and processed by the MFP 97, and then a notice of completion is transmitted from the MFP 97. Namely, data is transmitted/received only with the virtual address. This enables the security to be enhanced. Note that the processings of S113 and S114 are not essential. It is more preferable that whether the processings are performed or not can be changed according to settings.

Here, the following describes the detailed structure of the MFP determination section 117, and MFP selection processing in which a frame transmitted to the virtual address is assigned.

As illustrated in FIG. 13, the MFP determination section 117 includes a destination determination section 122, a connection table (connection storage section, connection storage means) 123, and a timer (deletion processing section, deletion means) 124.

As for a first transmitted frame out of a plurality of frames constituting single data, the destination determination section 122 determines a destination address, based on status information stored in the status table 121. Then, the address determination section 122 combines the determined destination address with the source address of the first transmitted frame as a pair, and writes the pair in the connection table 123. Further, as for frame(s) transmitted on and after the second time out of the plurality of frames, the destination determination section 122 determines the destination address to which the frame is to be transmitted, based on connection information stored in the connection table 123.

Namely, the destination determination section 122 analyzes a frame transmitted to the virtual address and extracts a source address, and judges whether the extracted source address is stored (registered) in the pair of the source address and destination address in the connection information stored in the connection table 123. When it is judged that the extracted source address is registered, the destination determination section 122 determines a destination address based on the connection information. Further, when it is judged that the extracted source address is not registered, the destination determination section 122 determines the destination address based on the status information. Then, the destination determination section 122 rewrites the destination address of the frame transmitted from the virtual address to the determined destination address.

The connection table 123 is used to store a pair of the MAC address of the host device 98 and the MAC address of the MFP 97. Namely, the connection table 123 stores a pair of a destination address and a source address.

When the switching device 100 receives a frame addressed to the virtual address, the switching device 100 searches a pair stored in the connection table 123 for the MAC address of the host device 98 corresponding to the source address. When a corresponding pair exists, the switching device 100 rewrites the destination address of the corresponding pair from the virtual address to the MAC address of the MFP 97. Then, the switching device 100 determines the port 111 to which the frame is to be transmitted, based on the address table 112. On the other hand, when the corresponding pair does not exist, the switching device 100 makes reference to the status table 121 and selects the most suitable MFP 97 to which the frame is to be transmitted, and registers the pair of the MAC address of the host device 98 and the MAC address of the MFP 97 in the connection table 123. Further, deletion time is set for each pair, and when a pair does not receive a frame from a host device 98 for a predetermined period, the pair is deleted. This is explained below.

FIG. 20 illustrates information stored in the connection table 123. As illustrated in FIG. 20, the connection table 123 stores a pair of an MAC address of the host device 98 and an MAC address of the MFP 97, and deletion time is set for each pair by the later-mentioned timer 124.

The timer 124 deletes a pair of an MAC address of the host device 98 and an MAC address of the MFP 97. Namely, the timer 124 deletes connection information in the connection table 123. To be specific, for example, when a plurality of frames constituting single data (printing job) are transmitted from the host device 98 to the MFP 97, the switching device 100 judges (detects) the frame at the end of the data, and when the frame at the end of the data is detected, the timer 124 deletes the corresponding pair in the connection information. Note that deletion processing of the connection information is detailed later.

FIG. 21 is a flowchart illustrating a series of processing in the MFP selection processing. The MFP selection processing is explained below with reference to FIG. 21. Note that the following describes a method in which an MFP 97 is selected based on priority values of the MFPs 97. Therefore, as illustrated in FIG. 18, the status table 121 stores priority values of the MFPs 97 as status information.

Further, the priority value is a digitalized value indicative of a reserve capacity of a processing ability of the MFP 97. For example, the value is calculated by subtracting an amount of frames transmitted to the MFP 97 via the port 111 from a default value corresponding to the processing ability of the MFP 97. When the processing is completed, the amount of frames is recovered. As the value is higher, frames (data) transmitted to the MFP 97 are fewer. Namely, an MFP 97 with a high priority value has not received much frame, and therefore is still able to process much data (job).

First, when the data judgment section 116 judges that a frame is transmitted to the virtual address, the data judgment section 116 transmits the frame to the MFP determination section 117. It is assumed that the frame transmitted to the virtual address has been transmitted from the host device 98. When the destination determination section 122 receives the frame addressed to the virtual address (S130), the destination determination section 122 analyzes the frame and extracts a source address. Subsequently, the destination determination section 122 judges whether or not the source address of the transmitted frame is registered in the connection table 123 (S131).

When the destination determination section 122 judges in S131 that the source address of the transmitted frame is registered in the connection table 123 (YES in S131), the processing goes to S134. On the other hand, when the destination determination section 122 judges in S131 that the source address of the transmitted frame is not yet registered in the connection table 123, the destination determination section 122 regards the transmitted frame as a new job, and selects an MFP 97 to perform processing of the new job. To be specific, the destination determination section 122 makes reference to the status table 121 and selects an MFP 97 whose priority value is the highest out of the MFPs 97 (S132). Namely, the destination determination section 122 makes reference to the status table 121 and determines transmission of the frame to the MFP 97 with the highest priority value.

Next, the destination determination section 122 causes the MAC address of the determined MFP 97 to be a destination address, and registers the pair of the destination address and the source address of the frame in the connection table 123 (S133).

Next, the destination determination section 122 rewrites the destination address of the frame from the virtual address into the MAC address of the MFP 97 that performs processing of the new job (S134). Subsequently, the destination determination section 122 transmits the frame whose destination address has been rewritten to the data processing section 115.

Next, the destination determination section 122 drops the priority value of the status information of the MFP 97 corresponding to the destination address of the frame (S135).

In this way, the MFP determination section 117 determines an MFP to which the frame transmitted to the virtual address is assigned. The MFP 97 to which the frame is to be transmitted is determined based on the status table 121, so that it is possible to prevent frames (data) to be transmitted from being concentrated on a single MFP 97. Further, the destination (MFP 97) to which a frame is to be transmitted is determined by using the priority value, so that data (job) can be processed more efficiently in the network printer system as a whole.

Note that the above explanation describes an arrangement in which the destination determination section 122 registers a pair of a source address and a destination address in the connection table 123. However, it may be so arranged that a pair of a source address and a port 111 to output the frame is registered in the connection table 123.

Further, in S133, the timer 124 sets a time for deleting the registered pair. This is explained below.

It is more preferable that a pair of a destination address and a source address registered in the connection table 123 is deleted at a time when transmission of single data (job) is completed. However, unless a plurality of frames are multiplexed and the end of single data is recognized, it is difficult to grasp completion of transmission of the data. Further, it takes time to restore the data. Namely, in a case where single data is constituted of the plurality of frames, it is difficult to recognize the end of the data based on only a single frame.

Therefore, in the present embodiment, as for a pair registered in the connection table 123, when it is judged that transmission of a frame from a source address to a destination address is not performed for a predetermined period, transmission of data is considered to be completed and accordingly the pair is deleted. To be specific, the timer 124 detects that transmission of the frame from the source address to the destination address is not performed, and deletes the pair based on the result of the detection.

Figure 22:
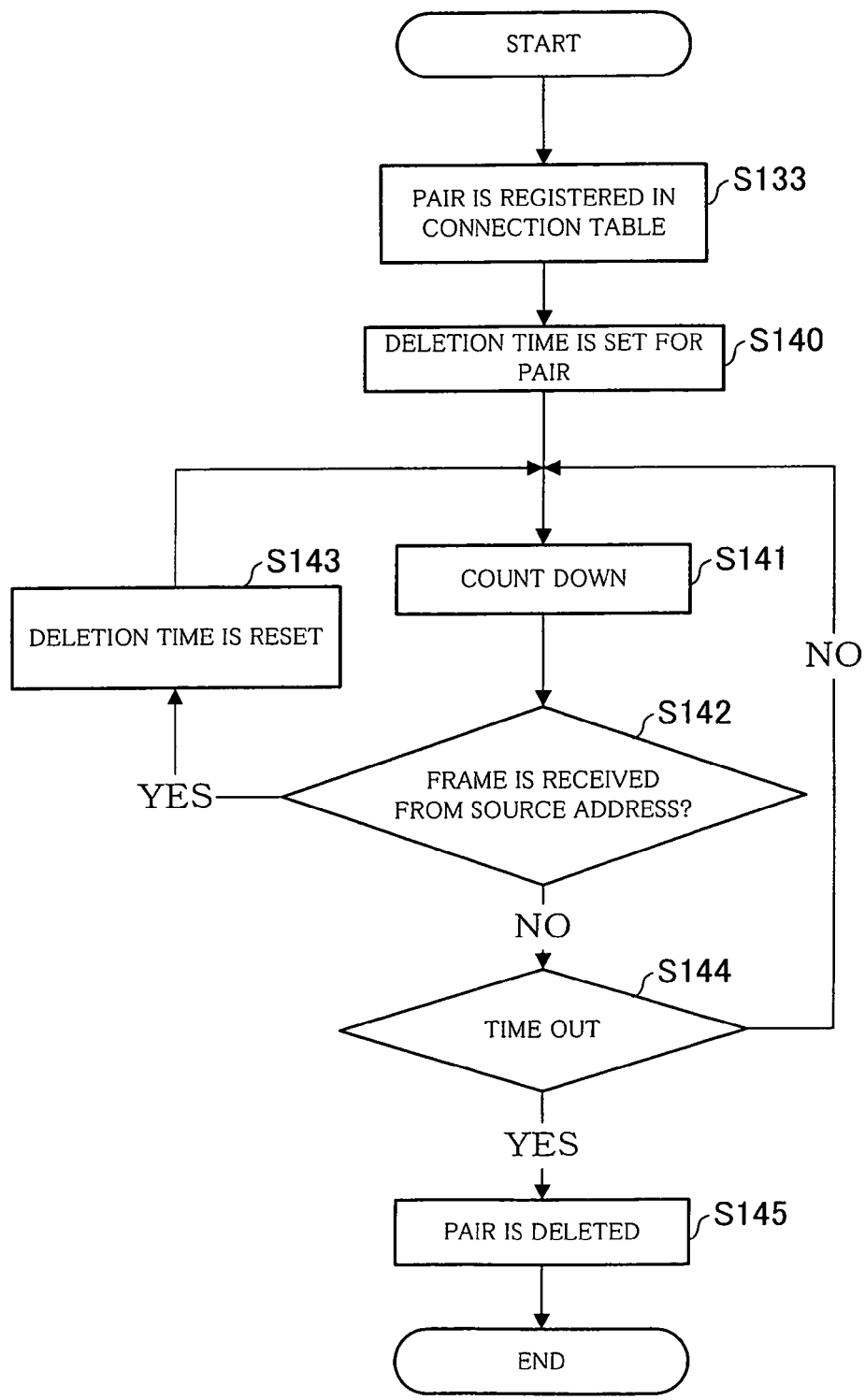
FIG. 22 is a flowchart illustrating deletion processing in which a timer illustrated in FIG. 13 deletes a pair registered in the connection table.

FIG. 22 is a flowchart illustrating deletion processing in which the timer 24 deletes a pair registered in the connection table 123. The deletion processing is explained below with reference to FIG. 22.

First, in S133, when the destination determination section 122 registers a pair of a destination address and a source address of a frame in the connection table, the timer 124 sets a deletion time as to the pair (S140). To be specific, as illustrated in FIG. 20, a deletion time is set for each pair registered in the connection table 123.

Then, the timer 24 starts count down of the set deletion time (S141). Next, the destination determination section 122 judges whether or not a frame is transmitted from the source address of the pair stored in the connection table 123, in other words, whether the timer 124 has received a frame corresponding to the source address of the pair (S142).

When it is judged in S142 that a frame has been transmitted from the source address of the registered pair (YES in S142), the destination determination section 122 instructs the timer 124 to reset the deletion time having been set for the pair (S143). To be specific, the timer 124 restores the deletion time having been set for the pair from a status in which the time is reduced to a default status. Then, the processing goes back to S141.

When the destination determination section 122 judges in S142 that a frame has not been transmitted from the source address of the registered pair, the destination determination section 122 instructs the timer 124 to judge whether it is a time for deleting the pair or not (S144). In other words, the timer 124 judges whether or not the set deletion time is counted down and the deletion time is 0 (timed out).

When it is judged in S144 that the deletion time is not timed out (NO in S144), the processing by the timer 124 goes back to S141. On the other hand, when it is judged in S144 that the deletion time is timed out, the timer 124 deletes the pair that has been timed out from the connection address (S145). Then, the processing is completed.

In this way, when a new frame is not transmitted to the pair stored in the connection table 123 within a predetermined period after a previous frame was transmitted, the timer 124 judges that transmission of single data is completed and deletes the pair. As a result, when new data is transmitted to the virtual address, it is possible to assign the data to a different MFP 97.

Note that the value of the deletion time set by the timer 124 may be set suitably, but it is necessary to set the value to a large value so that time out does not occur during transmission of single data (job). Further, by setting the value to a considerably large value, it is possible for one MFP 97 to process several jobs serially transmitted from one host device. However, when the value is set to an excessively large value, distribution of a burden cannot be performed suitably. Therefore, the value should be set so that single job is surely transmitted.

Figure 23:
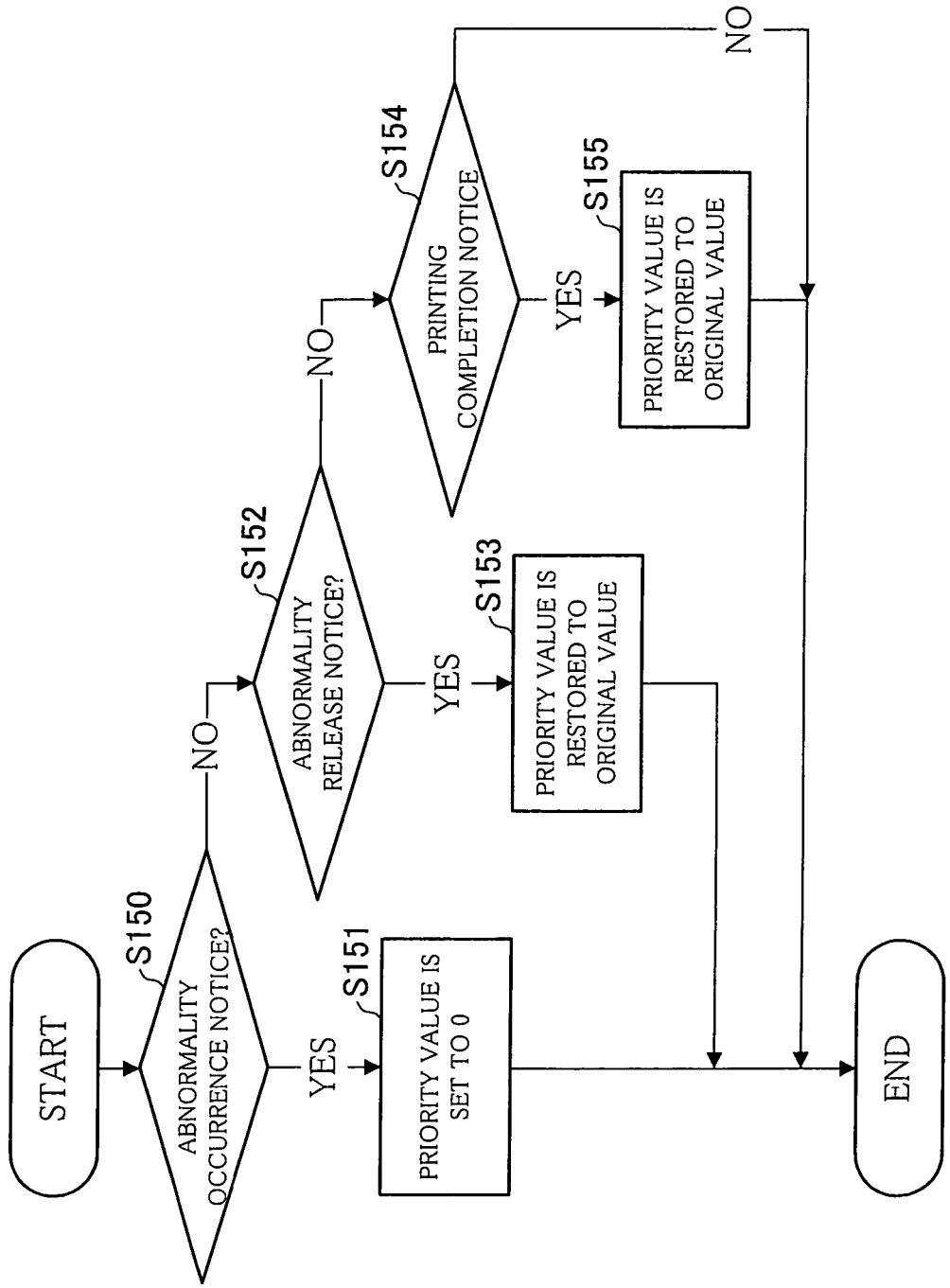
FIG. 23 is a flowchart illustrating processing carried out with respect to a notice given from the MFP in a case where the most suitable MFP is selected based on priority values of ports connected with MFPs.

Next, how a notice is processed in S123 is explained. FIG. 23 is a flowchart illustrating how a notice given from the MFP 97 is processed in a case where the most suitable MFP 97 is selected based on the priority values of the ports 111 connected with the MFPs 97.

When it is judged in S122 in FIG. 19 that the data is a notice given from the MFP 4 (YES in S 122), the data judgment section 116 analyzes the data and judges whether or not the data is an abnormality occurrence notice (S150 in FIG. 23).

When it is judged in S150 that the data is the abnormality occurrence notice (YES in S150), the data judgment section 116 causes the destination determination section 122 to function so as to store, in a memory (not shown), contents stored in the status table 121, namely, the priority value of the port 111 from which the abnormality occurrence notice has been transmitted, and then set the value to 0 (S151). Then, the processing is completed.

When it is judged in S150 that the transmitted data is not the abnormality occurrence notice (NO in S150), the data judgment section 116 judges whether or not the data is an abnormality release notice (S152).

When it is judged in S152 that the data is the abnormality release notice (YES in S152), the data judgment section 116 causes the destination determination section 122 to function so as to restore the priority value of the port 111 from which the abnormality release notice has been transmitted from 0 to the priority value stored in the memory (S153). Then, the processing is completed.

When it is judged in S152 that the data is not the abnormality release notice (NO in S152), the data judgment section 116 judges whether or not the transmitted data is a printing completion notice (processing completion notice) (S154).

When it is judged in S154 that the data is the printing completion notice (YES in S154), the data judgment section 116 causes the destination determination section 122 to restore the priority value of the port 111 from which the printing completion notice has been transmitted so that the restoration corresponds to the amount of job (data) that has been processed (S155). Then, the processing is completed. On the other hand, when the data is not the printing completion notice in S154, the processing carried out with respect to the notice is immediately completed (NO in S154).

In this way, the processing carried out with respect to the notice can change the priority value of the port 111.

FIG. 24 is a flowchart illustrating processing of initial setting at a time when the MFP 97 gets connected with the switching device 100.

When the MFP 97 gets connected with the switching device 100 (S160), the status notification section 137 of the MFP 97 transmits internal information (such as processing ability or MAC address) of the MFP 97 to the switching device 100 (S161). The switching device 100 that has received the internal information acquires the internal information via each port 111 which the MFP 97 is connected with (S162). Then, each of the port registration section 118 and the data judgment section 116 sets various tables based on the internal information (S163). To be specific, the port registration section 118 registers a pair of the MAC address of the MFP 97 and the port 111 that has received the internal information, and the data judgment section 116 generates the status table 121, based on the internal information.

In this way, the MFP 97 newly connected with the network transmits the internal information of the MFP 97 to the switching device 100. The switching device 100 generates various tables based on the transmitted internal information. As a result, the switching device 100 can manage the MFP 97 via each port 111.

Note that in the above explanation, when the MFP 97 is connected with the network, the MFP 97 automatically transmits the internal information. However, it may be so arranged that, for example, the switching device 100 requests a device connected with the port 111 to transmit internal information of the device.

Note that in the above explanation, an example of the information processing device is the MFP 97. However, the present invention is not limited to this. The example of the information processing device is an Internet FAX and a printer. Further, the number of devices connected with the switching device 100 is proportional to the number of ports, and is not particularly limited. Further, in the above explanation, a plurality of host devices 98 are connected with a plurality of MFPs 97. However, the present invention may be arranged so that, for example, the switching device 100 is connected with the MFP 97, the host device 98, and an Internet FAX.

Embodiment 3

Further embodiment according to the present invention is explained below with reference to FIGS. 25 through 30. For convenience of explanation, members having the same functions as those indicated in the embodiment 2 are given the same numbers and their explanations are omitted.

The switching device 100 according to the present embodiment assigns a frame transmitted to the virtual address, based on the statuses of ports 111 to which each MFP 97 is connected.

FIG. 25 illustrates information stored in the status table 121 according to the present embodiment. As illustrated in FIG. 25, the status table 121 stores the particular address of each MFP 97 connected with the switching device 100 and status information indicating the ability (device information, state) of the MFP 97.

To be more specific, in the present embodiment, the status of a port to which the MFP 97 is connected is classified into five statuses: an active status, a busy status, a standby status, an off status, and an error status. The active status indicates a status in which a frame (data) transmitted to the virtual address can be transmitted. The busy status indicates a status in which the port 111 in the active status changes into another status. To be specific, the busy status is a status in which the frame transmitted to the virtual address cannot be transmitted, and a status capable of changing into the off status. The off status is a status capable of changing into the standby status. In the off status, it is impossible to receive the frame transmitted to the virtual address. The standby status is a status capable of changing into the active status. In the standby status, it is impossible to receive the frame transmitted to the virtual address. The error status is a status indicating abnormality. To be specific, when the MFP 97 connected with the port 111 has a breakdown, the port 111 is in the error status. In the error status, it is impossible to receive the frame transmitted to the virtual address.

Note that in any one of the statuses except for the error status, it is possible to receive a frame transmitted to a particular address.

In this way, a case where the port 111 of the switching device 100 is managed according to the status is different from the above explanation, in terms of (a) the MFP selection processing and (b) processing carried out with respect to a notice at a time when the switching device 100 receives a frame transmitted to the virtual address (see FIG. 7). Namely, the case is different from the embodiment 2, in terms of (i) the operations of the data judgment section 116 and the destination determination section 122 and (ii) the status information stored in the status table 121. This is explained below.

Figure 26:
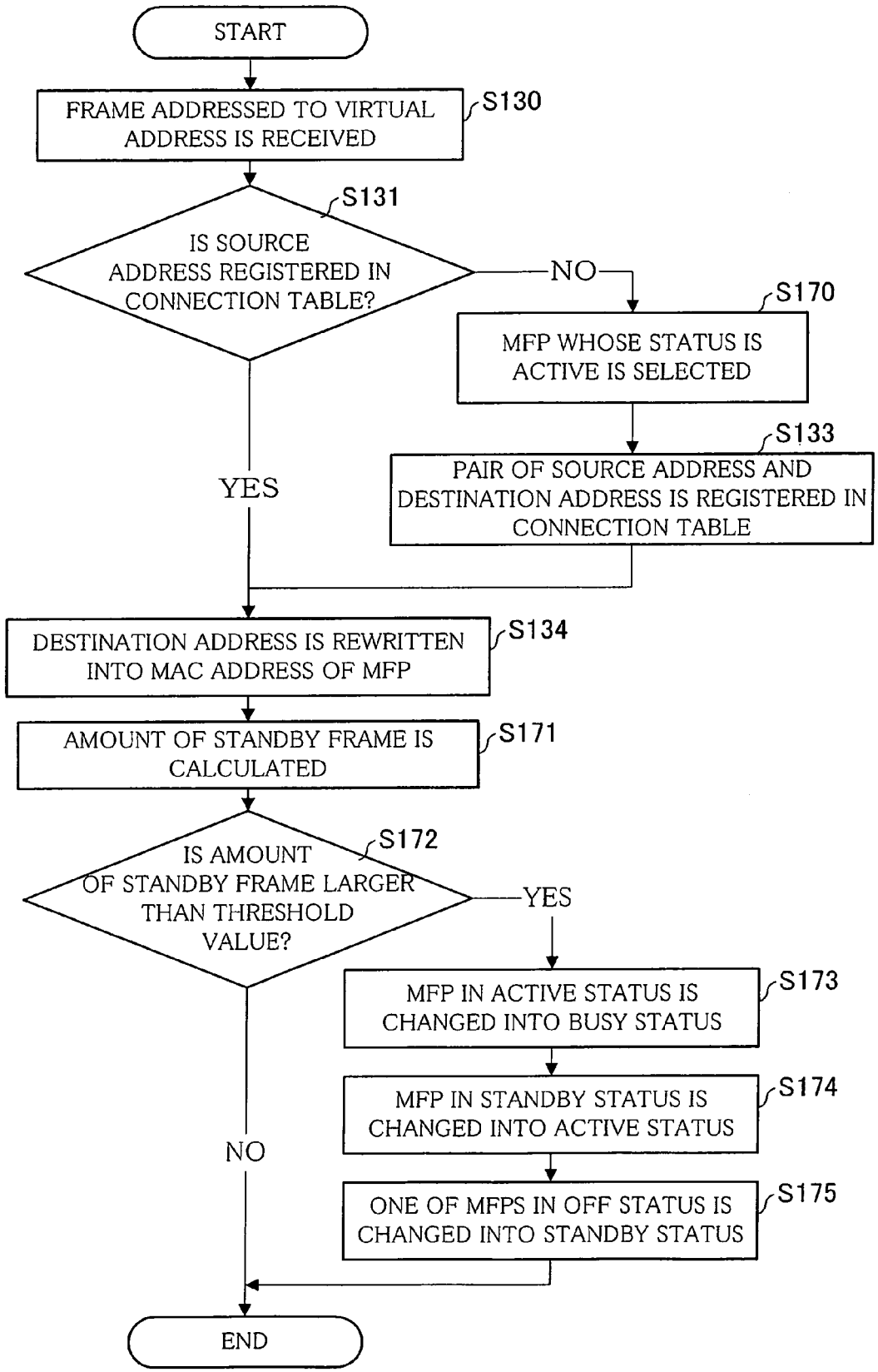
FIG. 26 is a flowchart illustrating a series of processing in an MFP selection processing according to further embodiment of the present invention.

FIG. 26 is a flowchart illustrating a series of processing in the MFP selection processing according to the present embodiment. Note that the same steps as those of the above explanation are given the same step numbers and their detailed explanations are omitted here.

When it is judged in S131 that a source address of a transmitted frame is not registered in the connection table 123 (NO in S131), the destination determination section 122 regards the transmitted frame as a new job, and selects the MFP 97 to process the new job. To be specific, the destination determination section 122 makes reference to the status table 121 illustrated in FIG. 25, and selects an MFP 97 whose status is the active status out of a plurality of MFPs 97 (S170). Namely, the destination determination section 122 makes reference to the status table 121 that stores status information, and determines transmission of the frame to the MFP 97 in the active status. Then, the processing goes to S133.

Next, in S134, the destination determination section 122 rewrites the destination address of the frame from the virtual address to the MAC address of the MFP 97 to process the new job, and then transmits the frame whose destination address has been rewritten to the data processing section 115.

Subsequently, the destination determination section 122 calculates the amount of frames transmitted to the MFP 97 determined in S170 (S171). To be specific, the destination determination section 122 calculates the whole amount of frames transmitted to the MFP 97 during a period from (i) a time point when the destination determination section 122 determines a specific MFP 97 as the destination of the frames to (ii) a current time point. Note that when the MFP 97 to which the frames have been transmitted reports to the destination determination section 122, via the data judgment section 116, that processing of the already transmitted data has been completed, the destination determination section 122 regards the amount, obtained by subtracting the amount of already processed frames, as the whole amount of frames. Namely, the destination determination section 122 calculates the amount of frames that are not processed by the MFP 97 to which the frames have been transmitted, that is, the amount of frames accumulated in the MFP 97.

Next, the destination determination section 122 judges whether or not the amount of frames calculated in S171 is larger than a predetermined threshold value (S172).

When the destination determination section 122 judges in S172 that the amount of frames is smaller than the threshold value (NO in S172), the processing is completed. On the other hand, when the destination determination section 122 judges in S172 that the amount of frames is larger than the threshold value (YES in S172), the destination determination section 122 changes the status of each MFP 97 stored in the status table 121 illustrated in FIG. 25. To be specific, the destination determination section 122 changes the status of the MFP 97 in the active status into the busy status (S173). Then, the destination determination section 122 changes the status of the MFP 97 in the standby status into the active status (S174). Further, the destination determination section 122 changes the status of one MFP 97 out of MFPs 97 in the off status into the standby status (S175). Then, the processing is completed.

As to the MFP 97 in the busy status stored in the status table 121, when a notice of data processing completion is transmitted from the MFP 97 in the busy status stored in the status table 121 to the destination determination section 122, the destination determination section 122 changes the status of the MFP 97 in the busy status stored in the status table 121 into the off status.

Further, when an abnormality occurrence notice is transmitted from the connected MFP 97 to the switching device 100, the destination determination section 122 changes the status of the MFP 97 having transmitted the abnormality occurrence notice into the error status. When an abnormality release notice is transmitted to the switching device 100 from the MFP 97 having transmitted the abnormality occurrence notice, the destination determination section 122 changes the status of the MFP 97 having transmitted the abnormality release notice stored in the state table 121 into the busy status.

In this way, a frame is transmitted to the MFP 97 in the active status and the status of the MFP 97 stored in the status table 121 is changed based on the amount of frames transmitted to the MFP 97, so that it is possible to assign data (frame) transmitted to the virtual address, almost based on the current status of the MFP 97 in operation.

Note that the MFP 97 may be arranged so as to change the status of the MFP 97 based on the status information stored in the status table 121.

To be specific, the MFP 97 may be arranged so that: for example, when the status information about the MFP 97 stored in the status table 121 is the standby status, only the control section 133, the printer engine (image forming engine) 132, and the communication IF section 136 are in operation.

Further, the MFP 97 may be arranged so that: for example, when the status information about the MFP 97 stored in the status table 121 is the off status, only the communication IF section 136 functions due to the sub power source 138, and other sections stop.

In this way, the status of the MFP 97 directly or indirectly connected with the switching device 100 is changed based on the status table 121 of the switching device 100, so that the MFP 97 that is set not to receive the virtual address can be in the standby status. Therefore, energy-saving can be realized, compared with conventional art.

Next, other processing carried out with respect to a notice in S123 is explained below with reference to FIG. 27.

Figure 27:
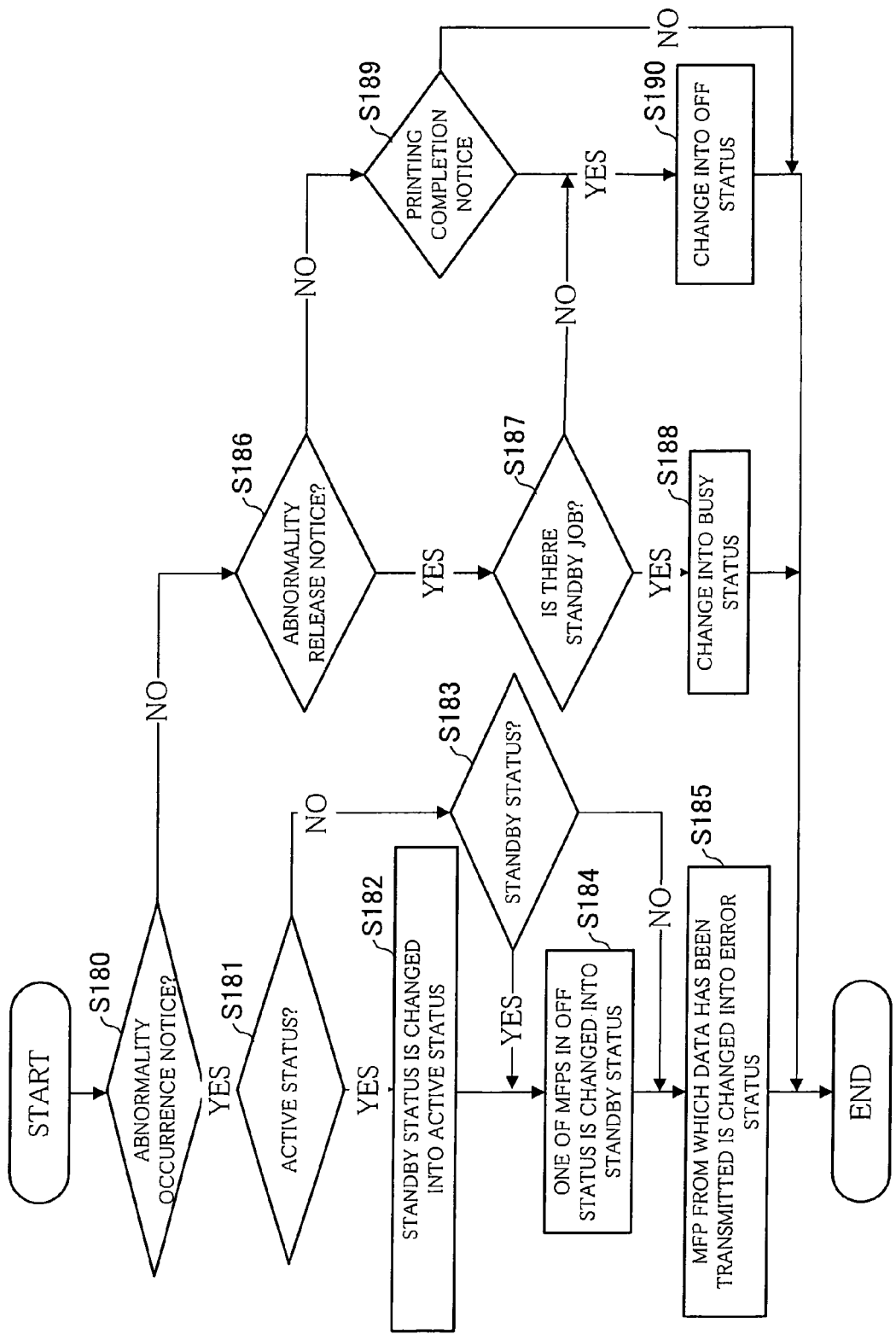
FIG. 27 is a flowchart illustrating processing carried out with respect to a notice given from the MFP in a case where the most suitable MFP is selected based on statuses of ports connected with MFPs.

FIG. 27 is a flowchart illustrating processing carried out with respect to a notice given from the MFP 97 in a case where the most suitable MFP 97 is selected based on the status of the MFPs 97 connected with the ports 111. Note that in the following explanation, "status" means the status of the MFP 97 stored in the status table 121. Therefore, changing the status means changing the status stored in the status table 121.

When it is judged in S122 in FIG. 19 that the data is a notice given from the MFP 97 (YES in S122), the data judgment section 116 analyzes the data and judges whether or not the data is the abnormality occurrence notice (S180).

When it is judged in S180 that the data is the abnormality occurrence notice (YES in S180), the data judgment section 116 causes the destination determination section 122 to function so as to make reference to the status table 121 and judge whether or not the status stored in the status table 121 of the MFP 97 having transmitted the abnormality occurrence notice (the status is refereed to merely as a status hereinafter) is in the active status (S181).

When it is judged in S181 that the status of the MFP 97 having transmitted the abnormality occurrence notice is in the active status (YES in S181), the data judgment section 116 causes the destination determination section 122 to function so as to change the status of the MFP 97 in the standby status stored in the status table 121 into the active status (S182). Then, the processing goes to S184. On the other hand, when it is judged in S181 mat the status of the MFP 97 having transmitted the abnormality occurrence notice is not in the active status (NO in S181), the data judgment section 116 causes the destination determination section 122 to function so as to make reference to the status table 121 and judge whether or not the status of the MFP 97 having transmitted the abnormality occurrence notice is in the standby status (S183).

When it is judged in S183 that the status of the MFP 97 having transmitted the abnormality occurrence notice is in the standby status, the process goes to S184. On the other hand, when it is judged in S183 that the status is not in the standby status, the processing goes to S185.

Next, the data judgment section 116 causes the destination determination section 122 to function so as to change one MFP 97 out of MFPs 97 whose statuses are the off status into the standby status (S184).

Then, the destination determination section 122 changes the status of the MFP 97 having transmitted the abnormality occurrence notice into the error status (S185), and then the processing is completed.

On the other hand, when it is judged in S180 that the data is not the abnormality occurrence notice, the data judgment section 116 analyzes the data and judges whether or not the data is the abnormal release notice (S186).

When it is judged in S186 that the data is the abnormal release notice (YES in S186), the data judgment section 116 causes the destination determination section 122 to function so as to judge whether or not a waiting job (unprocessed job) exists in the MFP 97 having transmitted the abnormal release notice (S187).

When it is judged in S187 that the waiting job exists (YES in S187), the data judgment section 116 causes the destination determination section 122 to function so as to change the status of the MFP 97 having transmitted the abnormal release notice into the busy status (S188). On the other hand, when it is judged in S187 that the waiting job does not exist (NO in S187), the processing goes to S190.

Further, when it is judged in S186 that the data is not the abnormality release notice (NO in S186), the data judgment section 116 analyzes the data and judges whether or not the data is a printing completion notice (S189). When it is judged in S189 that the data is the printing completion notice (YES in S189), the status of the MFP 97 having transmitted the printing completion notice is changed into the off status (S190). On the other hand, when it is judged in S189 that the data is not the printing completion notice (NO in S189), the processing carried out with respect to the notice is immediately completed.

Incidentally, the embodiment 2 describes an example in which the connection table 123 stores a pair of a source address and a destination address in the host device 98 and the MFP 97 connected with the switching device 100. However, the connection table 123 is not limited to that of the embodiment 2, and may store, for example, the following information.

As described in FIG. 28, examples of information stored in the connection table 123 include: a MAC address, an IP address, and a port number of TCP/IP of the host device 98; and a MAC address, an IP address, and a port number of TCP/IP of the MFP 97. In this way, by causing the connection table 123 to store information of higher-layer, it is possible to recognize traffics in more detail. Further, the port number of a device from which data is transmitted (host device 98) is different in terms of each job (data). As such, by causing the connection table 123 to store the port number, it is possible to clearly discriminate a plurality of jobs (data) serially transmitted from one host device 98, and the jobs can be respectively assigned to a printer or can be shared by printers.

Further, by causing the connection table 123 to store the port number of the MFP 97, it is possible to recognize whether a frame received by the switching device 100 is a printing job or other frame. Therefore, it is possible that only the printing job is transmitted to the MFP 97 and other frame is dealt with by the switching device 100.

Note that in a case where the connection table 123 stores: the MAC address, the IP address, and the port number of TCP/IP of the host device 98; and the MAC address, the IP address, and the port number of TCP/IP of the MFP 97, and in a case where the source address is rewritten into the virtual address, when a received frame is addressed to the MAC address of the MFP 97 in S13, the source address (MAC address and IP address) may be rewritten into the virtual address (MAC address and IP address). Namely, in a case where the connection table 123 stores the IP address of each device, management may be performed using the IP address.

Further, in the above explanation, in a case where the connection table 123 is arranged so as to store an IP address and a port number of a TCP/IP of each device, information of the IP address and the port number is also registered in the connection table 123 in the processing of registration to the connection table 123 (S133). Further, in this case, in the address rewriting processing (S134), the destination address may be rewritten into the IP address. Note that in a case where the connection table 123 is generated based on the IP address as described above, the port registration section 118 stores, in the address table 112, a corresponding relation between the port number of the port 111 and the MAC address/IP address of the device connected with the port 111. Further, the destination determination section 122 may be arranged so as to store, in the status table 121, a corresponding relation between the MAC address and the IP address.

Figure 29:
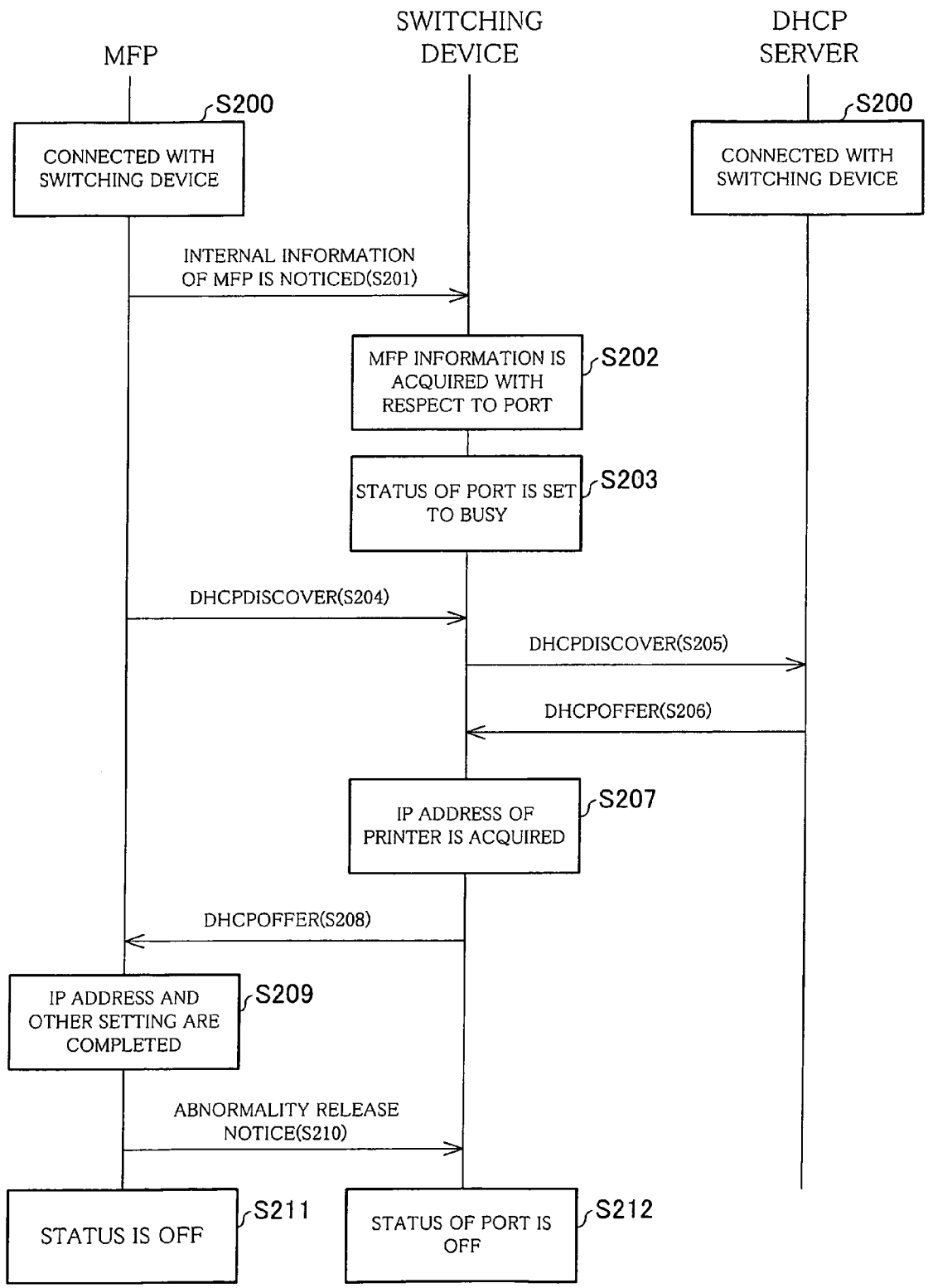
FIG. 29 illustrates initial setting processing in which the MFP is connected with the switching device.

Here, processing of initial setting at a time when the MFP 97 gets connected with the switching device 100 is explained with reference to FIG. 29. Note that the following describes an example in which the switching device 100 is connected with a DHCP server (IP address assigning processing section, IP address assigning means). Further, the following describes an example in which each port 111 is connected with one host device 98, one MFP 97, or one DHCP server. Namely, FIG. 29 illustrates an example in which one port 111 is connected with one device. Therefore, one MFP 97 corresponds to one port 111, so that it is possible to manage each port 111.

When the MFP 97 is connected with the switching device 100 (S200), the MFP 97 notifies the switching device 100 of internal information (such as processing ability or MAC address) (S201). The switching device 100 acquires and holds information with respect to each port 111 (S202). At that time, a pair of a MAC address and a port number is entered in the address table 112 and at the same time the port number is registered in a printer group. Further, when the switching device 100 confirms connection with the MFP 97, the switching device 100 sets the status of the corresponding port 111 into the busy status (S203). Next, the MFP 97 transmits DHCPDISCOVER to the DHCP server (S204). This is used to search the DHCP server and to automatically set a parameter of the network such as an IP address or a default gateway.

The switching device 100 switches connection based on the destination address. As a result, the DHCP server can receive DHCPDISCOVER (S205). The DHCP server that has received the DHCPDISCOVER transmits DHCPOFFER including the network parameter to the MFP 97 (S206). Receiving the DHCPOFFER, the switching device 100 acquires an IP address assigned to the MFP 97 (S207), and maintains the IP address in the address table 112 and/or status table 121. Further, receiving the DHCPOFFER (S208), the MFP 97 acquires the network parameter such as an IP address, and sets the MFP 97 (S209). After setting, the MFP 97 transmits the abnormality release notice to the switching device 100 (S210), and goes to an off mode in which only the communication IF section 136 functions due to the sub power source 138 (S211). Receiving the abnormality release notice from the MFP 97, the switching device 100 changes the status of the port 111 into the off status (S212), and completes a series of processing about the initial setting.

Further, it is preferable that when the switching device 100 receives the DHCPDISCOVER transmitted from the MFP 97 to the DHCP server, or when the switching device 100 receives the DHCPOFFER (including an IP address) transmitted from the DHCP server to the MFP 97, the switching device 100 judges that a new device is connected to the switching device 100 and updates contents of the address table 112 and/or the status table 121.

In other words, the line concentrator according to the present embodiment may be arranged so that: the line concentrator judges whether or not data relayed by the line concentrator is data transmitted/received between the MFP 97 and the DHCP server at a time when the DHCP server assigns an IP address to the MFP 97 to which an IP address has not yet been assigned, and the line concentrator updates the contents of the address table 112 and/or the status table 121, when the line concentrator judges that the relayed data is the data transmitted/received between the MFP 97 and the DHCP server.

In this way, the network information processing system according to the present embodiment allows a burden to be shared and allows mediation concerning a job without using a server, by causing the switching device 100 to switch MFPs 97 to perform the job. Further, switching based on the MAC address allows for high speed processing.

Note that the address table 112 and the status table 121 were separately explained above. However, the present invention is not limited to this, and may be arranged so that, for example, as illustrated in FIG. 30, a table combining the address table 112 with the status table 121 is used, thereby performing various processings. Particularly, when these two tables are combined into a single table, it is possible to consolidate datum identical with each other. Therefore, the amount of information stored in the switching device 100 can be reduced.

Further, the network information processing system according to the present invention may be arranged so that: the network information processing system includes IP address notification means for notifying the information processing device of the IP address of the information processing device via the line concentrator; and data judgment means of the line concentrator causes status storage means to store the IP address when the IP address notification means notifies the information processing device of the IP address of the information processing device. With the arrangement, when the information processing device acquires the IP address, the line concentrator can store the IP address of the information processing device.

Further, a case where only one virtual address is set was explained above. However, for example, when devices having different functions (e.g. scanner and image forming apparatus) are connected with the line concentrator, a virtual address capable of transmission only to a device having a particular function may be set. Therefore, the number of virtual addresses is not particularly limited.

Note that in the embodiments 2 and 3, functions of members constituting the line concentrator are realized in such a manner that: calculation means such as a CPU reads out a program code stored in a storage medium such as a ROM (Read Only Memory) and causes the program to be developed and executed on the RAM (Random Access Memory). However, the functions of members constituting the line concentrator may be realized only by hardware which performs the same processing as the functions. Further, the functions can be realized by combining hardware that performs a part of processing with the calculation means that executes a program code for controlling the hardware and remaining processing. Further, a member explained as hardware in the members also can be realized by combining hardware performing a part of processing with the calculation means which executes a program code for controlling the hardware and remaining processing. Note that the calculation means may be a simple body, or may be a plurality of calculation means which are connected with each other via a bus or various communication paths in the device and execute the program code.

A program code capable of being executed by the calculation means, or a program provided as data which allows generation of a program code through a process such as later-mentioned decompression, is stored in a storage medium for storing the program (program code or the data) and distributed by the storage medium, or is transmitted and distributed by communication means for transmitting the program via a wired or wireless communication path, and then executed by the calculation means.

When a program is transmitted via a communication path, transmission media constituting the communication path cooperatively transmit signal sequences each of which is indicative of the program, thereby transmitting the program via the communication path. Further, it may be so arranged that: when the signal sequence is transmitted, a transmission device modulates a carrier wave by use of the signal sequence indicative of a program, thereby superimposing the signal sequence onto the carrier wave. In this case, a reception device demodulates the carrier wave so as to restore the signal sequences. On the other hand, it may be so arranged that: when the signal sequence is transmitted, the transmission device performs packet transmission of the signal sequence as a digital data sequence. In this case, the reception device connects received packet groups and restores the signal sequence. Further, it may be so arranged that: when the transmission device transmits the signal sequence, the transmission device combines the signal sequence with other signal sequence by means of a method such as time division/frequency division/code division, and transmits the combined signal sequences. In this case, the reception device extracts and restores individual signal sequence from the combined signal sequences. In any case, transmission of a program via a communication path brings about the same effect.

Here, a storage medium for distributing a program is preferably detachable. However, a storage medium after distribution of the program may be either detachable or undetachable. Further, the storage medium may be either rewritable or not, may be either volatile or not, and may adopt any storage method and shape, as long as the storage medium can store a program. The storage medium is, for example, tapes such as a magnetic tape and a cassette tape, or discs such as magnetic discs (e.g. a floppy disc (registered trademark) and a hard disc), a CD-ROM, an optical magnetic disc (MO), a mini disc (MD), and a digital versatile disc (DVD). Further, the storage medium may be cards such as an IC card and an optical card, or semiconductor memories such as a mask ROM, an EPROM, an EEPROM, and a flash ROM. Alternatively, the storage medium may be a memory formed in calculation means such as a CPU.

Note that the program code may be a code which informs the calculation means of all procedures of the above processes. Alternatively, when a basic program (for example, an operating system or a library) which can execute a part of or all of the processes in response to calling carried out in a predetermined procedure already exists, a part of or all of the procedures may be replaced with a code or a pointer for instructing the calculation means to call up the basic program.

Further, a format in accordance with which a program is stored in the storage medium may be, for example, (i) a storage format capable of being accessed and executed by calculation means, such as a status in which the program is disposed on a real memory, (ii) a storage format before the program is disposed on the real memory and after the program has been installed in a local storage medium (e.g. a real memory or a hard disc) capable of being always accessed by the calculation means, or (iii) a storage format before the program is installed from a network or conveyable storage medium to the local storage medium. Further, the program is not limited to an object code after compilation, and may be stored as a source code, or an intermediate code generated during interpretation or compilation. In either case, as long as the program can be converted into format capable of being executed by the calculation means by a process such as decompression of compressed data, decoding of coded information, interpretation, compilation, a link, or disposition to a real memory, or combination of the processes, the same effect can be obtained regardless of a format in accordance with which the program is stored in the storage medium.

In order to solve the problem, the line concentrator according to the present invention is a line concentrator including: a plurality of ports; an address storage section for storing a specific address that has been predetermined; an output processing section for outputting data, received by a port, from another port capable of transmitting the data to a destination; a data judgment processing section for judging whether or not the received data is addressed to the specific address; and a device determination processing section for determining a destination address used to transmit data, having been transmitted to the specific address, to at least one of information processing devices capable of processing the data, wherein the output processing section determines a port which is to transmit the data to the destination address determined by the device determination processing section, and the output processing section outputs the data to the port having been determined.

What are meant by "information processing devices capable of processing the data" "transmitted to the specific address" are information processing devices connected with ports of the line concentrator. Further, what are meant by the information processing devices connected with the ports are information processing devices capable of transmission/reception of data with the ports. To be specific, examples of the information devices may be information processing devices directly connected with the ports, or information processing devices indirectly connected with the ports via other line concentrator, a router or the like.

The device determination processing section determines an information processing device capable of processing data transmitted to the specific address stored in the address storage section. Subsequently, the output processing section outputs the data to the information processing device based on determination of the device determination processing section. Therefore, without a server, a data-transmitting device can transmit data transmitted to the specific address to the information processing device determined to process the data out of the plurality of information processing devices. Therefore, the line concentrator can process the data transmitted to the virtual address.

Further, the line concentrator intervening between the data-transmitting device and the information processing device so as to transmit data assigns data addressed to the specific address. Therefore, unlike a case where a server assigns data, it is possible to reduce an amount of data communication in the whole network, without increasing of an amount of data communication (traffic) between a server and the line concentrator.

Further, it is unnecessary for the operator to consider to which information processing device data is to be transmitted in a network printer system without a server. On this account, data can be processed only by transmitting the data to the predetermined specific address.

It is more preferable that the line concentrator according to the present invention includes a status storage section for storing information about devices connected with the ports, and the device determination processing section determines the destination address, based on the information stored in the status storage section.

With the arrangement, the device determination processing section determines the destination address used to transmit data to the information processing device. As a result, it is possible to determine the most suitable information processing device for transmitting data.

It is more preferable that the line concentrator according to the present invention includes a port storage section for storing a combination of (i) a port to which data addressed to the specific address has been transmitted and (ii) an address of an information processing device connected with the port, and the output processing section determines a port which is to output the data, based on the combination.

With the arrangement, the combination of (i) the port to which data addressed to the specific address has been transmitted and (ii) the address of the information processing device connected with the port is stored. Therefore, it is unnecessary to confirm, by a broadcast, a destination to which data is outputted (transmitted), thereby allowing easy output of data without increasing traffic.

It is more preferable that the line concentrator according to the present invention includes a connection storage section for storing a combination of (i) a source address of a device from which data addressed to the specific address has been transmitted and (ii) the destination address determined by the device determination processing section, and the output processing section determines a port which is to output the data, based on the combination.

With the arrangement, a port which is to output the data is determined based on the combination of the source address and the destination address, so that it is possible to prevent a set of data from being separately transmitted to a plurality of destinations.

It is more preferable that the line concentrator according to the present invention includes a self particular address storage section for storing a particular address of the line concentrator, and the data judgment processing section judges whether or not the received data is addressed to the particular address of the line concentrator, and the device determination processing section changes the information stored in the status storage section, based on contents of data transmitted to the particular address of the line concentrator.

With the arrangement, it is possible to rewrite contents of the status storage section based on the data transmitted to the particular address of the line concentrator, so that, for example, it is possible to more easily confirm a status and ability of a device connected with the line concentrator.

It is more preferable to arrange the line concentrator according to the present invention so that: the device determination processing section rewrites a virtual address of data transmitted to the virtual address into a destination address based on the combination stored in the connection storage section, and the source rewriting processing section is provided so as to rewrite the source address of the data into the virtual address when data corresponding to the source address stored in the connection storage section is received.

With the arrangement, when the data corresponding to the source address stored in the connection storage section is received, the source address is rewritten into the virtual address, so that a source device can communicate data only by the virtual address. Further, a particular address of an information processing device having processed data is concealed from a source device, so that it is possible to enhance security.

It is more preferable to arrange the line concentrator according to the present invention so that the device determination processing section includes a deletion processing section for deleting the combination stored in the connection storage section, after a predetermined time has passed.

With the arrangement, the combination is deleted after the predetermined time has passed, so that it is possible to avoid constant connection of the source address with the destination address.

Further, a time for the deletion processing section to delete the combination is set suitably, so that a plural sets of data (jobs) serially transmitted from a source device can be processed by a single information processing device. Further, for example, it is possible to surely transmit a plurality of frames constituting a single set of data, according to traffic of the network.

It is more preferable to arrange the line concentrator according to the present invention so that: when an information processing device that has processed data transmitted to the specific address reports to the deletion processing section that processing of the data has been completed, the deletion processing section deletes the combination stored in the connection storage section for transmission/reception of the data.

The combination is deleted when it is reported that the processing of the data has been completed. Therefore, the device that has transmitted the data can cause other information processing device to process data to be subsequently processed.

The line concentrator according to the present invention may be arranged so that the connection storage section stores the source address and the destination address as an IP address.

With the arrangement, the concentration storage section stores the source address and the destination address as an IP address, so that discrimination of traffic by an address on a higher layer than an MAC address and other information can be realized. Note that the IP address is an address used in a TCP/IP protocol.

It is more preferable to arrange the line concentrator according to the present invention so that: the information processing device is an image forming apparatus including an image forming engine, and while the output processing section transmits data to an image forming apparatus and causes the image forming apparatus to process the data, the device determination processing section determines other image forming apparatus to which data is to be subsequently transmitted, and controls the other image forming apparatus so that an image forming engine of the other image forming apparatus is in operating condition.

With the arrangement, when the other image forming apparatus takes over processing of data, the image forming engine of the other image forming apparatus is in operating condition, so that the data can be immediately processed. Therefore, it is unnecessary for the operator to wait for the image forming engine to be in the operating condition. Note that the data indicates a single job.

It is more preferable to arrange the line concentrator according to the present invention so that: the device determination processing section compares a total amount of unprocessed data out of data transmitted to an information processing device with a predetermined threshold value, and when the device determination processing section judges that the total amount of the unprocessed data exceeds the threshold value, the device determination processing section changes a destination address to which the data is to be transmitted.

With the arrangement, when it is judged that the total amount of the data transmitted to the information processing device exceeds the threshold value, the destination address is changed so as to change the destination of output of the data. As a result, it is possible to prevent transmission of data from being concentrated on a single information processing device.

It is more preferable to arrange the line concentrator according to the present invention so that: when an information processing device reports to the device determination processing section that at least a part of data outputted to the information processing device has been processed, the device determination processing section recalculates a total amount of data outputted to the information processing device.

With the arrangement, the device determination processing section recalculates the amount of the data transmitted to the information processing device, so that it is possible to confirm more exact status of the information processing device.

It is more preferable to arrange the line concentrator according to the present invention so that: when the device determination processing section receives, from an information processing device, an abnormality occurrence notice indicating occurrence of abnormality in the information processing device, or an abnormality release notice indicating release from the abnormality, the device determination processing section changes information stored in the status storage section.

With the arrangement, it is possible to cause the status of the information processing device to correspond to the information stored in the status storage section.

It is more preferable to arrange the line concentrator according to the present invention so that the device determination processing section updates contents of the status storage section based on IP address transmitted from an IP address assigning processing section for assigning IP addresses of the plurality of information processing devices. To be more specific, it is more preferable to arrange the line concentrator according to the present invention so that: when the device determination processing section receives an IP address transmitted from the IP address assigning processing section for assigning IP addresses of the plurality of information processing devices, or when the IP assigning processing section receives requests for assigning IP addresses from the plurality of information processing devices, the device determination processing section updates the contents of the status storage section.

When a new device is connected with the network including the line concentrator, the IP address assigning processing section assigns an IP address to the new device. With the arrangement, when the line concentrator receives an IP address transmitted from the IP address assigning processing section or the line concentrator receives a request for assigning an IP address from the new device, the contents of the status storage section are updated. Therefore, the contents of the status storage section are updated with an appropriate interval.

It is more preferable to arrange the line concentrator according to the present invention so that the port storage section stores a group of a port, a MAC address, and an IP address based on an IP address transmitted from the IP address assigning processing section for assigning IP addresses of the plurality of information processing devices.

With the arrangement, it is possible to transmit/receive data by using an IP protocol.

In order to solve the problem, in the network information processing system according to the present invention, the host device capable of transmitting data to the virtual address is connected to the plurality of information processing devices capable of processing the data, via at least the line concentrator.

With the arrangement, the line concentrator assigns, to the plurality of information processing devices, the data transmitted from the host device, so that it is possible to provide a network information processing system capable of efficiently processing the data.

It is more preferable to arrange the network information processing system according to the present invention so that the information processing device includes an information notification processing section for notifying information about the information processing device to the line concentrator.

With the arrangement, when the information processing device is connected with the line concentrator, the line concentrator receives the information about the information processing device transmitted from the information processing device. As a result, the line concentrator can automatically acquire the information about the information processing device.

It is more preferable to arrange the network information processing system according to the present invention so that: the device determination processing section compares a total amount of unprocessed data out of data transmitted to an information processing device with a predetermined threshold value, and when it is judged that the total amount of the unprocessed data exceeds the predetermined threshold value, the device determination processing section changes an information processing device to which the data is to be transmitted, and the device determination processing section notifies the information processing device to which the data has been transmitted that other information processing device takes over subsequent processing, and the information processing device includes a control section for processing the data having been transmitted and for changing, after processing the data, the information processing device into a low power consumption status which realizes lower power consumption than that of a status which allows immediate start of data processing.

With the arrangement, the information processing device from which the other information processing device has taken over subsequent processing changes into the low power consumption status after finishing the processing of the data which has been transmitted. Therefore, it is possible to reduce power consumption in the whole of the network information processing system, compared with a case where the information processing device maintains a status in which it is possible to immediately start data processing. On the other hand, when the information processing device changes into the low power consumption status (off status), the other information processing device takes over processing of data transmitted to the specific address, so that the network information processing system can safely process the data transmitted to the specific address. As a result, power consumption of the network information processing system can be reduced without impairing convenience of a user who transmits the data to the specific address.

Incidentally, each section of the line concentrator may be realized by hardware or by causing a computer to execute a program. To be specific, the program according to the present invention is used to cause a computer to function as the line concentrator. Further, the storage medium according to the present invention stores the program.

When these programs are executed by a computer, the computer functions as the line concentrator. On this account, it is possible to assign data based on setting of each line concentrator, without using a server.

The present invention is not limited to the embodiments above, but may be altered within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is used for a network system including a plurality of information processing devices. Particularly, the present invention is preferably used for a network print system in which an image forming apparatus such as a copying machine, a scanner, and an MFP is connected with a LAN.

The invention claimed is:

1. An information processing device, comprising:
a storage section;
a reception section capable of receiving (i) data transmitted to a shared address commonly used to address the information processing device and to address one or more other information processing devices and (ii) data transmitted to a particular address of the information processing device;
a frame analysis section for analyzing (I) whether the received data is data transmitted to the particular address or not and (II) whether the received data is data transmitted to the shared address or not;
a status change processing section for switching between (a) an active status which allows additional registration of the data transmitted to the shared address and processing of the data and (b) a non-active status other than the active status;
a registration processing section for adding and registering the data received by the reception section into the storage section in such a manner that, if the data received by the reception section is data transmitted to the shared address, the registration processing section adds and registers the data into the storage section only when the information processing device is in the active status, and, if the data received by the reception section is data transmitted to the particular address, the registration processing section adds and registers the data into the storage section, regardless of whether the information processing device is in the active status or not; and
a data processing section for processing the data stored in the storage section;

wherein the status change processing section instructs one or more other information processing devices to change into the active status when an amount of unprocessed data registered in the storage section exceeds a predetermined threshold value, and the status change processing section changes the information processing device into the non-active status and causes the data processing section to process the unprocessed data.

2. The information processing device as set forth in claim 1, further comprising:

a status information storage section for storing status information about one or more statuses of said other information processing devices, wherein the status change processing section determines, out of said other information processing devices, an information processing device which is to be changed from the non-active status into the active status, based on the status information.

3. The information processing device as set forth in claim 1, further comprising:

a calculation processing section for calculating, based on the unprocessed data stored in the storage section, a throughput of the unprocessed data; and a comparison processing section for comparing the throughput with a predetermined threshold value, wherein the status change processing section determines whether or not to change the information processing device into the non-active status, based on a result of comparison performed by the comparison processing section.

4. The information processing device as set forth in claim 1, wherein the non-active status includes a standby status in which the information processing device changes into the active status based on an instruction to change into the active status, said instruction being transmitted from said other information device, and the status change processing section controls the registration processing section so that the registration processing section additionally register the data transmitted to the shared address when it is determined that the information processing device is in the standby status, and the status change processing section processes the data having been additionally registered when it is determined that said other information processing device in the active status is not capable of processing the data.

5. The information processing device as set forth in claim 1, wherein the non-active status includes (i) an off status which does not allow additional registration of data transmitted to the shared address and processing of the data and (ii) a busy status which allows the data processing section to process unprocessed data, and the status change processing section changes the status of the information processing device into the off status and controls the data processing section so that the data processing section does not operate when the status change processing section determines that processing of the unprocessed data is completed after changing into the busy status.

6. The information processing device as set forth in claim 1, wherein: when the registration processing section determines that received data has been transmitted to the shared address, the registration processing section informs, to a device from which the data has been transmitted, (i) reception of the data and (ii) a particular address of the information processing device.

7. An information processing program, stored in a computer-readable medium, for operating the information processing device as set forth in claim 1, said information processing program causing a computer to function as each of the processing sections.

8. An image forming apparatus, comprising:

the image processing device as set forth in claim 1; and an image forming section for forming an image based on data processed by the information processing device.

9. The image forming apparatus as set forth in claim 8, wherein the non-active status includes a standby status prior to an active status, and when the image forming apparatus is in the standby status, the status change processing section controls the image forming section so that the image forming section is in operating condition.

10. The information processing device as set forth in claim 1, wherein new data sent to the shared address is sent to at least one of the one or more other information processing devices with an active status when the information processing device has a non-active status.

11. The information processing device as set forth in claim 1, wherein each information processing device is a printer.

12. The information processing device as set forth in claim 1, wherein the shared address is a virtual network address.

* * * * *